US010311997B2

(12) United States Patent
Tanigawa et al.

(10) Patent No.: US 10,311,997 B2
(45) Date of Patent: Jun. 4, 2019

(54) WIRE HARNESS AND METHOD FOR ROUTING WIRE HARNESS

(71) Applicant: YAZAKI CORPORATION, Tokyo (JP)

(72) Inventors: Masaki Tanigawa, Shizuoka (JP); Hideomi Adachi, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 45 days.

(21) Appl. No.: 15/417,967

(22) Filed: Jan. 27, 2017

(65) Prior Publication Data

US 2017/0221601 A1 Aug. 3, 2017

(30) Foreign Application Priority Data

Jan. 29, 2016 (JP) .................................. 2016-015569
Jan. 29, 2016 (JP) .................................. 2016-015601
Jan. 29, 2016 (JP) .................................. 2016-015703

(51) Int. Cl.
*H02G 3/04* (2006.01)
*H01B 7/00* (2006.01)
*B60R 16/02* (2006.01)
*H01R 13/53* (2006.01)

(52) U.S. Cl.
CPC ........ *H01B 7/0045* (2013.01); *B60R 16/0215* (2013.01); *H01R 13/53* (2013.01); *H02G 3/0468* (2013.01); *H01R 2201/26* (2013.01)

(58) Field of Classification Search
CPC ...... H02G 3/04; H02G 3/0468; H02G 3/0406; H02G 3/0462; H02G 3/06; H02K 5/22; H02K 5/225; H01B 7/00; H01B 7/0045; B60R 16/02; B60R 16/0215; B60R 16/0207; H01R 13/53; H01R 2201/26; H01R 13/58; H01R 13/5804

USPC .............. 174/72 A, 68.1, 68.3, 72 C, 36, 92, 174/72 TR, 88 R, 70 C; 138/121, 118, 138/156, 128, 159, 162, 166, 167, 168, 138/109; 248/73, 74.1, 74.2, 205.2, 248/205.3, 205.6, 49, 68.1, 62

See application file for complete search history.

(56) References Cited

U.S. PATENT DOCUMENTS

| | | | |
|---|---|---|---|
| 4,874,908 A | 10/1989 | Johansson | |
| 6,051,789 A * | 4/2000 | Kato | B60R 16/0215 174/72 A |
| 7,696,435 B1 * | 4/2010 | Thomas | H02G 3/0481 174/72 A |
| 8,395,047 B2 * | 3/2013 | Adachi | H02G 3/0437 174/74 R |
| 8,563,866 B2 * | 10/2013 | Oga | H02G 3/0462 174/135 |

(Continued)

FOREIGN PATENT DOCUMENTS

JP 64-31309 A 2/1989
JP 11-16425 A 1/1999

(Continued)

OTHER PUBLICATIONS

Communication dated Feb. 6, 2018 from the Japanese Patent Office in counterpart application No. 2016-015569.

(Continued)

*Primary Examiner* — Angel R Estrada
(74) *Attorney, Agent, or Firm* — Sughrue Mion, PLLC

(57) ABSTRACT

A wire harness (41) has a harness main body (51) including at least a high-voltage wire (55). A bending load at a bent portion of the harness main body (51) is set to less than 44 newtons.

12 Claims, 37 Drawing Sheets

(56) References Cited

U.S. PATENT DOCUMENTS

| | | | | |
|---|---|---|---|---|
| 9,469,257 | B2 * | 10/2016 | Inao | B60R 16/0215 |
| 9,692,216 | B2 * | 6/2017 | Sugimoto | H02G 3/0468 |
| 9,776,580 | B2 * | 10/2017 | Inao | B60R 16/0215 |
| 9,947,439 | B2 * | 4/2018 | Inao | B60R 16/0215 |
| 2016/0101746 | A1 | 4/2016 | Inao et al. | |

FOREIGN PATENT DOCUMENTS

| | | | |
|---|---|---|---|
| JP | 2010-239678 A | 10/2010 | |
| JP | 2012-174666 A | 9/2012 | |
| JP | 2015-6050 A | 1/2015 | |
| WO | 2013162070 A1 | 10/2013 | |

OTHER PUBLICATIONS

Communication dated Feb. 6, 2018 from the Japanese Patent Office in counterpart application No. 2016-015601.
Communication dated Mar. 6, 2018 from the Japanese Patent Office in counterpart application No. 2016-015703.
Communication dated Sep. 4, 2018, from the Japanese Patent Office in counterpart application No. 2016-015569.
Communication dated Sep. 4, 2018, from the Japanese Patent Office in counterpart application No. 2016-015601.
Communication dated Aug. 3, 2018, from the State Intellectual Property Office of People's Republic of China in counterpart Application No. 201710063725.9.
Xiangshan Zhong, "Practical Manual for Stamping Die and Stamping Technology", Jan. 30, 2015, pp. 136-139, vol. 16, No. 22 (12 pages total).
Yongzheng Song, "Agricultural Machinery Engineering Mechanical Stamping Parts Manufacturing Technology", Oct. 31, 2013, pp. 158-159, vol. 1, No. 22 (6 pages total).

* cited by examiner

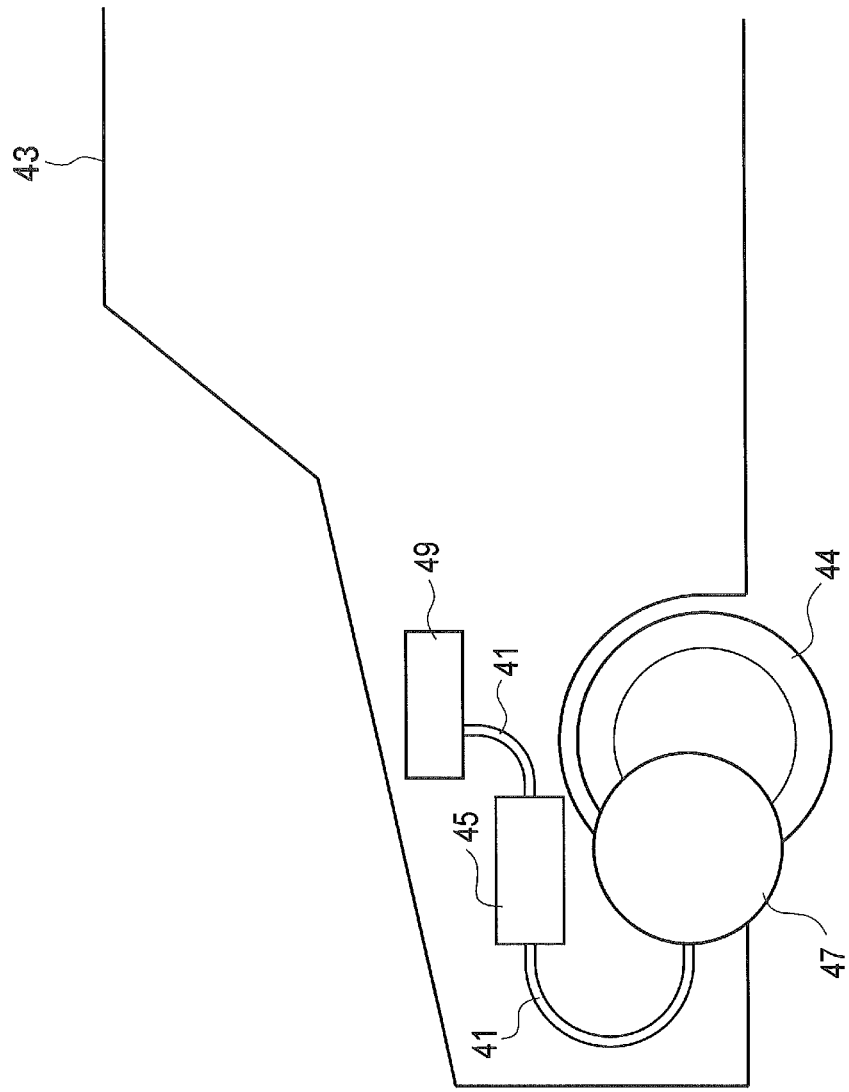

FIG. 3

| INSULATING MATERIAL COMPOSITION | INSULATOR THICKNESS (mm) | OUTSIDE DIAMETER (mm) | STRAND CONFIGU-RATION | BENDING LOAD (N) |
|---|---|---|---|---|
| WA CROSS-LINKED POLYETHYLENE | 1.4 | 9.1 | 0.32/19/26 | 22 |
| WB FLEXIBLE CROSS-LINKED POLYETHYLENE | | | | 16 |
| WC SILICONE RUBBER | | | | 6 |
| WD VINYL ACETATE RUBBER COMPOSITION | | | | 8 |
| WE FLEXIBLE CROSS-LINKED POLYETHYLENE | | | 0.18/19/80 | 12 |

FIG. 4

| | | BENDING LOAD (N) |
|---|---|---|
| WA | WA | 44 |
| WB | WB | 32 |
| WC | WC | 12 |
| WD | WD | 16 |
| WE | WE | 24 |
| WA | WB | 38 |
| WA | WC | 28 |
| WA | WD | 30 |
| WA | WE | 34 |
| WB | WC | 22 |
| WB | WD | 24 |
| WB | WE | 28 |
| WC | WD | 14 |
| WC | WE | 18 |
| WD | WE | 20 |

FIG. 5

| COMBINATION OF WIRE SAMPLE | | WA WA | WA WB | WA WE | WB WB | WA WD | WB WE | WA WC | WE WE | WB WD | WB WC | WD WE | WC WE | WD WD | WC WD | WC WC |
|---|---|---|---|---|---|---|---|---|---|---|---|---|---|---|---|---|
| LOAD ON HOUSING (N) | | 44 | 38 | 34 | 32 | 30 | 28 | 28 | 24 | 24 | 22 | 20 | 18 | 16 | 14 | 12 |
| OPERATOR | FEMALE A | × | ○ | ○ | ○ | ○ | ○ | ○ | ○ | ○ | ○ | ○ | ○ | ○ | ○ | ○ |
| | FEMALE B | × | ○ | ○ | ○ | ○ | ○ | ○ | ○ | ○ | ○ | ○ | ○ | ○ | ○ | ○ |
| | FEMALE C | × | × | ○ | ○ | ○ | ○ | ○ | ○ | ○ | ○ | ○ | ○ | ○ | ○ | ○ |
| | FEMALE D | × | × | × | ○ | ○ | ○ | ○ | ○ | ○ | ○ | ○ | ○ | ○ | ○ | ○ |
| | FEMALE F | × | ○ | ○ | ○ | ○ | ○ | ○ | ○ | ○ | ○ | ○ | ○ | ○ | ○ | ○ |
| | FEMALE G | × | ○ | ○ | ○ | ○ | ○ | ○ | ○ | ○ | ○ | ○ | ○ | ○ | ○ | ○ |
| | FEMALE H | × | ○ | ○ | ○ | ○ | ○ | ○ | ○ | ○ | ○ | ○ | ○ | ○ | ○ | ○ |
| | FEMALE I | × | ○ | ○ | ○ | ○ | ○ | ○ | ○ | ○ | ○ | ○ | ○ | ○ | ○ | ○ |
| | MALE A | × | ○ | ○ | ○ | ○ | ○ | ○ | ○ | ○ | ○ | ○ | ○ | ○ | ○ | ○ |
| | MALE B | × | ○ | ○ | ○ | ○ | ○ | ○ | ○ | ○ | ○ | ○ | ○ | ○ | ○ | ○ |
| | MALE C | × | ○ | ○ | ○ | ○ | ○ | ○ | ○ | ○ | ○ | ○ | ○ | ○ | ○ | ○ |
| | MALE D | × | ○ | ○ | ○ | ○ | ○ | ○ | ○ | ○ | ○ | ○ | ○ | ○ | ○ | ○ |

FIG. 6

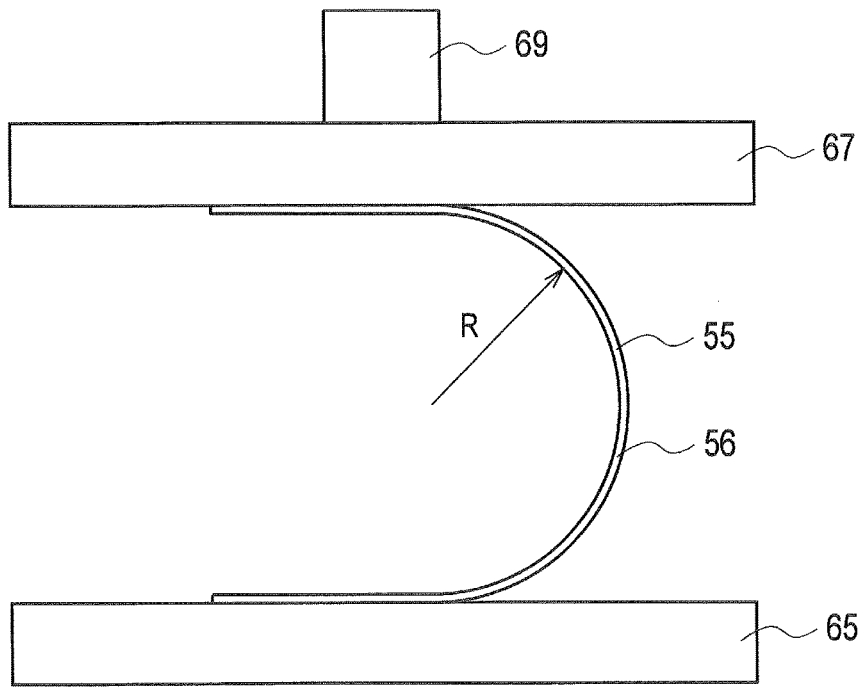

FIG. 8

| INSULATING MATERIAL COMPOSITION | INSULATOR THICKNESS (mm) | OUTSIDE DIAMETER (mm) | STRAND CONFIGU-RATION | BENDING LOAD (N) |
|---|---|---|---|---|
| WA CROSS-LINKED POLYETHYLENE | 1.4 | 9.1 | 0.32/19/26 | 43 |
| WB FLEXIBLE CROSS-LINKED POLYETHYLENE | | | | 28 |
| WC SILICONE RUBBER | | | | 13 |
| WD VINYL ACETATE RUBBER COMPOSITION | | | | 14 |
| WE FLEXIBLE CROSS-LINKED POLYETHYLENE | | | 0.18/19/80 | 20 |

FIG. 9

| | | BENDING LOAD (N) |
|---|---|---|
| WA | WA | 86 |
| WB | WB | 56 |
| WC | WC | 26 |
| WD | WD | 28 |
| WE | WE | 40 |
| WA | WB | 71 |
| WA | WC | 56 |
| WA | WD | 57 |
| WA | WE | 63 |
| WB | WC | 41 |
| WB | WD | 42 |
| WB | WE | 48 |
| WC | WD | 27 |
| WC | WE | 33 |
| WD | WE | 34 |

FIG. 10

| COMBINATION OF WIRE SAMPLE | WA/WA | WA/WB | WA/WE | WA/WD | WA/WC | WB/WB | WB/WE | WB/WD | WB/WC | WE/WE | WD/WE | WC/WE | WD/WD | WC/WD | WC/WC |
|---|---|---|---|---|---|---|---|---|---|---|---|---|---|---|---|
| LOAD ON HOUSING (N) | 86 | 71 | 63 | 57 | 56 | 56 | 48 | 42 | 41 | 40 | 34 | 33 | 28 | 27 | 26 |
| OPERATOR FEMALE A | × | × | × | × | × | × | × | ○ | ○ | ○ | ○ | ○ | ○ | ○ | ○ |
| FEMALE B | × | × | × | × | × | × | ○ | ○ | ○ | ○ | ○ | ○ | ○ | ○ | ○ |
| FEMALE C | × | × | × | × | × | × | ○ | × | × | × | ○ | ○ | ○ | ○ | ○ |
| FEMALE D | × | × | × | × | × | × | ○ | ○ | ○ | ○ | ○ | ○ | ○ | ○ | ○ |
| FEMALE F | × | × | × | × | × | × | × | × | ○ | ○ | ○ | ○ | ○ | ○ | ○ |
| FEMALE G | × | × | × | × | × | × | × | ○ | ○ | ○ | ○ | ○ | ○ | ○ | ○ |
| FEMALE H | × | × | × | × | × | × | ○ | ○ | ○ | ○ | ○ | ○ | ○ | ○ | ○ |
| FEMALE I | × | × | × | × | × | × | ○ | ○ | ○ | ○ | ○ | ○ | ○ | ○ | ○ |
| MALE A | × | × | × | × | × | ○ | ○ | ○ | ○ | ○ | ○ | ○ | ○ | ○ | ○ |
| MALE B | × | × | × | × | × | ○ | ○ | ○ | ○ | ○ | ○ | ○ | ○ | ○ | ○ |
| MALE C | × | × | × | × | × | × | × | ○ | ○ | ○ | ○ | ○ | ○ | ○ | ○ |
| MALE D | × | × | × | × | × | × | × | ○ | ○ | ○ | ○ | ○ | ○ | ○ | ○ |

FIG. 11

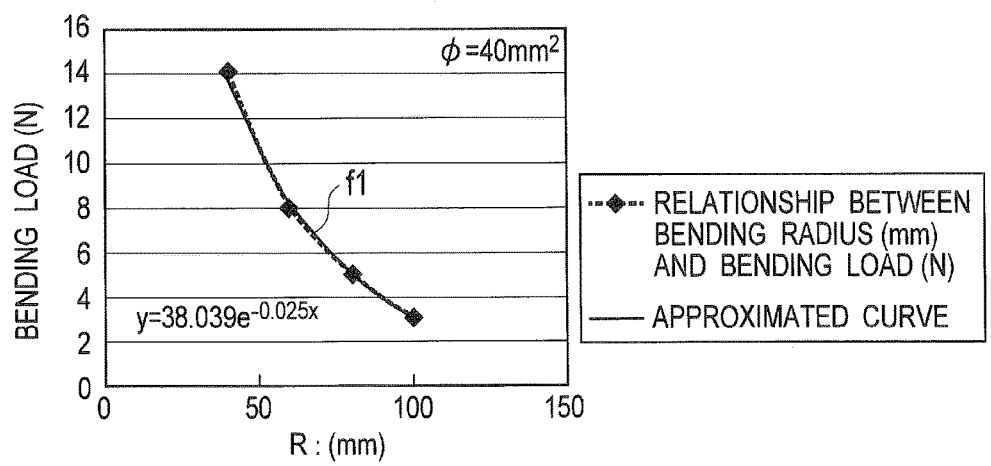

FIG. 18

| WALL THICKNESS t1 (mm) | BENDING RADIUS R (mm) | | |
|---|---|---|---|
| | 50 | 35 | 25 |
| 0.15 | 2.27N | 2.48N | 3.06N |
| 0.2 | 3.27N | 3.45N | 4.02N |
| 0.25 | 4.14N | 4.4N | 5.06N |
| 0.3 | 5.82N | 6.13N | 6.9N |
| 0.4 | 8.89N | 9.09N | 9.83N |
| 0.5 | 13.76N | 14.11N | 15.12N |

FIG. 26

|     | BENDING LENGTH L (mm) | | |
| --- | --- | --- | --- |
|     | 100 | 200 | 300 |
| WA | 6.7N | 2.6N | 1N |
| WB | 4.9N | 1.6N | 0.6N |
| WD | 2.8N | 0.9N | 0.5N |

FIG. 28

| CONDUCTOR CROSS-SECTIONAL AREA $\phi$ (mm$^2$) | BENDING LENGTH L (mm) | | |
|---|---|---|---|
| | 100 | 200 | 300 |
| 3 | 0.7N | 0.2N | 0.2N |
| 12 | 2.8N | 0.9N | 0.5N |
| 40 | 18.7N | 5.8N | 2.6N |
| 60 | 32N | 10.4N | 4.6N |

FIG. 31

| CONDUCTOR CROSS-SECTIONAL AREA $\phi$ (mm$^2$) | BENDING RADIUS R (mm) | | | |
|---|---|---|---|---|
| | 40 | 60 | 80 | 100 |
| 3 | 0.89N | 0.45N | 0.3N | 0.2N |
| 12 | 2.5N | 1.8N | 1.4N | 0.8N |
| 40 | 14N | 8N | 5N | 3N |
| 60 | 35N | | | |

FIG. 52
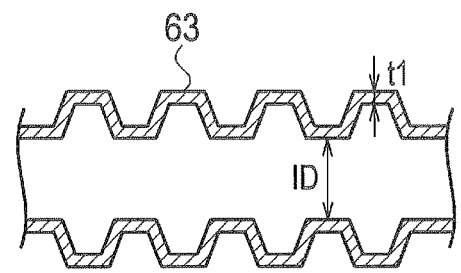
FIG. 53
| | INSIDE DIAMETER ID (mm) | | |
|---|---|---|---|
| | 5 | 7 | 10 |
| BENDING LOAD (N) | 0.47 | 2.07 | 3.65 |
FIG. 54
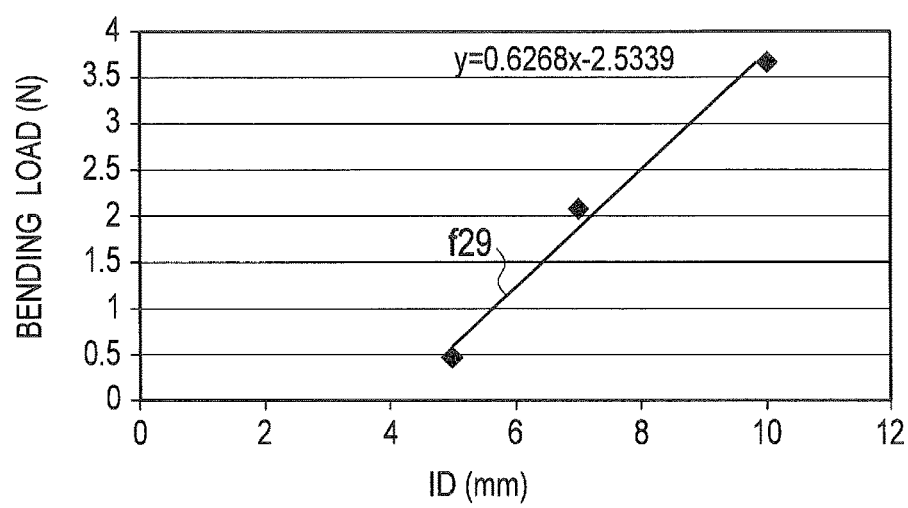

WIRE HARNESS AND METHOD FOR ROUTING WIRE HARNESS

CROSS REFERENCE TO RELATED APPLICATIONS

This application claims the priority of Japanese Patent Application No. 2016-015703, filed on Jan. 29, 2016, Japanese Patent Application No. 2016-015569, filed on Jan. 29, 2016, and Japanese Patent Application No. 2016-015601, filed on Jan. 29, 2016, the entire content of which are incorporated herein by reference.

BACKGROUND

Technical Field

The present invention relates to a wire harness and a method for routing a wire harness, and more particularly relates to a wire harness and a method for routing a wire harness, in which a bending load is set to less than 44 newtons.

Related Art

There has heretofore been known an automobile wire harness which connects an inverter to a motor and connects a battery to the inverter (see Japanese Patent Application Publication No. 2010-239678).

Also, there has heretofore been known a wire harness in which high-voltage wires 303 are bent and routed through a desired path by using a hard protector 301 as shown in FIG. 55. The hard protector 301 is fixed to a vehicle body 307 of a vehicle with clips 305, for example.

Moreover, there has heretofore been known a wire harness in which a conducting path assembly (harness main body) including high-voltage wires and the like is covered with a corrugated tube, an overall moisture curing tape of a moisture curing member is wound around almost the entire length of the periphery of the corrugated tube, and a partial moisture curing tape of the moisture curing member is wound around a bent portion that needs further strength, thereby obtaining a double structure to form a reinforced member (see Japanese Patent Application Publication No. 2012-174666). Thus, the harness main body is maintained in a desired shape without using a hard protector.

SUMMARY

Incidentally, in the above case or the like, the automobile wire harness needs to be routed by reducing R (bending radius; curvature radius) in a short path.

Such routing with reduced R in a short path leads to a problem of deterioration in routing and assembly performance of the wire harness when a large force is required to bent the wire harness.

Also, in the conventional wire harness shown in FIG. 55, the high-voltage wires are provided in the hard protector installed in the vehicle. Even when the high-voltage wires are hard, the routing shape of the high-voltage wires can be maintained. However, there is a problem of cost increase such as an expensive mold required for manufacturing the hard protector.

Moreover, in the conventional wire harness using the moisture curing tape of the moisture curing member, again, even when the high-voltage wires are hard, the routing shape of the high-voltage wires can be maintained. However, the need for winding the moisture curing tape leads to a problem of complicated routing steps for the high-voltage wires.

The present invention is made in consideration of the above problems, and it is an object of the present invention to improve routing and assembly performance of a wire harness including a high-voltage wire.

Furthermore, it is an object of the present invention to provide a wire harness and a method for routing a wire harness, which enable cost reduction and good routability in a vehicle or the like in the case of a wire harness with a harness main body including a high-voltage wire and an exterior part.

A wire harness according to the first aspect of the present invention includes a harness main body including at least a high-voltage wire. A bending load at a bent portion of the harness main body is set to less than 44 newtons.

According to the second aspect of the present invention, the wire harness according to the first aspect includes the harness main body having a plurality of the high-voltage wires, the harness main body having a connector connected to one end of the harness main body, and the connector is connected to a counterpart connector by bending the harness main body.

When the connector is connected to the counterpart connector, no straight portion may be provided or a length of a straight portion may be not more than three times larger than a value of an outside diameter of the harness main body in a part where the harness main body starts to extend from the connector.

The harness main body may include an exterior part covering a periphery of the high-voltage wire.

When the harness main body includes a plurality of constituent members, the bending load at the bent portion of the harness main body may be set according to a combination leading to the sum of the bending loads less than 44 newtons, based on bending load data previously calculated for each of a plurality of bending forms in each of the constituent members.

The previously calculated bending load data may indicate a bending form in which at least a part of the harness main body is bent, when the constituent member is the high-voltage wire, the bending load data may include data indicating a correlation between a curvature radius and a bending load of the high-voltage wire and data indicating a correlation between a diameter and the bending load of the high-voltage wire, and when the exterior part as the constituent member is a corrugated tube, the bending load data may be data indicating a correlation between a thickness and a bending load of the corrugated tube.

When the plurality of high-voltage wires differ in length in the bending form of the harness main body, the curvature radius of the high-voltage wire having a long length may be set larger than that of the high-voltage wire having a short length.

The curvature radius at the bent portion of the harness main body may be not more than 60 mm.

The wire harness may connect between a battery and an inverter or between the inverter and a motor in an electric vehicle or a hybrid vehicle.

A method for routing a wire harness including a harness main body including at least a high-voltage wire according to a third aspect of the present invention includes previously calculating, when the harness main body includes a plurality of constituent members, bending load data for each of a plurality of bending forms in each of the constituent members. Each of the constituent members are selected in a combination leading to the sum of bending loads less than 44 newtons, based on the bending load data. The harness main body is formed with the selected constituent member, and bending and routing the harness main body.

According to the fourth aspect of the present invention, the wire harness according to the third aspect includes the harness main body includes a plurality of the high-voltage wires, and the wire harness further includes a connector connected to one end of the harness main body, and the connector is connected to a counterpart connector by bending the harness main body.

The connector may be connected to the counterpart connector, no straight portion may be provided or a length of a straight portion may be not more than three times larger than a value of an outside diameter of the harness main body in a part where the harness main body starts to extend from the connector.

The constituent members of the harness main body may include an exterior part covering the periphery of the high-voltage wire.

The previously calculated bending load data may indicates a bending form in which at least a part of the harness main body is bent. When the constituent member is the high-voltage wire, the bending load data may include data indicating a correlation between a curvature radius and a bending load of the high-voltage wire and data indicating a correlation between a diameter and the bending load of the high-voltage wire. When the exterior part as the constituent member is a corrugated tube, the bending load data may be data indicating a correlation between a thickness and a bending load of the corrugated tube.

According to the fifth aspect of the present invention, the harness main body includes an exterior part covering a periphery of the high-voltage wire.

When the harness main body includes a plurality of constituent members, the bending load at the bent portion of the harness main body may be set according to a combination leading to the sum of the bending loads less than 44 newtons, based on bending load data previously calculated for each of a plurality of bending forms in each of the constituent members.

The bending load of the high-voltage wire may be less than 37 newtons, and the bending load of the exterior part may be less than 7 newtons.

The previously calculated bending load data may indicate a bending form in which at least a part of the harness main body is bent. When the constituent member is the high-voltage wire, the bending load data may include data indicating a correlation between a curvature radius and a bending load of the high-voltage wire and data indicating a correlation between a diameter and the bending load of the high-voltage wire. When the exterior part as the constituent member is a corrugated tube, the bending load data may be data indicating a correlation between a thickness and a bending load of the corrugated tube.

The wire harness may connect between a battery and an inverter or between the inverter and a motor in an electric vehicle or a hybrid vehicle.

The wire harness may be configured to be fixed to a vehicle body of an electric vehicle or a hybrid vehicle with at least two fixing members.

According to the sixth aspect of the present invention, the wire harness according to the third aspect includes the harness main body further including an exterior part covering the periphery of the high-voltage wire.

The previously calculated bending load data may indicate a bending form in which at least a part of the harness main body is bent. When the constituent member is the high-voltage wire, the bending load data may include data indicating a correlation between a curvature radius and a bending load of the high-voltage wire and data indicating a correlation between a diameter and the bending load of the high-voltage wire. When the exterior part as the constituent member is a corrugated tube, the bending load data may be data indicating a correlation between a thickness and a bending load of the corrugated tube.

A wire harness according to the present invention provides a wire harness including a high-voltage wire with improved routing and assembly performance. Furthermore, when a harness main body of the wire harness includes a high-voltage wire and an exterior part, the present invention provide a wire harness and a method for routing a wire harness, which enable cost reduction and good routability in a vehicle or the like.

BRIEF DESCRIPTION OF DRAWINGS

FIG. 1 is a diagram showing a mode of using a wire harness according to a first embodiment and a second embodiment of the present invention;

FIG. 3 is a table showing a bending load of a high-voltage wire;

FIG. 4 is a table showing a bending load when two high-voltage wires are combined;

FIG. 5 is a table showing the result of a questionnaire for operators who install the wire harness;

FIG. 6 is a diagram showing a method for measuring the bending load of the high-voltage wire;

FIG. 8 is a table showing a bending load of a high-voltage wire;

FIG. 9 is a table showing a bending load when two high-voltage wires are combined;

FIG. 10 is a table showing the result of a questionnaire for operators who install the wire harness;

FIG. 11 is a graph showing a relationship between a bending radius of the high-voltage wire and the bending load of the high-voltage wire in the case shown in FIG. 6;

FIG. 18 is a table showing the result of measurement of the bending load in the mode shown in FIG. 17 when a bending radius and a thickness of the exterior part are changed;

FIG. 26 is a table showing a relationship between lengths of bent portions of high-voltage wires (WA, WB, and WD) and bending loads of the high-voltage wires (WA, WB, and WD);

FIG. 28 is a table showing a relationship among a cross-sectional area of a core of a high-voltage wire WD, the length of the bent portion of the high-voltage wire WD, and the bending load of the high-voltage wire WD;

FIG. 31 is a table showing a relationship among a bending radius of the high-voltage wire WD, a cross-sectional area of a core of the high-voltage wire WD, and the bending load of the high-voltage wire WD;

FIG. 52 is a cross-sectional view showing a schematic configuration of the corrugated rube;

FIG. 53 is a table showing a relationship between an inside diameter and a bending load of the corrugated tube;

FIG. 54 is a graph showing a relationship between the inside diameter and the bending load of the corrugated tube.

DETAILED DESCRIPTION

Figure 2A:
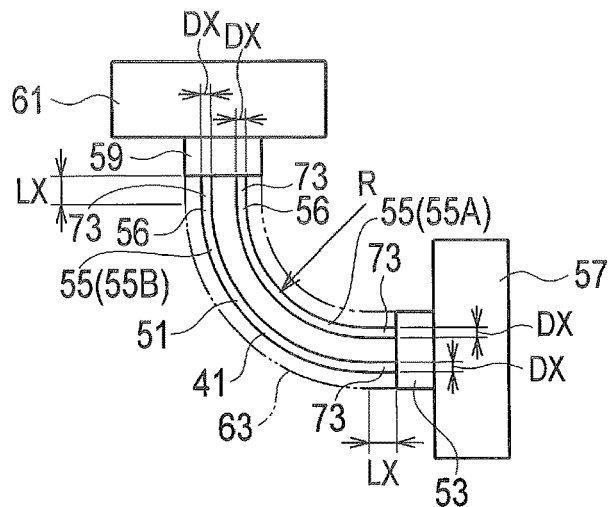
FIG. 2A is a diagram showing a mode of installing the wire harness according to the first embodiment of the present invention.

Hereinafter, embodiments of the present disclosure will be described with reference to the drawings. It is to be noted that components corresponding to each other in the embodiments will be designated with the same reference numbers, and descriptions thereof may not be repeated. In a case where only a part of the structure is described in an embodiment, the other parts of the structure of the embodiment can be provided by the same parts of the structure described in a preceding embodiment. Each of the embodiments may not be limited to the structure explicitly described, but may be provided by partly combining structures of any embodiments in any ways, though not explicitly described, as long as there is no difficulty in such combinations.

First Embodiment

As shown in FIG. 1, a wire harness (wire harness routing structure) 41 according to a first embodiment of the present invention is used to connect an inverter 45 to a motor 47 in a vehicle (electric vehicle, hybrid vehicle, and fuel cell vehicle) 43 and to connect a battery 49 of the vehicle to the inverter 45. As shown in FIGS. 2A to 2C and 7A to 7C, the wire harness 41 includes a harness main body 51 and a connector 53. Note that, in FIG. 1, reference numeral 44 denotes a front wheel of the vehicle 43, which is driven to be rotated by the motor 47.

The harness main body 51 includes at least a plurality of high-voltage wires 55. Each of the high-voltage wires 55 is an automobile cable for use when a system voltage (circuit voltage) is direct current 60V or more, which is formed into an elongated cylindrical shape, for example. Also, the high-voltage wire 55 includes: a core made of a conductive material such as copper; and a cover 56 made of an insulating material (rubber, synthetic resin or the like) covering the core.

The plurality of high-voltage wires 55 extend side by side such that longitudinal directions thereof coincide with each other. The connector 53 is connected to (provided at) one end of the harness main body 51.

The wire harness 41 is provided with another connector 59. This connector 59 is connected to the other end of the harness main body 51.

Figure 2B:
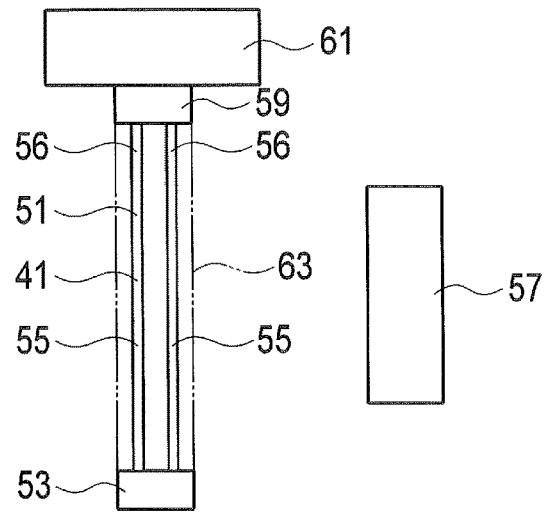
FIG. 2B is a diagram showing a state before installing the wire harness.
Figure 7A:
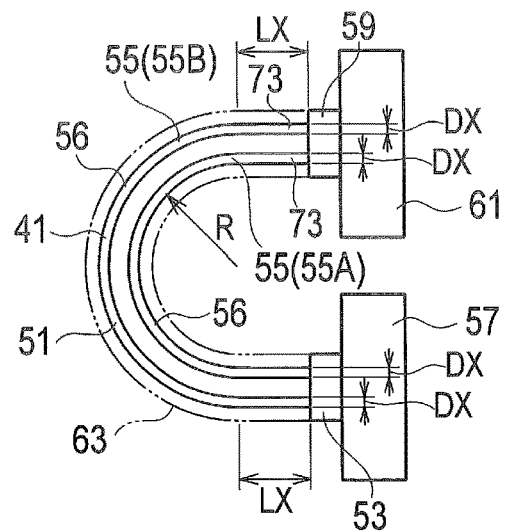
FIG. 7A is a diagram showing a mode of installing the wire harness according to the first embodiment of the present invention.
Figure 7B:
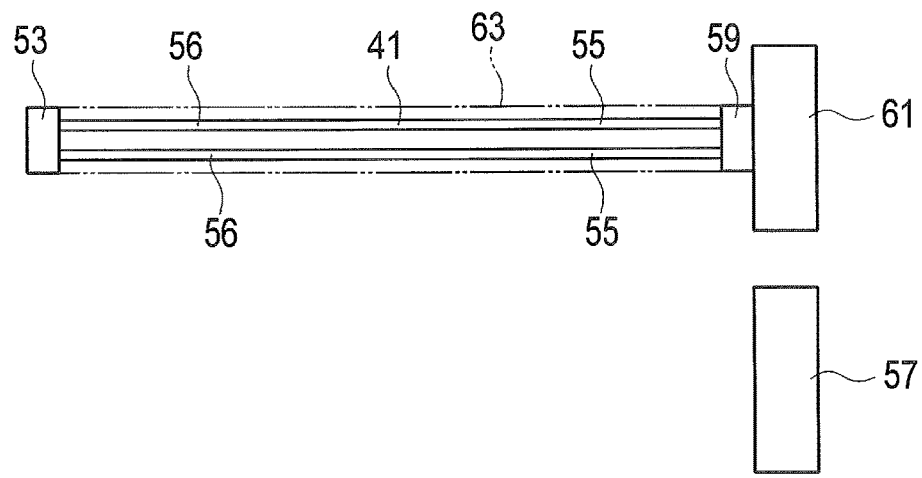
FIG. 7B is a diagram showing a state before installing the wire harness.

Then, the connector 53 is connected to a counterpart connector 57 by bending the harness main body 51 (see FIGS. 2A, 2C, 7A, and 7C) from a state where the connector 59 is connected to a connector (counterpart connector) 61 of one device (for example, the inverter 45) and the harness main body 51 extends straight, for example (see FIGS. 2B and 7B). In this event, bending load at the bent portion of the harness main body 51 is less than 44 N (newton) (preferably less than 42 N, more preferably less than 38 N). The counterpart connector 57 is a connector of the other device (for example, the motor 47 or a housing). 44 N described above is the maximum value of bending load when the harness main body 51 is bent.

In the bending form of the harness main body, the lengths of the plurality of high-voltage wires 55 (55A and 55B) may be different from each other as shown in FIGS. 2A and 7A. In this case, a curvature radius of the longer high-voltage wire 55B is set larger than that of the shorter high-voltage wire 55A. The high-voltage wires 55A and 55B are formed to have the same configuration except for the length.

Note that, as for those shown in FIGS. 2A and 7A, the plurality of high-voltage wires 55 are arranged in the spread direction of the page space, and the respective high-voltage wires 55 are bent around an axis extending in a direction perpendicular to the page space.

On the other hand, although not shown, the plurality of high-voltage wires 55 may be arranged in the direction perpendicular to the page space, and the respective high-voltage wires 55 may be bent around an axis extending in the direction perpendicular to the page space, as in the case of those shown in FIGS. 2A and 7A. In the configuration in which the plurality of high-voltage wires 55 are arranged in the direction perpendicular to the page space, the respective high-voltage wires 55 have the same length and the same curvature radius of bending.

In a state where the installation (routing) of the wire harness 41 is completed with the connector 59 connected to the connector 61 and the connector 53 connected to the connector 57 as shown in FIGS. 2A and 7A, a curvature radius R of the bent portion of the harness main body 51 is 60 mm or less (for example, about 40 mm to 60 mm). More specifically, the curvature radius R is about 60 mm in FIG. 2A, while the curvature radius R is about 40 mm in FIG. 7A.

Furthermore, as for those shown in FIGS. 2A and 7A, the high-voltage wires 55A and 55B extend close to each other, and the interval between the high-voltage wires 55A and 55B (distance between the central axis of the high-voltage wire 55A and the central axis of the high-voltage wire 55B) is set slightly larger than the outside diameter of the high-voltage wires 55A and 55B. Note that the distance between the central axis of the high-voltage wire 55A and the central axis of the high-voltage wire 55B may be not more than twice the outside diameter of the high-voltage wires 55 (55A and 55B). Moreover, the interval between the high-voltage wires 55A and 55B is in the left-to-right direction of the page space in FIG. 2B and in the top-to-bottom direction of the page space in FIG. 7B.

The curvature radius R of the bent portion of the harness main body 51 shown in FIGS. 2A and 7A is of a portion where the curvature radius is minimized (a point on the inside of the surface of the inner high-voltage wire 55A shown in FIGS. 2A and 7A) in each of the high-voltage wires 55, for example. However, as the curvature radius R of the bent portion of the harness main body 51, the curvature radius of the central axis of the high-voltage wire 55A or 55B may be adopted, or a curvature radius of a point on the outside of the surface of the outer high-voltage wire 55B shown in FIGS. 2A and 7A may be adopted.

Moreover, in the state where the installation (routing) of the wire harness 41 is completed as shown in FIGS. 2A and 7A, a length LX of a straight portion of the harness main body 51 is not more than three times larger than the value of the outside diameter DX of the harness main body 51 (for example, one high-voltage wire 55) at a point where the harness main body 51 starts to extend from the connector 53 (59). Note that the length LX of the straight portion may be not more than ten times, not more than seven times, not more than five times, not more than two times or not more than one time larger than the outside diameter DX, instead of not more than three times described above.

Furthermore, the length LX of the straight portion may be "0". More specifically, in the state where the installation (routing) of the wire harness 41 is completed as shown in FIGS. 2A and 7A, no straight portion may be provided at the point where the harness main body 51 starts to extend from the connector 53 (59).

Moreover, the harness main body 51 includes an exterior part 63 (see FIGS. 2A to 2C, FIGS. 7A to 7C, FIG. 16, and FIG. 17) covering the periphery of the high-voltage wire 55. More specifically, the constituent members of the harness main body 51 include the high-voltage wires 55 and the cylindrical exterior part (for example, a corrugated tube made of synthetic resin) 63 in which the high-voltage wires 55 are installed. Note that the harness main body 51 may have a configuration without the exterior part 63. More specifically, the harness main body 51 may include only the high-voltage wires 55.

Also when the harness main body 51 includes the exterior part 63 in addition to the high-voltage wires 55, it is desirable that the length LX of the straight portion in the exterior part 63 is not more than three times, not more than ten times, not more than seven times, not more than five times, not more than two times or not more than one time larger than the value of the outside diameter DX of one high-voltage wire 55, or is "0".

Thus, the routing length can be reduced also in the wire harness 41 having the exterior part 63 such as a corrugated tube. Note that a height T1 (see FIGS. 16 and 17) of the exterior part 63 may be adopted, instead of the outside diameter DX of the high-voltage wire 55.

Even when the harness main body 51 includes the exterior part 63, the curvature radius of the portion where the curvature radius is minimized in each of the high-voltage wires 55 is adopted as the curvature radius of the harness main body 51 (curvature radius in the state where the installation of the wire harness 41 is completed). Instead, a curvature radius of a portion where the curvature radius of the exterior part 63 is minimized (a portion on the inner surface) may be adopted. Alternatively, a curvature radius of the central axis of the exterior part 63 may be adopted. Alternatively, a curvature radius of a portion where the curvature radius of the exterior part 63 is maximized (a portion on the outer surface) may be adopted.

As shown in FIGS. 2A and 7A, when the harness main body 51 (the high-voltage wires 55A and 55B) is bent, the bending load of the high-voltage wire 55A and the bending load of the high-voltage wire 55B are slightly different from each other, to be exact. However, since the high-voltage wires 55A and 55B are close to each other, the bending load of the high-voltage wire 55A and the bending load of the high-voltage wire 55B may be regarded as the same value.

Note that, although the harness main body 51 is bent in a two-dimensional mode in the above description, the harness main body 51 may be bent in a three-dimensional mode. More specifically, in the above description, the harness main body 51 is bent into an arc shape only around the axis extending in the direction perpendicular to the page space of FIGS. 2A to 2C and FIGS. 7A to 7C. In addition to this bending, the harness main body 51 may be simultaneously bent around the axis extending in the left-to-right direction or top-to-bottom direction of the page space of FIGS. 2A to 2C and FIGS. 7A to 7C.

Moreover, in the wire harness 41, when the harness main body 51 includes a plurality of constituent members, such constituent members are set in a predetermined combination regarding the bending load. The predetermined combination is a combination leading to the sum of the bending loads less than 44 N, based on bending load data (bending load data previously obtained by additional measurement) previously calculated for each of bending forms (bending modes) in each of the constituent members (the high-voltage wires 55 and the exterior part 63).

Here, description is given of, as an example, a case where the harness main body 51 includes only the high-voltage wires 55 without the exterior part 63.

Figure 2C:
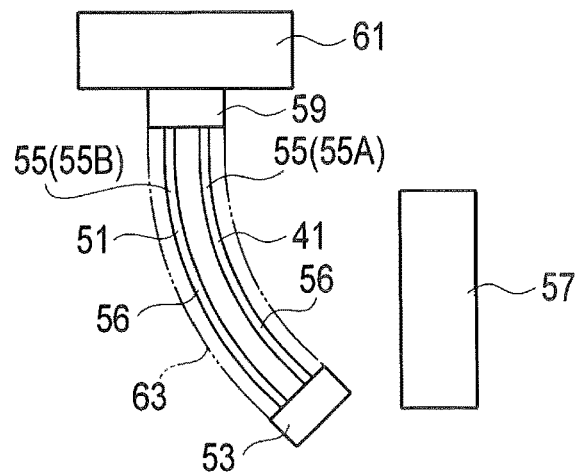
FIG. 2C is a diagram showing a state before installing the wire harness.

First, description is given of a case where the harness main body 51 is bent in the mode shown in FIGS. 2A to 2C and thereby the connector 53 is connected to the counterpart connector 57.

FIG. 3 shows a measurement result of the bending load (bending load of bending as shown in FIGS. 2A to 2C; maximum value of bending load) of the high-voltage wires 55 when the bending radius (curvature radius) R of the harness main body 51 is 60 mm. As the high-voltage wires 55, a high-voltage wire WA with a cover 56 made of cross-linked polyethylene, a high-voltage wire WB with a cover 56 made of flexible cross-linked polyethylene, a high-voltage wire WC with a cover 56 made of silicone rubber, a high-voltage wire WD with a cover 56 made of vinyl acetate rubber composition, and a high-voltage wire WE with a cover 56 made of flexible cross-linked polyethylene are adopted. The high-voltage wires WA, WB, WC, and WD have the same configuration except for the material of the cover 56.

The thickness of the cover (insulator) of each of the high-voltage wires WA to WE is 1.4 mm, and the outside diameter of each of the high-voltage wires WA to WE is 9.1 mm.

Note that the core (strand configuration) of the high-voltage wires WA, WB, WC, and WD is "0.32/19/26". In "0.32/19/26", 19 strands, each having a diameter of 0.32 mm, are twisted into one twisted wire, and 26 twisted wires are twisted into the core.

Moreover, the core of the high-voltage wire WE is "0.18/19/80". In "0.18/19/80", 19 strands, each having a diameter of 0.18 mm, are twisted into one twisted wire, and 80 twisted wires are twisted into the core.

The bending loads (bending loads previously obtained by measurement) of the high-voltage wires WA, WB, WC, WD, and WE in this event are 22 N, 16 N, 6 N, 8 N, and 12 N, respectively.

FIG. 4 shows bending loads when the harness main body is bent in the mode shown in FIGS. 2A to 2C by selecting (including redundant selections) two high-voltage wires from the high-voltage wires WA, WB, WC, WD, and WE, and combining the selected two high-voltage wires. The bending load of the two high-voltage wires is the sum of the bending load of one high-voltage wire and the bending load of another high-voltage wire.

FIG. 5 shows the result of a questionnaire for operators during an operation of connecting the connector 53 to the connector 57 by bending the high-voltage wires 55 into a ¼ arc shape as shown in FIGS. 2A to 2C.

The combinations of the high-voltage wires 55 are the same as those shown in FIG. 4. The load on the housing is the load shown in FIG. 4, which is the bending load of the high-voltage wires 55 combined.

Targets (operators; subjects) are twelve females and males, Female A, Female B, Female C, Female D, Female F, Female G, Female H, Female I, Male A, Male B, Male C, and Male D. "o" in the table of FIG. 5 means that the target (operator; subject) can perform the operation of bending the high-voltage wires 55 and thereby connecting the connector 53 to the connector 57 and that he/she can carry on the operation and "x" in the table of FIG. 5 means that the target (operator; subject) cannot perform the operation.

For example, in the connection operation of the wire harness 41 shown in FIGS. 2A to 2C, the harness main body 51 includes two high-voltage wires WA and the bending load at the bent portion of the harness main body 51 is 44 N, as shown in FIG. 5. In this case, Female A cannot perform the connection operation of the wire harness 41. Also, when the harness main body 51 includes one high-voltage wire WA and one high-voltage wire WB and the bending load at the bent portion of the harness main body 51 is 38 N, Female A can perform the connection operation of the wire harness 41.

Referring to FIG. 5 as a whole, it can be considered that the operator can perform the connection operation of the wire harness 41 when the bending load at the bent portion of the harness main body 51 is less than 44 N.

Figure 7C:
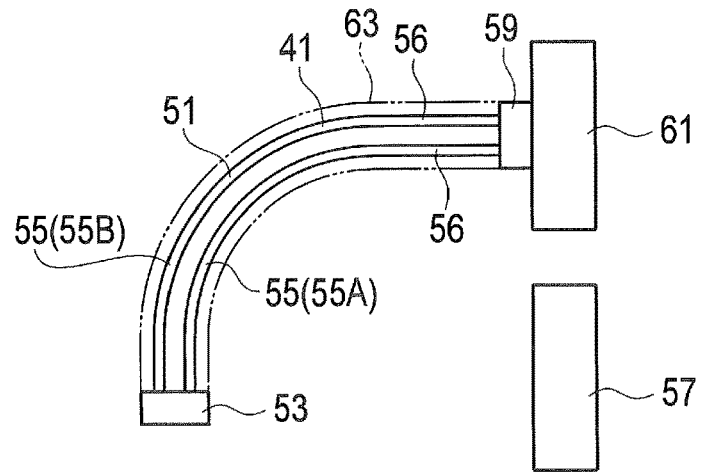
FIG. 7C is a diagram showing a state before installing the wire harness.

Next, description is given of a case where the harness main body 51 is bent in the mode shown in FIGS. 7A to 7C and thereby the connector 53 is connected to the counterpart connector 57.

FIG. 8 shows a measurement result of the bending load (bending load of bending as shown in FIGS. 7A to 7C; maximum value of bending load) of the high-voltage wires 55 when the bending radius (curvature radius) R of the harness main body 51 is 40 mm. As the high-voltage wires 55, a high-voltage wire WA with a cover 56 made of cross-linked polyethylene, a high-voltage wire WB with a cover 56 made of flexible cross-linked polyethylene, a high-voltage wire WC with a cover 56 made of silicone rubber, a high-voltage wire WD with a cover 56 made of vinyl acetate rubber composition, and a high-voltage wire WE with a cover 56 made of flexible cross-linked polyethylene are adopted as in the case of FIG. 3.

The thickness of the cover (insulator) of each of the high-voltage wires WA to WE is 1.4 mm, and the outside diameter of each of the high-voltage wires WA to WE is 9.1 mm, as in the case of FIG. 3.

Note that, as in the case of FIG. 3, the core (strand configuration) of the high-voltage wires WA, WB, WC, and WD is "0.32/19/26". Moreover, the core of the high-voltage wire WE is "0.18/19/80".

The bending loads (bending loads previously obtained by measurement) of the high-voltage wires WA, WB, WC, WD, and WE in this event are 43 N, 28 N, 13 N, 14 N, and 20 N, respectively.

FIG. 9 shows bending loads when the harness main body is bent in the mode shown in FIGS. 7A to 7C by selecting (including redundant selections) two high-voltage wires from the high-voltage wires WA, WB, WC, WD, and WE, and combining the selected two high-voltage wires, as in the case of FIG. 4. The bending load of the two high-voltage wires is the sum of the bending load of one high-voltage wire and the bending load of another high-voltage wire.

FIG. 10 shows the result of a questionnaire for operators during an operation of connecting the connector 53 to the connector 57 by bending the high-voltage wires 55 into a ½ arc shape as shown in FIGS. 7A to 7C.

The combinations of the high-voltage wires 55 are the same as those shown in FIG. 9. The load on the housing is the same as that in the case of FIG. 5.

As in the case of FIG. 5, targets are twelve females and males, Female A, Female B, Female C, Female D, Female F, Female G, Female H, Female I, Male A, Male B, Male C, and Male D.

For example, in the connection operation of the wire harness 41 shown in FIGS. 7A to 7C, when the harness main body 51 includes two high-voltage wires WB and the bending load at the bent portion of the harness main body 51 is 56 N, Female A cannot perform the connection operation of the wire harness 41, as shown in FIG. 10. Also, when the harness main body 51 includes one high-voltage wire WB and one high-voltage wire WD and the bending load at the bent portion of the harness main body 51 is 42 N, Female A can perform the connection operation of the wire harness 41.

Referring to FIG. 10 as a whole, as in the case of FIG. 5, it can be considered that the operator can perform the connection operation of the wire harness 41 when the bending load at the bent portion of the harness main body 51 is less than 42 N.

Next, description is given of, as an example, a case where the harness main body 51 includes the exterior part 63 and the high-voltage wires 55.

Figure 16:
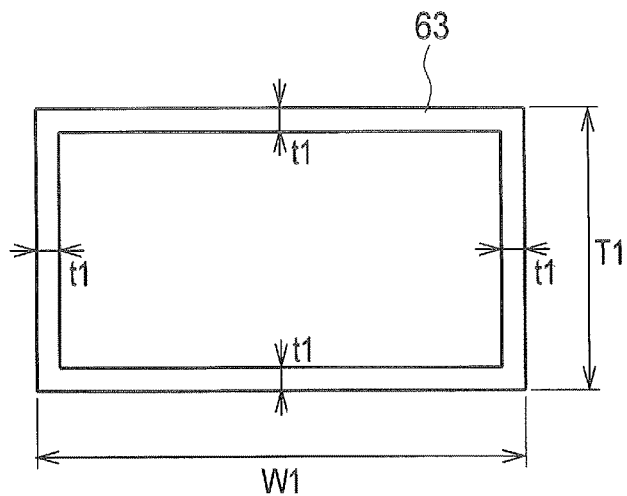
FIG. 16 is a diagram showing a cross-sectional shape of an exterior part.

The exterior part 63 has a rectangular cross-section (cross-section along the plane perpendicular to the longitudinal direction) as shown in FIG. 16, for example. Thus, the exterior part 63 has the shape of a rectangular tube and is configured to have a plurality of high-voltage wires 55 installed therein. Note that the cross-sectional shape of the exterior part 63 may be another shape such as circular shape.

A width W1 of the exterior part 63 is a predetermined value, and a height T1 thereof is also a predetermined value. The exterior part 63 has a wall thickness of "t1".

Note that, in the above description, the cross-sectional shape of the exterior part 63 is a fixed shape. However, the cross-sectional shape may change periodically. More specifically, the exterior part 63 may have a shape in which a large-diameter part and a small-diameter part are alternately repeated in the longitudinal direction (corrugated tube).

Figure 17:
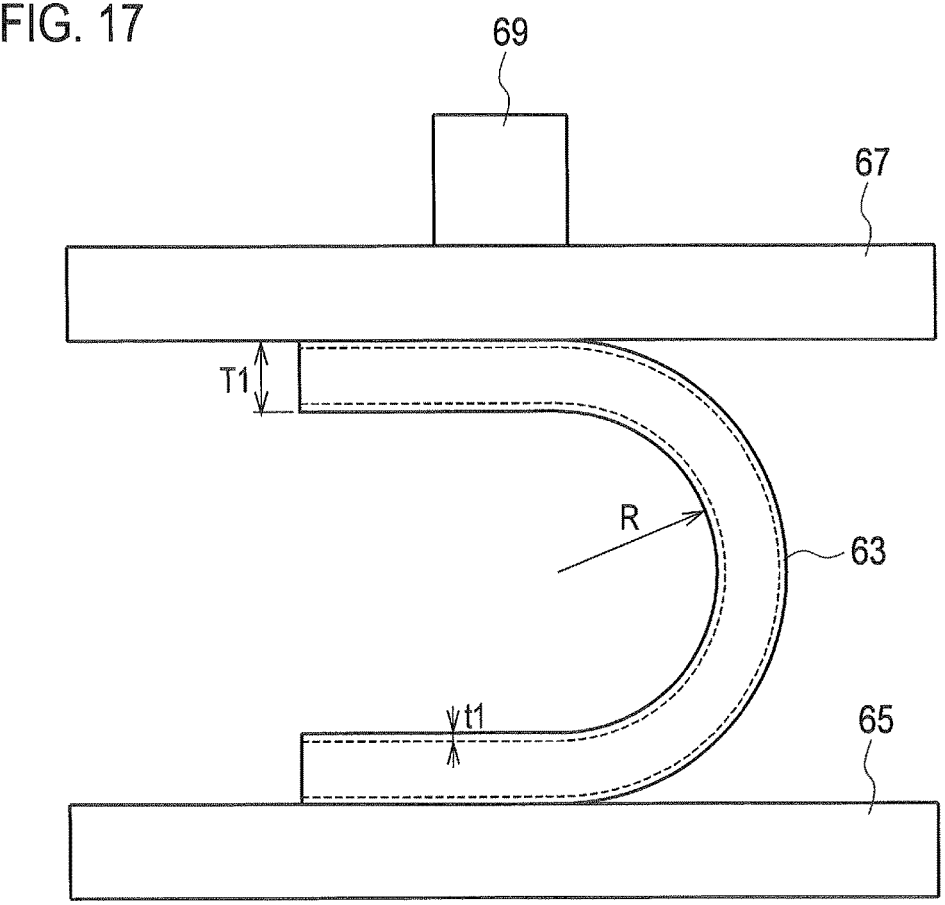
FIG. 17 is a diagram showing a method for measuring a bending load of the exterior part.

FIG. 18 shows a measurement result of the bending load in the mode shown in FIG. 17 when the bending radius (curvature radius) R of the exterior part 63 and the wall thickness t1 are changed. For example, when the wall thickness t1 of the exterior part 63 is 0.15 mm and the bending radius R is 50 mm, the bending load (for example, the maximum value of the bending load) of the exterior part 63 is 2.27 N.

Note that FIG. 18 also shows, as an example, cases where the bending radius R is "50 mm", "35 mm", and "25 mm". The bending load when the bending radius R is 60 mm is slightly smaller than that when the bending radius R is 50 mm. Meanwhile, the bending load when the bending radius R is 40 mm is a value between the bending load when the bending radius R is 50 mm and the bending load when the bending radius R is 35 mm.

When the harness main body 51 includes the exterior part 63 and the high-voltage wires 55, the sum of the bending load of the exterior part 63 and the bending load of the high-voltage wires 55 may be set to less than 44 N in the operation shown in FIGS. 2A to 2C or FIGS. 7A to 7C.

For example, in the case of a connection operation where the bending radius R is 40 mm in the mode shown in FIGS. 7A to 7C, two high-voltage wires WD shown in FIG. 9 and the exterior part 63 having the wall thickness t1 of 0.4 mm shown in FIG. 18 are used in combination. In this case, the sum of the bending load of the two high-voltage wires WD and the bending load of the exterior part 63 having the wall thickness t1 of 0.4 mm is an approximated value of 28 N+9.09 N=37.09 N, which is slightly smaller than 37.09 N. This is because 9.09 N results from the bending radius R being 35 mm, which is slightly smaller than 40 mm, as shown in FIG. 18.

Figure 13:
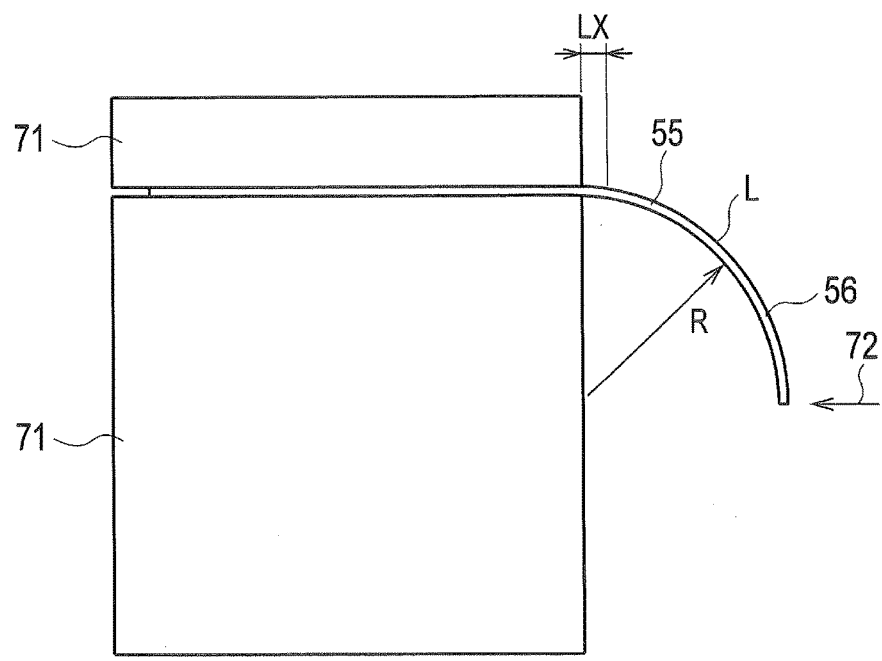
FIG. 13 is a diagram showing a method for measuring the bending load of the high-voltage wire.

Here, with reference to FIGS. 6 and 13, description is given, with examples, of a method for obtaining the bending load data shown in FIGS. 3 and 8.

In FIG. 6, the relationship between the bending load and the bending radius R of the high-voltage wire 55, and the like are measured using a support 65, a support 67 movable in a direction of approaching or separating from the support 65, and a load measuring device 69 such as a load cell.

More specifically, one high-voltage wire 55 is placed between the support 65 and the support 67, the support 67 is lowered closer to the support 65, and the high-voltage wire 55 is bent into a semicircular shape until a target bending radius (bending radius on which data is wished to be obtained) R is obtained. The reaction force of the high-voltage wire 55 in this event is measured by the load cell 69.

Various bending load data corresponding to the kind of the high-voltage wire 55 and the bending radius R can be obtained by changing the kind of the high-voltage wire 55 and the target bending radius R.

In FIG. 13, the relationship between the bending load and the bending radius R of the high-voltage wire 55, and the like are measured using a pair of supports 71 and a load measuring device 72 such as a push-pull gauge.

More specifically, one end of the high-voltage wire 55 is fixed by sandwiching the one end thereof between the pair of supports 71. In this state, the other end of the high-voltage wire 55 is pushed (see the arrow) using the push-pull gauge 72 to be bent into a ¼ arc shape until a target bending radius (bending radius on which data is wished to be obtained) R is obtained. The reaction force of the high-voltage wire 55 in this event is measured by the push-pull gauge 72.

As in the above case, various bending load data corresponding to the kind of the high-voltage wire 55 and the bending radius R can be obtained by changing the kind of the high-voltage wire 55 and the target bending radius R.

Note that, in FIG. 13, all the part of the high-voltage wire 55 extending from the pair of supports 71 is bent into the arc shape. However, a part corresponding to the length LX where the high-voltage wire 55 starts to extend from the pair of supports 71 may also be straight.

In FIG. 17, as in the case of FIG. 6, the relationship between the bending load and the bending radius R of the exterior part 63, for example, is measured using a support 65, a support 67 movable in a direction of approaching or separating from the support 65, and a load measuring device 69 such as a load cell. Moreover, the relationship between the bending load and the bending radius R of the exterior part 63, and the like are also measured in the mode shown in FIG. 13.

Figure 24:
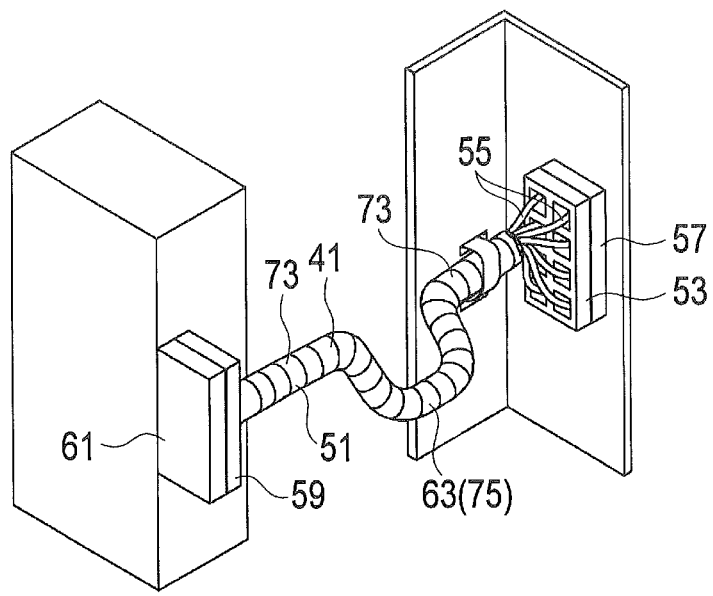
FIG. 24 is a diagram showing another mode of bending the wire harness according to the first embodiment of the present invention.
Figure 25:
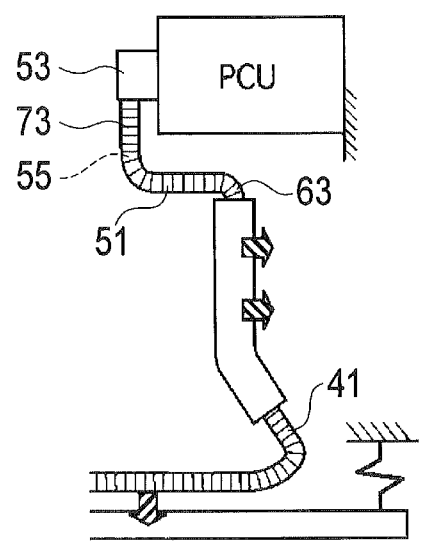
FIG. 25 is a diagram showing another mode of bending the wire harness according to the first embodiment of the present invention.

Meanwhile, in the wire harness 41, the previously obtained bending load data indicates the bending form in which a part (or at least a part) of the harness main body 51 is bent as shown in FIGS. 2A to 2C or FIGS. 7A to 7C. For example, in FIGS. 2A to 2C and FIGS. 7A to 7C, there are straight portions 73 near the connectors 53 and 59. The same goes for FIGS. 22 to 25 (to be described in detail later) showing other bending modes of the high-voltage wires 55. In FIGS. 24 and 25, the high-voltage wires 55 clearly have straight portions 73.

Moreover, when the constituent members are the high-voltage wires 55, the previously obtained bending load data includes data indicating a correlation (relationship) between the curvature radius R and the bending load of the high-voltage wire 55 and data indicating a correlation (relationship) between the diameter (for example, the diameter of the core) of the high-voltage wire 55 and the bending load thereof.

Meanwhile, when the constituent member is the exterior part 63, the previously obtained bending load data is data indicating a correlation (relationship) between the wall thickness t1 and the bending load of the corrugated tube 63.

Next, detailed description is given. FIG. 11 is a graph showing a relationship between the bending radius R of the high-voltage wire 55 and the bending load of the high-voltage wire 55. The high-voltage wire WD shown in FIGS. 2A to 2C is used as the high-voltage wire 55.

The horizontal axis (x-axis) of FIG. 11 represents the bending radius R (unit=mm) and the vertical axis (y-axis) represents the bending load (unit=N; newton). The bending loads when the bending radius R is 40 mm, 60 mm, 80 mm, and 100 mm are actually obtained (x-coordinates and y-coordinates at multiple points are obtained), and an approximate equation connecting such points is obtained, resulting in the approximate equation (f1) $y=38.039\times10^{-0.025x}$.

Figure 12:
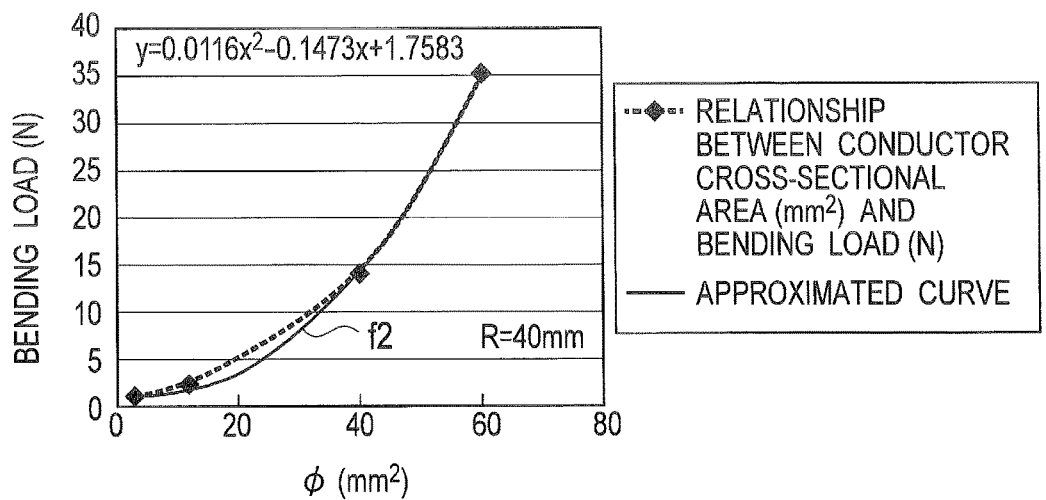
FIG. 12 is a graph showing a relationship between a conductor cross-sectional area of the high-voltage wire and the bending load of the high-voltage wire in the case shown in FIG. 6.

FIG. 12 is a graph showing a relationship between the conductor cross-sectional area φ (cross-sectional area of the core along the plane perpendicular to the extending direction of the core) of the high-voltage wire 55 and the bending load of the high-voltage wire 55. As the high-voltage wire 55, a high-voltage wire obtained by changing the conductor cross-sectional area φ (outside diameter) of the core in the high-voltage wire WD shown in FIGS. 2A to 2C and the like is used. The conductor cross-sectional area φ of the high-voltage wire 55 is equivalent to the outside diameter of the conductor in the high-voltage wire 55.

The horizontal axis (x-axis) of FIG. 12 represents cross-sectional area φ (unit=mm$^2$) of the core and the vertical axis (y-axis) represents the bending load (unit=N). The bending loads when the cross-sectional area φ of the core is 3 mm$^2$, 12 mm$^2$, 40 mm$^2$, and 60 mm$^2$ are actually obtained (x-coordinates and y-coordinates at multiple points are obtained), and an approximate equation connecting such points is obtained, resulting in the approximate equation (f2) $y=0.0116x^2-0.1473x+1.7583$.

Figure 14:
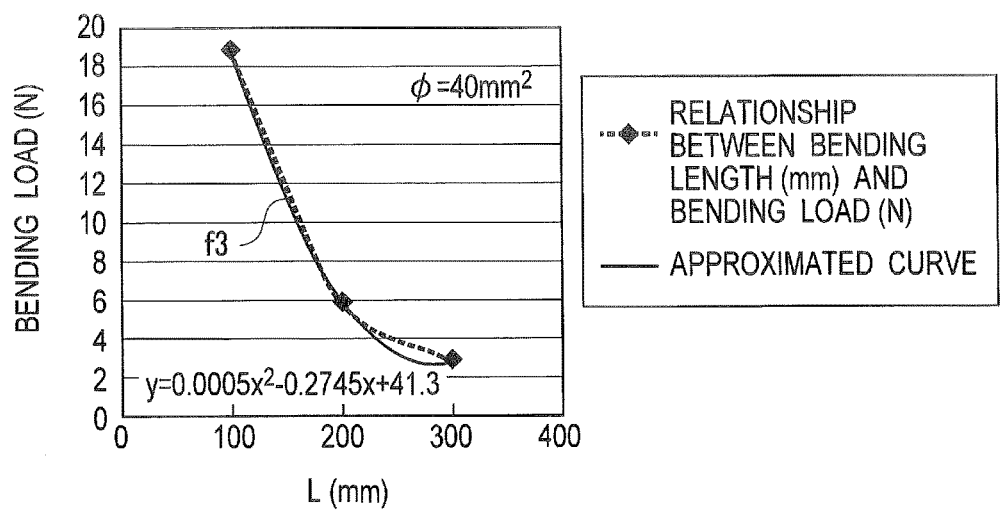
FIG. 14 is a graph showing a relationship between a length of a bent portion of the high-voltage wire and the bending load of the high-voltage wire in the case shown in FIG. 13.

FIG. 14 is a graph showing a relationship between the length L of the bent portion of the high-voltage wire 55, which is equivalent to the bending radius R of the high-voltage wire 55, and the bending load of the high-voltage wire 55. The high-voltage wire WD shown in FIGS. 2A to 2C and the like is used as the high-voltage wire 55.

The horizontal axis (x-axis) of FIG. 14 represents the bending length L (unit=mm) and the vertical axis (y-axis) represents the bending load (unit=N). As in the case of FIGS. 11 and 12, an approximate equation (f3) $y=0.0005x^2-0.2745x+41.3$ is obtained.

Figure 15:
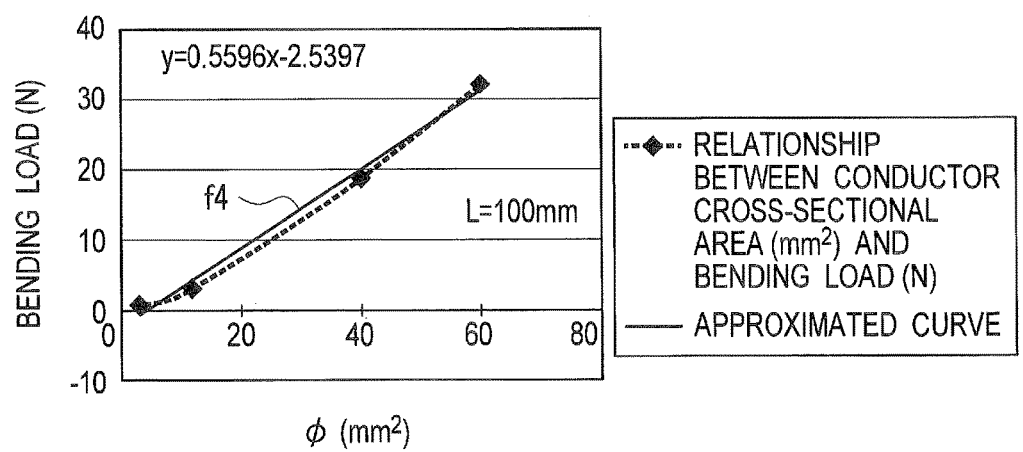
FIG. 15 is a graph showing a relationship between a conductor cross-sectional area of the high-voltage wire and the bending load of the high-voltage wire in the case shown in FIG. 13.

FIG. 15 is a graph showing a relationship between the conductor cross-sectional area φ of the high-voltage wire 55 and the bending load of the high-voltage wire 55. As the high-voltage wire 55, a high-voltage wire obtained by changing the outside diameter of the core in the high-voltage wire WD shown in FIGS. 2A to 2C and the like is used.

The horizontal axis (x-axis) of FIG. 15 represents the cross-sectional area φ (unit=mm$^2$) of the core and the vertical axis (y-axis) represents the bending load (unit=N). As in the case of FIGS. 11 and 12, an approximate equation (f4) $y=0.5596x-2.5397$ is obtained.

FIGS. 19A to 19C, FIGS. 20A to 20C, and FIGS. 21A to 21C are graphs showing the bending load of the exterior part 63 in the case of FIG. 17 (graphically showing the table of FIG. 18).

Figure 19A:
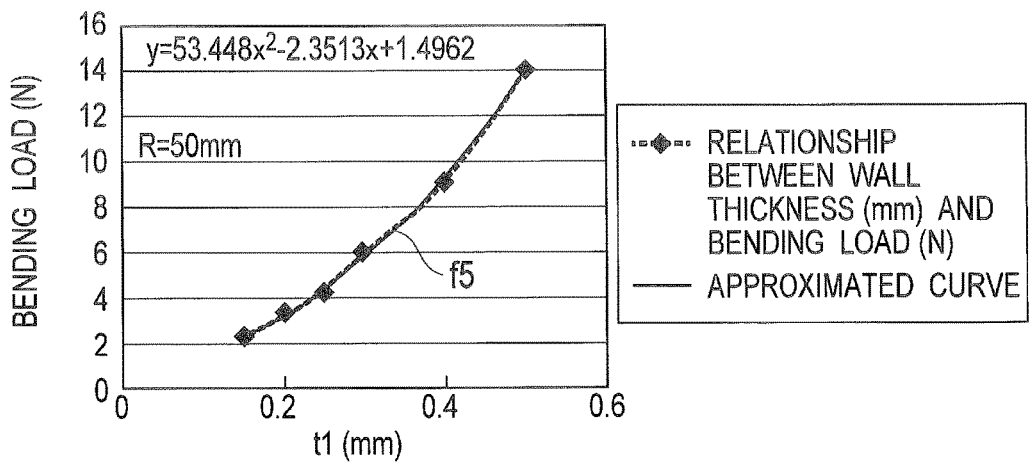
FIG. 19A is a graph showing the table of FIG. 18.

FIG. 19A is a graph showing the relationship between the wall thickness t1 and the bending load of the exterior part 63 when the bending radius R of the exterior part 63 is 50 mm.

The horizontal axis (x-axis) of FIG. 19A represents the wall thickness t1 (unit=mm) of the exterior part 63 and the vertical axis (y-axis) represents the bending load (unit=N). As in the case of FIGS. 11 and 12, an approximate equation (f5) $y=53.448x^2-2.5315x+1.4962$ is obtained.

Figure 19B:
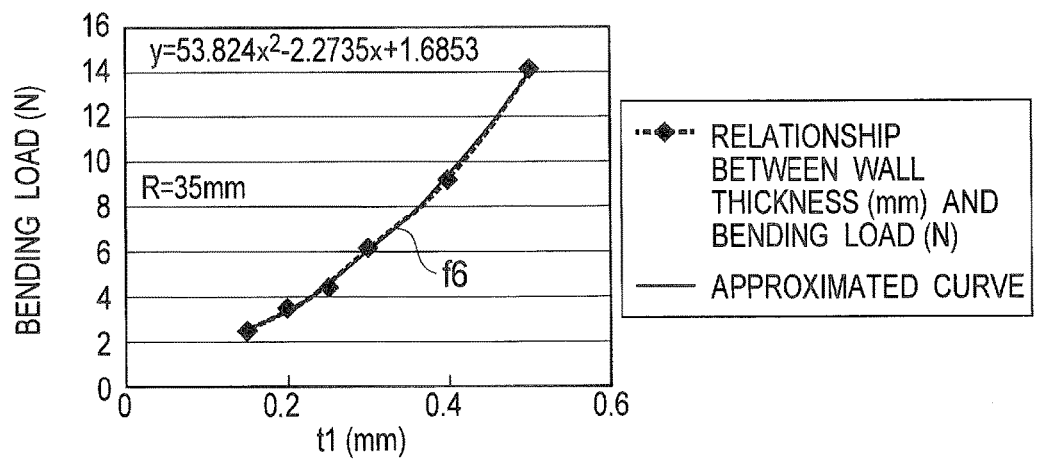
FIG. 19B is a graph showing the table of FIG. 18.

FIG. 19B is a graph showing the relationship between the wall thickness t1 and the bending load of the exterior part 63 when the bending radius R of the exterior part 63 is 35 mm.

The horizontal axis (x-axis) of FIG. 19B represents the wall thickness t1 (unit=mm) of the exterior part 63 and the vertical axis (y-axis) represents the bending load (unit=N). As in the case of FIGS. 11 and 12, an approximate equation (f6) $y=53.4824x^2-2.2735x+1.6853$ is obtained.

Figure 19C:
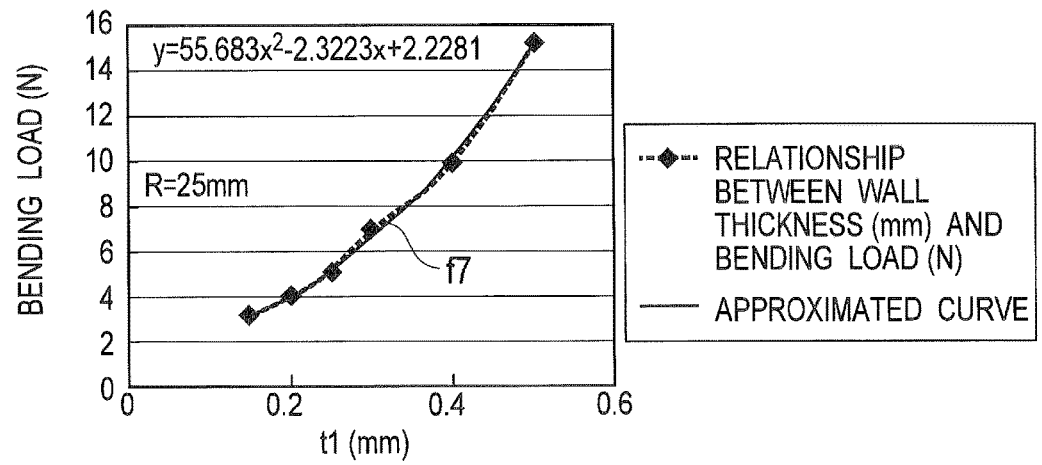
FIG. 19C is a graph showing the table of FIG. 18.

FIG. 19C is a graph showing the relationship between the wall thickness t1 and the bending load of the exterior part 63 when the bending radius R of the exterior part 63 is 25 mm.

The horizontal axis (x-axis) of FIG. 19C represents the wall thickness t1 (unit=mm) of the exterior part 63 and the vertical axis (y-axis) represents the bending load (unit=N). As in the case of FIGS. 11 and 12, an approximate equation (f7) $y=56.683x^2-2.3223x+2.2281$ is obtained.

Figure 20A:
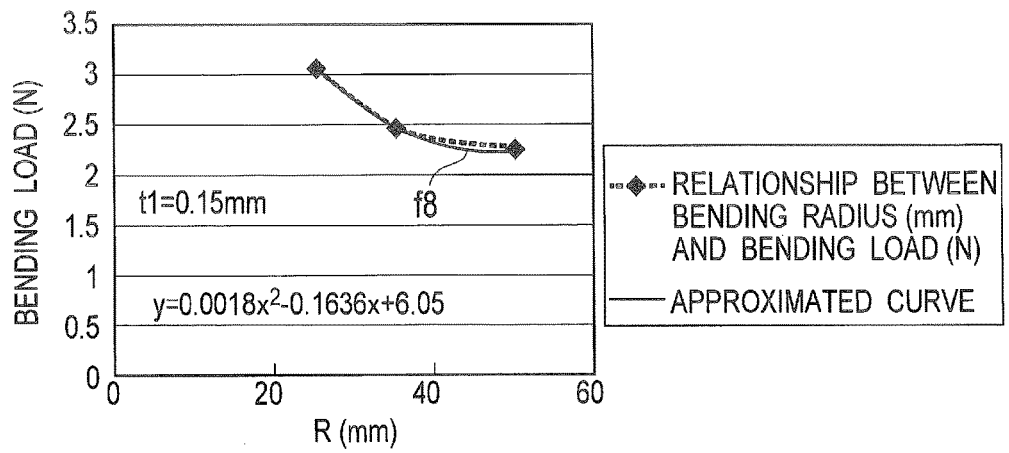
FIG. 20A is a graph showing the table of FIG. 18.

FIG. 20A is a graph showing the relationship between the bending radius R and the bending load of the exterior part 63 when the wall thickness t1 of the exterior part 63 is 0.15 mm.

The horizontal axis (x-axis) of FIG. 20A represents the bending radius R (unit=mm) of the exterior part 63 and the vertical axis (y-axis) represents the bending load (unit=N). As in the case of FIGS. 11 and 12, an approximate equation (f8) $y=0.0018x^2-0.1636x+6.05$ is obtained.

Figure 20B:
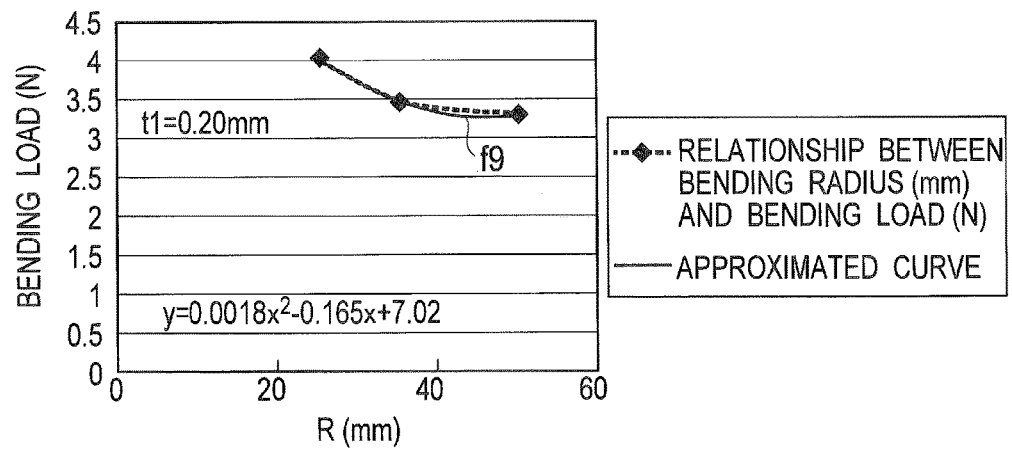
FIG. 20B is a graph showing the table of FIG. 18.

FIG. 20B is a graph showing the relationship between the bending radius R and the bending load of the exterior part 63 when the wall thickness t1 of the exterior part 63 is 0.20 mm.

The horizontal axis (x-axis) of FIG. 20B represents the bending radius R (unit=mm) of the exterior part 63 and the vertical axis (y-axis) represents the bending load (unit=N). As in the case of FIGS. 11 and 12, an approximate equation (f9) $y=0.0018x^2-0.165x+7.02$ is obtained.

Figure 20C:
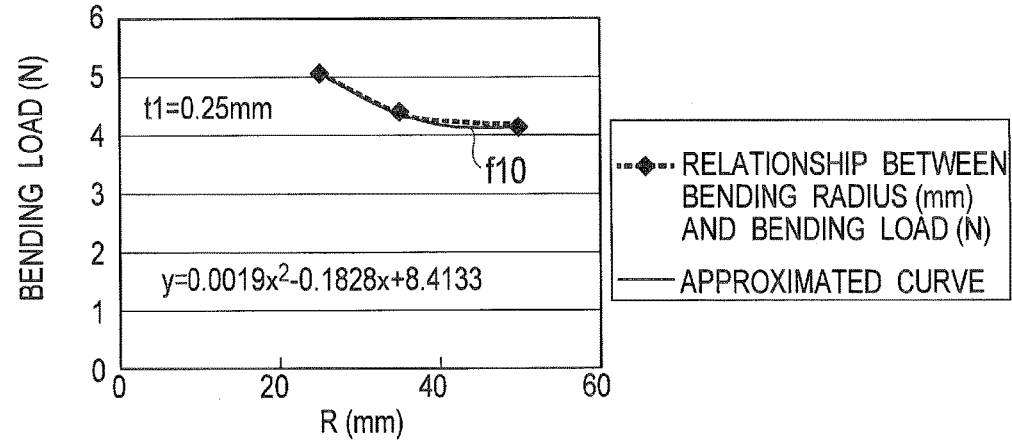
FIG. 20C is a graph showing the table of FIG. 18.

FIG. 20C is a graph showing the relationship between the bending radius R and the bending load of the exterior part 63 when the wall thickness t1 of the exterior part 63 is 0.25 mm.

The horizontal axis (x-axis) of FIG. 20C represents the bending radius R (unit=mm) of the exterior part 63 and the vertical axis (y-axis) represents the bending load (unit=N). As in the case of FIGS. 11 and 12, an approximate equation (f10) $y=0.0019x^2-0.1828x+8.4133$ is obtained.

Figure 21A:
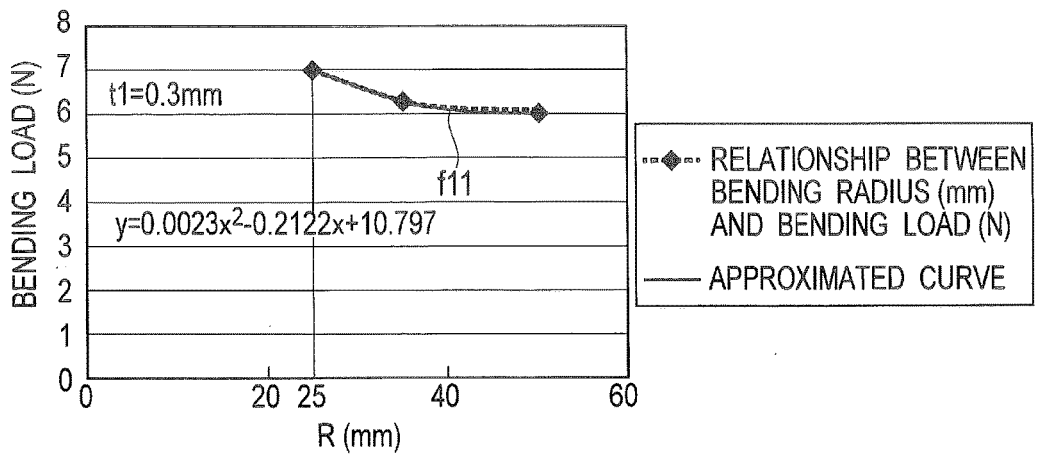
FIG. 21A is a graph showing the table of FIG. 18.

FIG. 21A is a graph showing the relationship between the bending radius R and the bending load of the exterior part 63 when the wall thickness t1 of the exterior part 63 is 0.30 mm.

The horizontal axis (x-axis) of FIG. 21A represents the bending radius R (unit=mm) of the exterior part 63 and the vertical axis (y-axis) represents the bending load (unit=N). As in the case of FIGS. 11 and 12, an approximate equation (f11) $y=0.0023x^2-0.2122x+10.797$ is obtained.

Figure 21B:
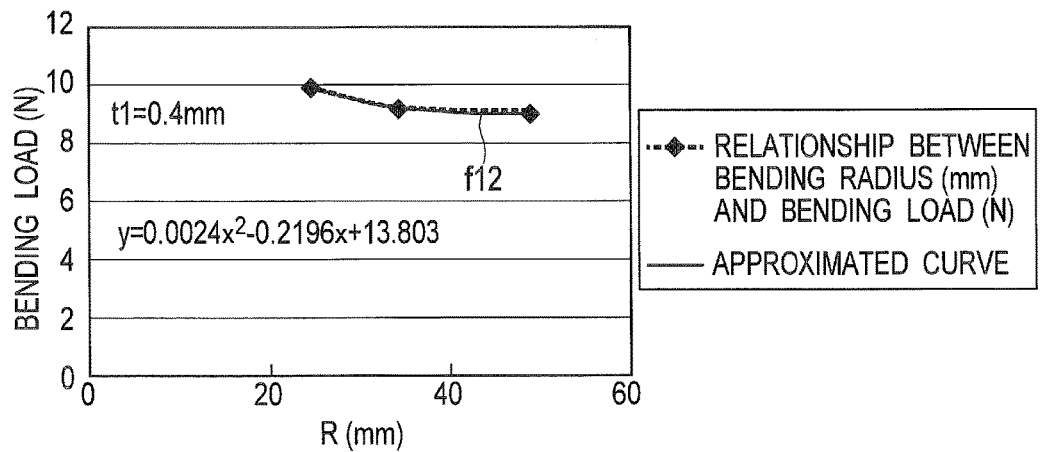
FIG. 21B is a graph showing the table of FIG. 18.

FIG. 21B is a graph showing the relationship between the bending radius R and the bending load of the exterior part 63 when the wall thickness t1 of the exterior part 63 is 0.40 mm.

The horizontal axis (x-axis) of FIG. 21B represents the bending radius R (unit=mm) of the exterior part 63 and the vertical axis (y-axis) represents the bending load (unit=N). As in the case of FIGS. 11 and 12, an approximate equation (f12) $y=0.0024x^2-0.2196x+13.803$ is obtained.

Figure 21C:
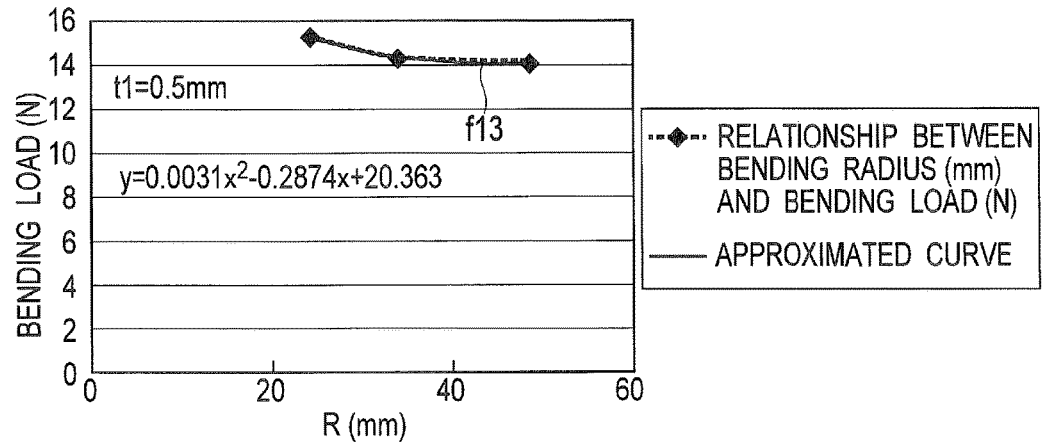
FIG. 21C is a graph showing the table of FIG. 18.

FIG. 21C is a graph showing the relationship between the bending radius R and the bending load of the exterior part 63 when the wall thickness t1 of the exterior part 63 is 0.50 mm.

The horizontal axis (x-axis) of FIG. 21C represents the bending radius R (unit=mm) of the exterior part 63 and the vertical axis (y-axis) represents the bending load (unit=N). As in the case of FIGS. 11 and 12, an approximate equation (f13) $y=0.0031x^2-0.2874x+20.363$ is obtained.

FIG. 26 is a table showing a relationship between the length L of the bent portion of each of the high-voltage wires 55, which is equivalent to the bending radius R of the high-voltage wire 55, and the bending load of the high-voltage wire 55, using the high-voltage wires WA, WB, and WD shown in FIG. 3 and the like as the high-voltage wires 55.

Figure 27A:
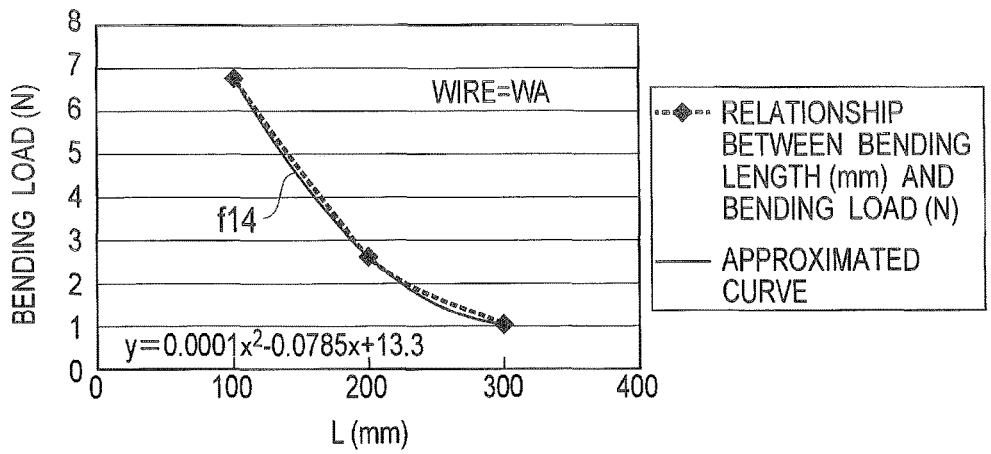
FIG. 27A is a graph showing the table of FIG. 26.
Figure 27B:
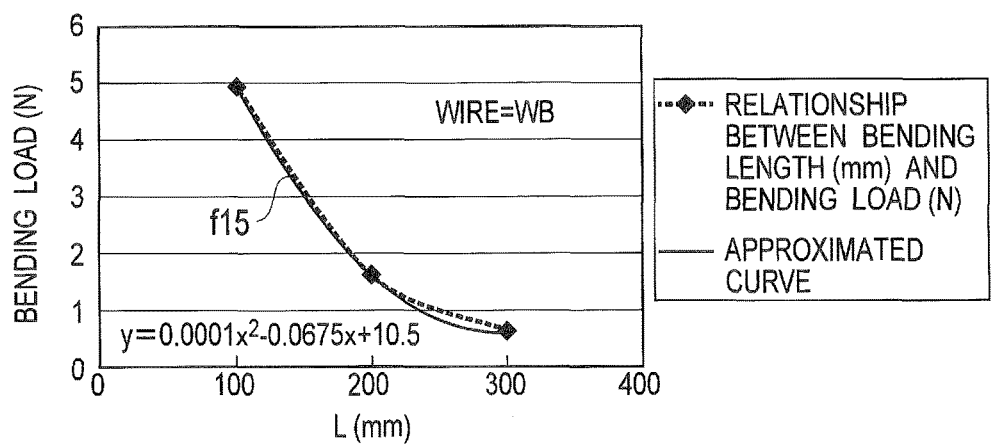
FIG. 27B is a graph showing the table of FIG. 26.
Figure 27C:
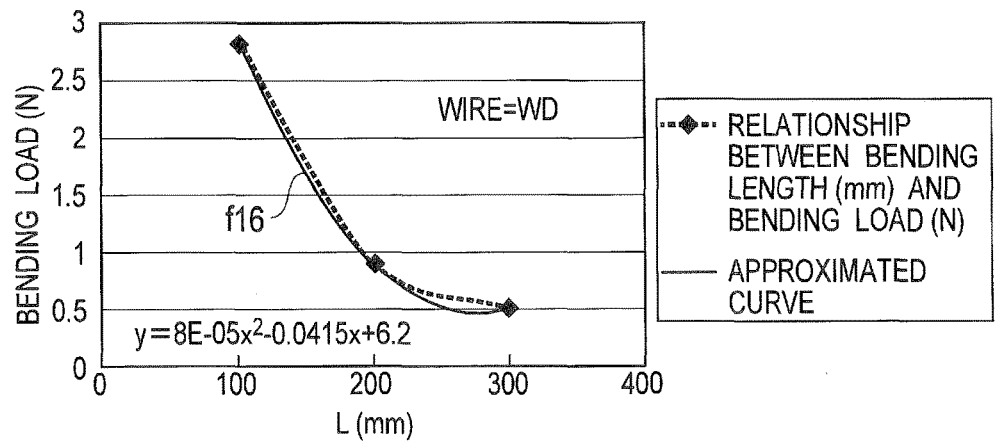
FIG. 27C is a graph showing the table of FIG. 26.

FIGS. 27A to 27C graphically show the table of FIG. 26.

FIG. 27A is a graph showing the relationship between the length L of the bent portion of the high-voltage wire 55, that is the high-voltage wire WA, and the bending load of the high-voltage wire 55.

The horizontal axis (x-axis) of FIG. 27A represents the bending length L (unit=mm) and the vertical axis (y-axis) represents the bending load (unit=N). As in the case of FIGS. 11 and 12, an approximate equation (f14) $y=0.0001x^2-0.0785x+13.3$ is obtained.

FIG. 27B is a graph showing the relationship between the length L of the bent portion of the high-voltage wire 55, that is the high-voltage wire WB, and the bending load of the high-voltage wire 55.

The horizontal axis (x-axis) of FIG. 27B represents the bending length L (unit=mm) and the vertical axis (y-axis) represents the bending load (unit=N). As in the case of FIGS. 11 and 12, an approximate equation (f15) $y=0.0001x^2-0.0675x+10.5$ is obtained.

FIG. 27C is a graph showing the relationship between the length L of the bent portion of the high-voltage wire 55, that is the high-voltage wire WD, and the bending load of the high-voltage wire 55.

The horizontal axis (x-axis) of FIG. 27C represents the bending length L (unit=mm) and the vertical axis (y-axis) represents the bending load (unit=N). As in the case of FIGS. 11 and 12, an approximate equation (f16) $y=8\times10^{-5}x^2-0.0415x+6.2$ is obtained.

FIG. 28 is a table showing the relationship among the cross-sectional area φ of the core of the high-voltage wire 55, the length L of the bent portion of the high-voltage wire 55, which is equivalent to the bending radius R of the high-voltage wire 55, and the bending load of the high-voltage wire 55, using the high-voltage wire WD shown in FIG. 3 and the like as the high-voltage wire 55 in the case shown in FIG. 13.

FIGS. 29A to 29D and FIGS. 30A to 30C graphically show the table of FIG. 28.

Figure 29A:
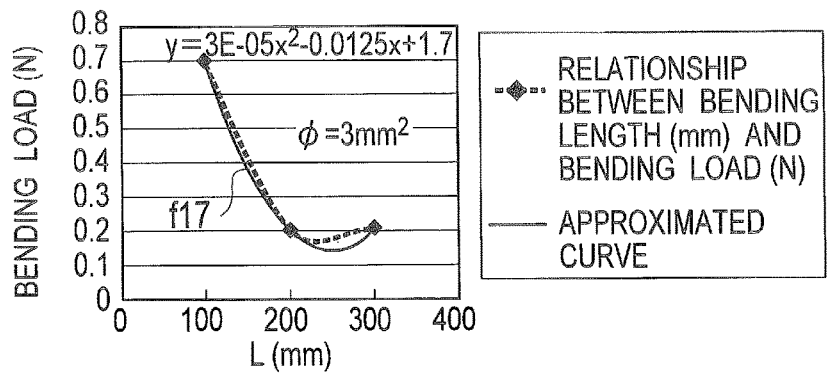
FIG. 29A is a graph showing the table of FIG. 28.

FIG. 29A is a graph showing the relationship between the length L of the bent portion of the high-voltage wire 55 and the bending load of the high-voltage wire 55 when the cross-sectional area φ of the core of the high-voltage wire 55 is 3 mm².

The horizontal axis (x-axis) of FIG. 29A represents the bending length L (unit=mm) and the vertical axis (y-axis) represents the bending load (unit=N). As in the case of FIGS. 11 and 12, an approximate equation (f17) $y=3\times10^{-5}x^2-0.0125x+1.7$ is obtained.

Figure 29B:
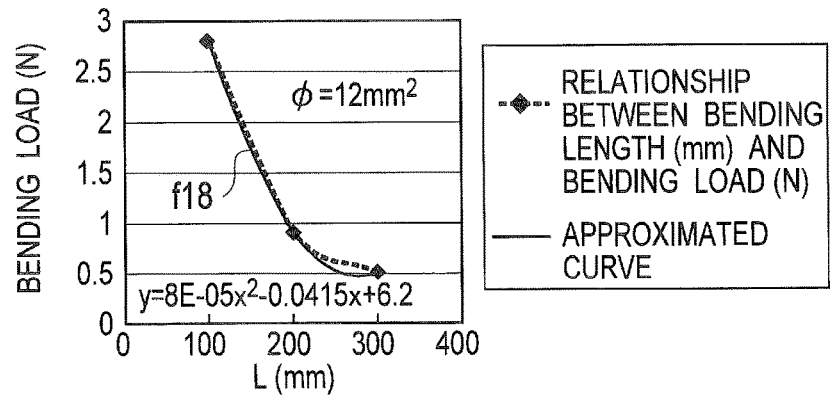
FIG. 29B is a graph showing the table of FIG. 28.

FIG. 29B is a graph showing the relationship between the length L of the bent portion of the high-voltage wire 55 and the bending load of the high-voltage wire 55 when the cross-sectional area φ of the core of the high-voltage wire 55 is 12 mm².

The horizontal axis (x-axis) of FIG. 29B represents the bending length L (unit=mm) and the vertical axis (y-axis) represents the bending load (unit=N). As in the case of FIGS. 11 and 12, an approximate equation (f18) $y=8\times10^{-5}x^2-0.0415x+6.2$ is obtained.

Figure 29C:
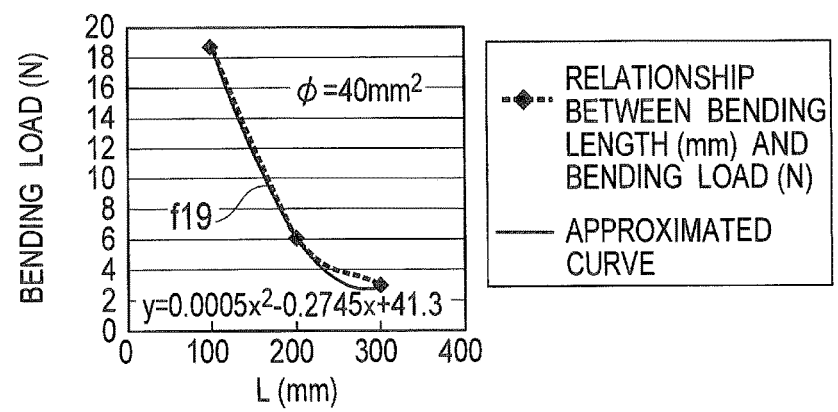
FIG. 29C is a graph showing the table of FIG. 28.

FIG. 29C is a graph showing the relationship between the length L of the bent portion of the high-voltage wire 55 and the bending load of the high-voltage wire 55 when the cross-sectional area φ of the core of the high-voltage wire 55 is 40 mm².

The horizontal axis (x-axis) of FIG. 29C represents the bending length L (unit=mm) and the vertical axis (y-axis) represents the bending load (unit=N). As in the case of FIGS. 11 and 12, an approximate equation (f19) $y=0.0005x^2-0.2745x+41.3$ is obtained.

Figure 29D:
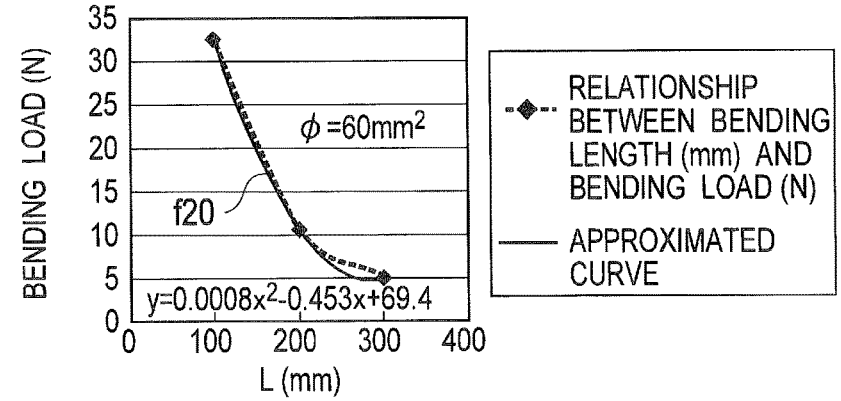
FIG. 29D is a graph showing the table of FIG. 28.

FIG. 29D is a graph showing the relationship between the length L of the bent portion of the high-voltage wire 55 and the bending load of the high-voltage wire 55 when the cross-sectional area φ of the core of the high-voltage wire 55 is 60 mm².

The horizontal axis (x-axis) of FIG. 29D represents the bending length L (unit=mm) and the vertical axis (y-axis) represents the bending load (unit=N). As in the case of FIGS. 11 and 12, an approximate equation (f20) $y=0.0008x^2-0.453x+69.4$ is obtained.

Figure 30A:
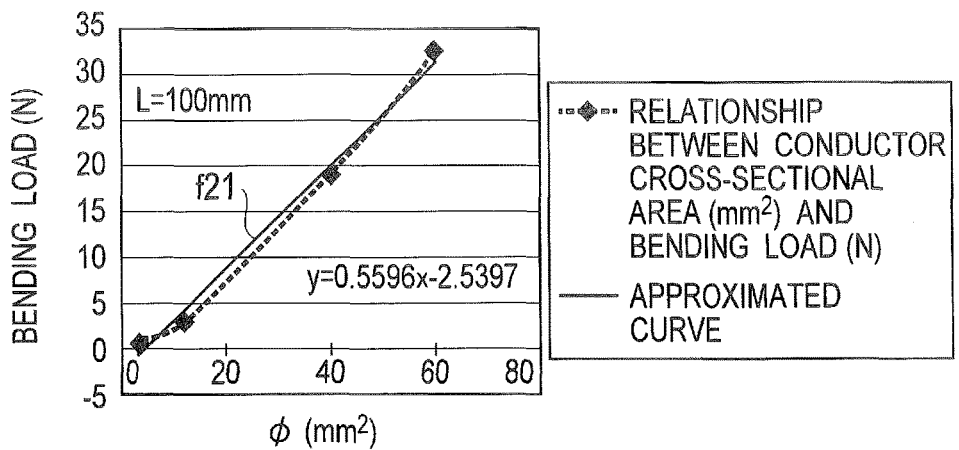
FIG. 30A is a graph showing the table of FIG. 28.

FIG. 30A is a graph showing the relationship between the cross-sectional area φ of the core of the high-voltage wire 55 and the bending load of the high-voltage wire 55 when the length L of the bent portion of the high-voltage wire 55 is 100 mm.

The horizontal axis (x-axis) of FIG. 30A represents the cross-sectional area φ of the core (unit=mm$^2$) and the vertical axis (y-axis) represents the bending load (unit=N). As in the case of FIGS. 11 and 12, an approximate equation (f21) y=0.5596x−2.5397 is obtained.

Figure 30B:
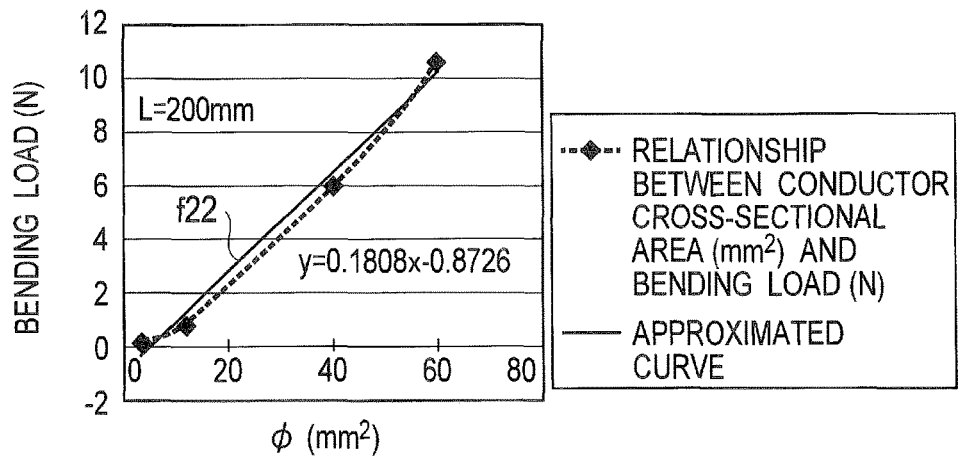
FIG. 30B is a graph showing the table of FIG. 28.

FIG. 30B is a graph showing the relationship between the cross-sectional area φ of the core of the high-voltage wire 55 and the bending load of the high-voltage wire 55 when the length L of the bent portion of the high-voltage wire 55 is 200 mm.

The horizontal axis (x-axis) of FIG. 30B represents the cross-sectional area φ of the core (unit=mm$^2$) and the vertical axis (y-axis) represents the bending load (unit=N). As in the case of FIGS. 11 and 12, an approximate equation (f22) y=0.1808x−0.8726 is obtained.

Figure 30C:
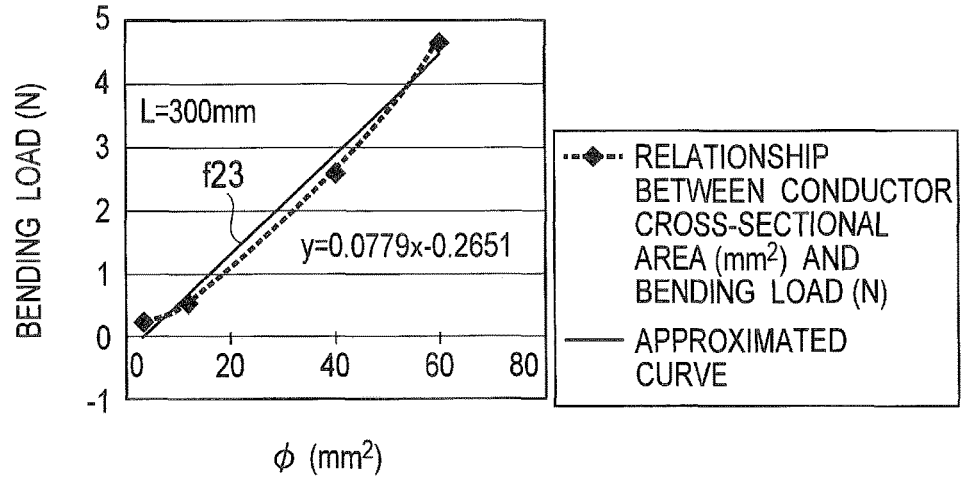
FIG. 30C is a graph showing the table of FIG. 28.

FIG. 30C is a graph showing the relationship between the cross-sectional area φ of the core of the high-voltage wire 55 and the bending load of the high-voltage wire 55 when the length L of the bent portion of the high-voltage wire 55 is 300 mm.

The horizontal axis (x-axis) of FIG. 30C represents the cross-sectional area φ of the core (unit=mm$^2$) and the vertical axis (y-axis) represents the bending load (unit=N). As in the case of FIGS. 11 and 12, an approximate equation (f23) y=0.0779x−0.2651 is obtained.

FIG. 31 is a table showing the relationship among the bending radius R of the high-voltage wire 55, the cross-sectional area φ of the core of the high-voltage wire 55, and the bending load of the high-voltage wire 55, using the high-voltage wire WD shown in FIG. 3 and the like as the high-voltage wire 55 in the case shown in FIG. 6.

FIGS. 32A and 32B and FIGS. 33A to 33C graphically show the table of FIG. 31.

Figure 32A:
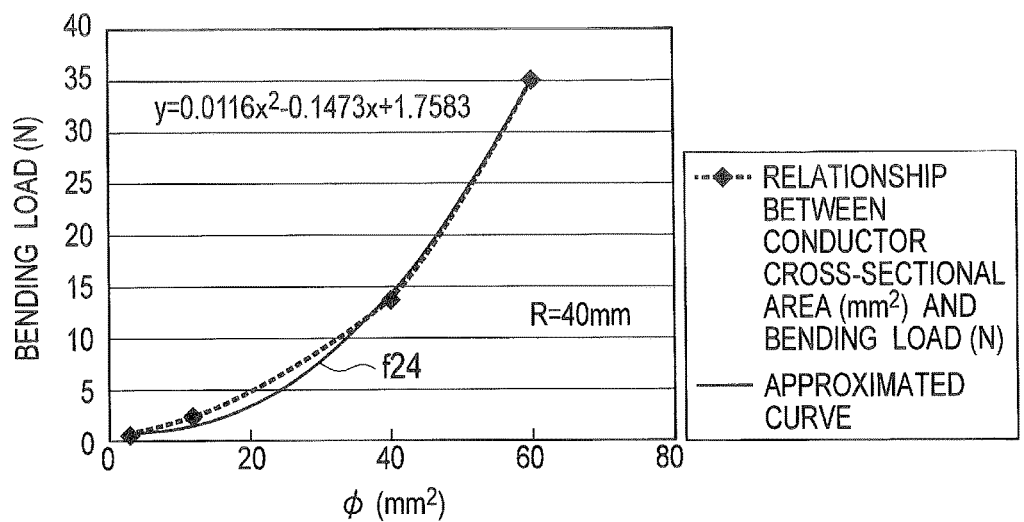
FIG. 32A is a graph showing the table of FIG. 31.

FIG. 32A is a graph showing the relationship between the cross-sectional area φ of the core of the high-voltage wire 55 and the bending load of the high-voltage wire 55 when the bending radius R of the high-voltage wire 55 is 40 mm.

The horizontal axis (x-axis) of FIG. 32A represents the cross-sectional area φ of the core (unit=mm$^2$) and the vertical axis (y-axis) represents the bending load (unit=N). As in the case of FIGS. 11 and 12, an approximate equation (f24) y=0.0116x$^2$−0.1473x+1.7583 is obtained.

Figure 32B:
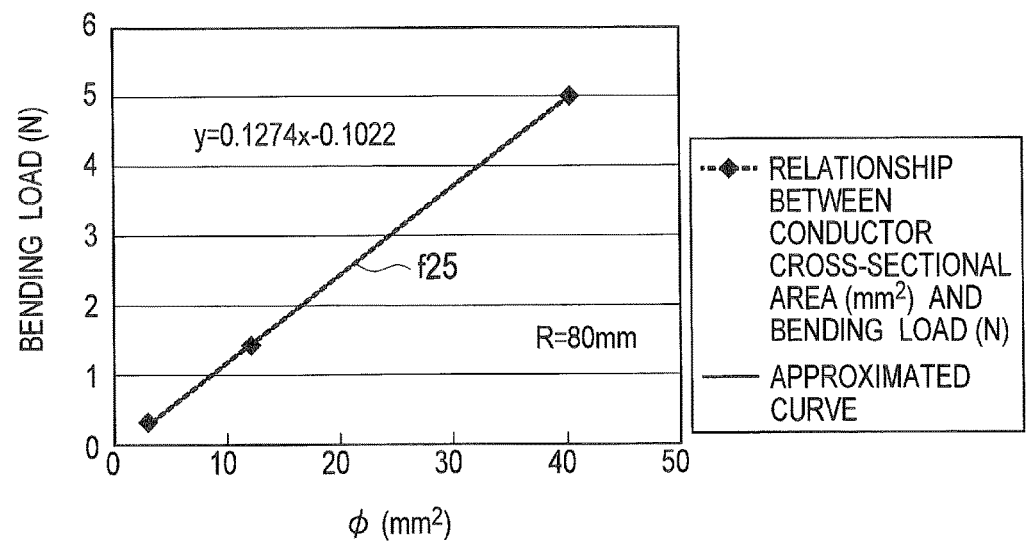
FIG. 32B is a graph showing the table of FIG. 31.

FIG. 32B is a graph showing the relationship between the cross-sectional area φ of the core of the high-voltage wire 55 and the bending load of the high-voltage wire 55 when the bending radius R of the high-voltage wire 55 is 80 mm.

The horizontal axis (x-axis) of FIG. 32B represents the cross-sectional area φ of the core (unit=mm$^2$) and the vertical axis (y-axis) represents the bending load (unit=N). As in the case of FIGS. 11 and 12, an approximate equation (f25) y=0.1274x−0.1022 is obtained.

Figure 33A:
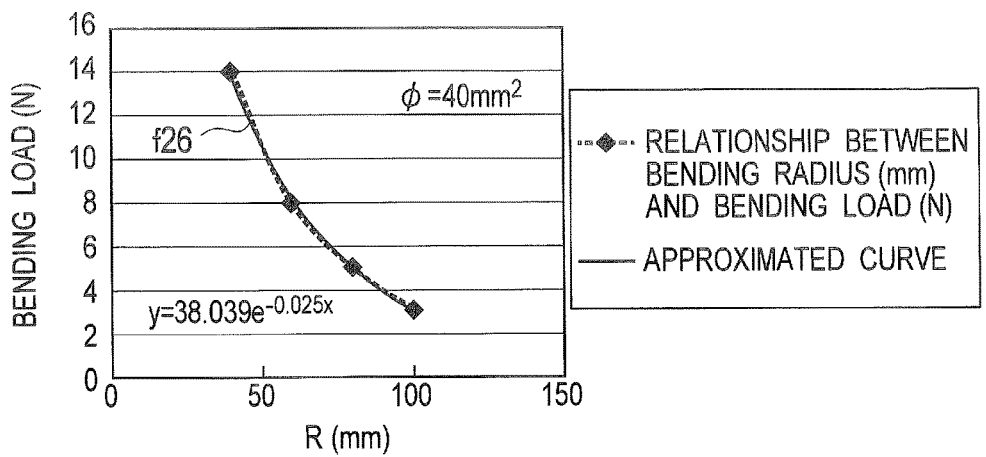
FIG. 33A is a graph showing the table of FIG. 31.

FIG. 33A is a graph showing the relationship between the bending radius R of the high-voltage wire 55 and the bending load of the high-voltage wire 55 when the cross-sectional area φ of the core of the high-voltage wire 55 is 40 mm$^2$.

The horizontal axis (x-axis) of FIG. 33A represents the bending radius R (unit=mm) and the vertical axis (y-axis) represents the bending load (unit=N). As in the case of FIGS. 11 and 12, an approximate equation (f26) y=38.039×10$^{-0.025x}$ is obtained.

Figure 33B:
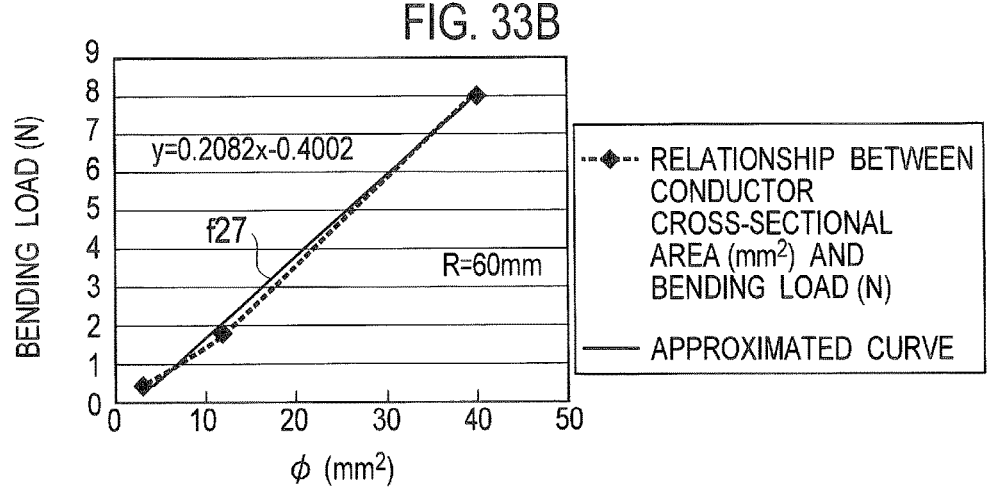
FIG. 33B is a graph showing the table of FIG. 31.

FIG. 33B is a graph showing the relationship between the cross-sectional area φ of the core of the high-voltage wire 55 and the bending load of the high-voltage wire 55 when the bending radius R of the high-voltage wire 55 is 60 mm.

The horizontal axis (x-axis) of FIG. 33B represents the cross-sectional area φ of the core (unit=mm$^2$) and the vertical axis (y-axis) represents the bending load (unit=N). As in the case of FIGS. 11 and 12, an approximate equation (f27) y=0.2082x−0.4002 is obtained.

Figure 33C:
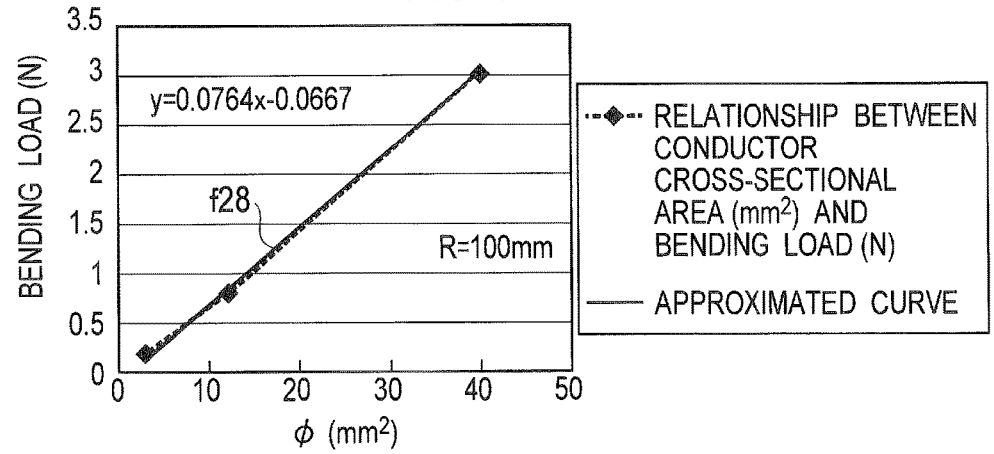
FIG. 33C is a graph showing the table of FIG. 31.

FIG. 33C is a graph showing the relationship between the cross-sectional area φ of the core of the high-voltage wire 55 and the bending load of the high-voltage wire 55 when the bending radius R of the high-voltage wire 55 is 100 mm.

The horizontal axis (x-axis) of FIG. 33C represents the cross-sectional area φ of the core (unit=mm$^2$) and the vertical axis (y-axis) represents the bending load (unit=N). As in the case of FIGS. 11 and 12, an approximate equation (f28) y=0.0764x−0.0667 is obtained.

By previously obtaining such approximate equations f1 to f28 or similar approximate equations and using such approximate equations as needed, correlation data can be obtained even for the corrugated tube 63 with the core having a diameter that is not actually measured, the bending radius R, and the wall thickness t1 that is not actually measured. Therefore, bending load data on the respective constituent members in the harness main body 51 can be obtained. Thus, a combination leading to the sum of bending loads less than 44 N can be easily obtained based on the bending load data.

Incidentally, in the above description, the high-voltage wires 55 and the exterior part 63 are bent in the mode shown in FIGS. 2A to 2C or FIGS. 7A to 7C. Instead, the bending mode of the high-voltage wires 55 or the exterior part 63 may be as shown in FIGS. 22 to 25.

Figure 22:
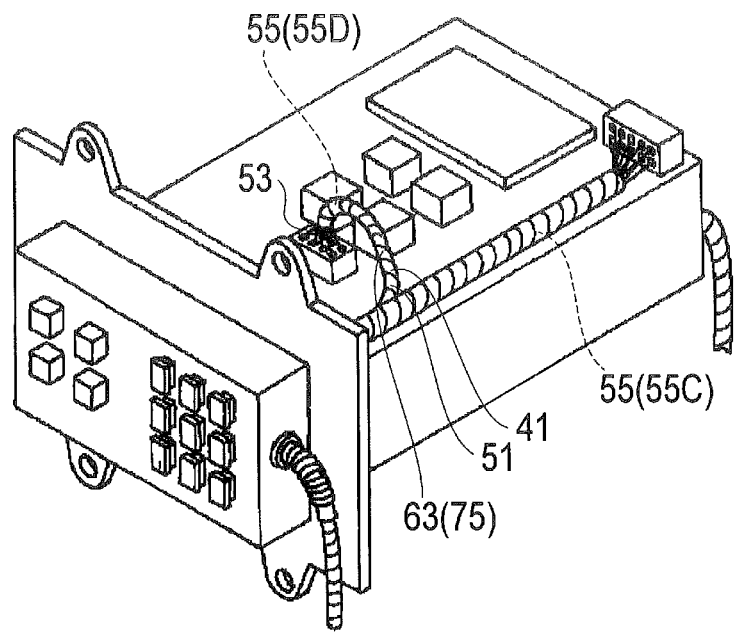
FIG. 22 is a diagram showing another mode of bending the wire harness according to the first embodiment of the present invention.

In the mode shown in FIG. 22, a connector 52 is provided at a tip of a high-voltage wire 55D extending as branched off from a high-voltage wire 55C that is a main part. The connector is connected to a counterpart connector by bending the high-voltage wire 55D. The bending load of the high-voltage wire 55D when connecting the connector 53 to the counterpart connector is less than 44N. Moreover, a tape 75 is wound as an exterior part 63 so as to cover the high-voltage wires 55D and 55C. Furthermore, the high-voltage wire 55D is three-dimensionally bent over almost the entire length thereof (in a part except for the vicinity of the connector 53).

Figure 23:
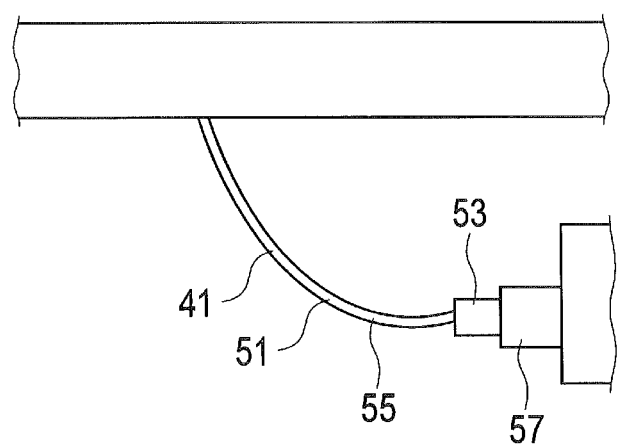
FIG. 23 is a diagram showing another mode of bending the wire harness according to the first embodiment of the present invention.

In the mode shown in FIG. 23, a connector 53 is provided at a tip of a high-voltage wire 55 extending directly from an electric device such as an inverter 45. The connector 53 is connected to a counterpart connector 57 by bending the high-voltage wire 55. The bending load of the high-voltage wire 55 when connecting the connector 53 to the counterpart connector 57 is less than 44N. Note that no exterior part 63 is used, and the high-voltage wire 55 is two-dimensionally bent over almost the entire length thereof (in a part except for the vicinity of the connector 53).

In the mode shown in FIG. 24, an intermediate part of a high-voltage wire 55 is bent into a crankshaft shape, and corners formed by this bending are arc-shaped. A connector 53 provided at one end of the high-voltage wire 55 is connected to a counterpart connector 57, while a connector 59 provided at the other end of the high-voltage wire 55 is connected to a counterpart connector 61. The bending load of the high-voltage wire 55 when connecting the connector 53 to the counterpart connector 57 by bending the high-voltage wire 55 from the state where the connector 59 is connected to the counterpart connector 61 is less than 44 N. Note that a tape 75 is wound as an exterior part 63 so as to cover the high-voltage wire 55.

In the mode shown in FIG. 25, an intermediate part of the high-voltage wire 55 is covered with an exterior part 63 and bent into a predetermined form. In order to keep this bending form, the intermediate part of the high-voltage wire 55 is fixed to a vehicle at fixing points P1 and P2 (at least one fixing spot) with clips (not shown). Moreover, a connector 53 provided at one end of the high-voltage wire 55 is connected to a counterpart connector 57.

Furthermore, in the mode shown in FIG. 25, the bending load required to bend the high-voltage wire 55 and the exterior part 63 is less than 44 N. Note that a configuration may also be adopted in which the exterior part 63 has high rigidity and is previously bent into a predetermined shape, and the high-voltage wire 55 is bent and installed in the exterior part 63. In this case, the bending load of the high-voltage wire 55 is less than 44 N. The exterior part 63 is fixed to the vehicle.

Note that, in the modes shown in FIGS. 22, 23, and 25, the connector is provided only at one end of the high-voltage wire 55.

Here, description is given of the cover 56 of the high-voltage wire 55. The cover 56 of the high-voltage wire 55 is made of the following insulator composition, for example.

More specifically, the insulator composition that makes up the cover 56 of the high-voltage wire 55 (high-voltage wire WD shown in FIGS. 2A to 2C, FIGS. 7A to 7C, and the like) contains: (A) ethylene copolymer and modified resin; (B) at least one of ethylene-acrylic rubber and vinyl acetate rubber; (C) 80 to 140 parts mass of aluminum hydroxide subjected to silane coupling treatment per 100 parts mass of the component (A) and the component (B) combined; and (D) 0.5 to 4 parts mass of lubricant per 100 parts mass of the component (A) and the component (B) combined. The ethylene copolymer and the modified resin satisfy the relationship of 20:20 to 77:3 in parts mass, and the component (A) and the component (B) satisfy the relationship of (A):(B)=40:60 to 80:20 in parts mass.

Hereinafter, with reference to the drawings, the embodiment of the present invention is further described. Note that ratios of dimensions in the drawings are exaggerated for convenience of explanation, and may be different from actual ratios.

The inventors of the present invention have studied flexibility, strength (tensile rupture strength), fluid resistance (battery fluid), fluid resistance (gasoline), and heat resistance for various materials for use in a highly flexible wire (high-voltage wire). Table 1 shows the results of the study obtained by selecting a resin material such as EVA, a rubber material such as HNBR, and an elastomer material as materials, and studying the characteristics described above for the respective materials.

Here, the flexibility in Table 1 is evaluated as "o" when Shore D hardness is 32 or less and Shore A hardness is 85 or less, and is evaluated as "x" when Shore D hardness and Shore A hardness are outside this range. The strength (tensile rupture strength) is the result of measurement based on ASTM D638, and is evaluated as "o" when the tensile rupture strength is 10.3 MPa or more and evaluated as "x" when the tensile rupture strength is less than 10.3 MPa.

Note that the fluid resistance (battery fluid) in Table 1 is evaluated as follows. First, six tensile test specimens that comply with JIS K6251 are prepared from the respective resins. Three of those prepared are immersed in the battery fluid at 50° C. for 20 hours. Then, tensile tests are conducted on the three test specimens immersed in the battery fluid and on the three test specimens not immersed. Thereafter, the average percentage (%) of the extension percentage is obtained for the test specimens after immersion relative to the test specimens before immersion. The fluid resistance is evaluated as "o" when the change rate after immersion is 50% or more, and is evaluated as "x" when the change rate after immersion is less than 50%.

Average percentage (%)=(extension percentage of test specimen after immersion−extension percentage of test specimen before immersion)/ (extension percentage of test specimen before immersion)×100

Meanwhile, the fluid resistance (gasoline) is measured based on ISO6722. To be more specific, the outside diameter of a test sample is first measured before immersion in gasoline. Next, the test sample is immersed in gasoline and left for 30 minutes. After the immersion, the test sample is taken out of the gasoline, and the gasoline adhering to the surface is wiped off. Then, the outside diameter is measured at the same spot as before the immersion. Thus, a change rate (%) of the outside diameter after the immersion is obtained relative to the outside diameter before the immersion in gasoline. The fluid resistance (gasoline) is evaluated as "o" when the change rate of the outside diameter after the immersion relative to the outside diameter before the immersion in gasoline is 15% or less, and is evaluated as "x" when the change rate exceeds 15%.

Change rate (%)=(outside diameter after immersion− outside diameter before immersion)/(outside diameter before immersion)×100

As for the heat resistance, first, a JIS No. 3 dumbbell-shaped specimen having a thickness of 1 mm is prepared. Next, the specimen is heated in ovens of 170° C., 180° C., and 190° C., and then the tensile elongation of the heated specimen is measured based on JIS K6251 standard. In this event, a heating time is obtained, which causes the tensile elongation of the specimen at each of the heating temperatures to be 100% or less. Then, the estimated life expectancy is calculated by Arrhenius-plotting the heating temperature of the specimen and the heating time leading to the tensile elongation of 100% or less. The heat resistance is evaluated as "o" when a heating temperature read from the Arrhenius-plot at the heating time of 10000 hours is 150° C. or more, and is evaluated as "x" when the heating temperature read from the Arrhenius-plot at the heating time of 10000 hours is less than 150° C.

In Table 1, "EVA" represents ethylene-vinyl acetate copolymer (trade name "EV270" (Mitsui DuPont Polychemical Co., Ltd.)). "EEA" represents ethylene-ethyl acrylate copolymer (trade name "_NUC-6520" (Nippon Unicar Company Limited)). "EMA" represents ethylene-methyl acrylate copolymer (trade name "Elvaloy (registered trademark) AC1125" (Mitsui DuPont Polychemical Co., Ltd.)). "LDPE" represents low-density polyethylene (trade name "LD400" (Japan Polyethylene Corporation)).

Also, in Table 1, "HNBR" represents hydrogenated nitrile rubber. "AEM" represents ethylene-acrylic rubber (trade name "VAMAC (registered trademark)-DP" (DuPont Corporation)). "EPDM" represents ethylene-propylene-diene monomer copolymer (trade name "EPT3045H" (Mitsui Chemicals Co., Ltd.)). As for "fluororubber", trade name "AFRAS150CS" (manufactured by Asahi Glass Co., Ltd.) is used. As for "silicone rubber", trade name "DY32-6066" (manufactured by Toray Industries, Inc.) is used. "CSM" represents chlorosulfonated polyethylene (trade name "TS430" (Tosoh Corporation)). "CM" represents chlorinated polyethylene (trade name "Elaslen (registered trademark) 302NA" (Showa Denko K.K.)).

As for "styrenic elastomer", trade name "Septon (registered trademark) 2063" (manufactured by Kuraray Co., Ltd.) is used. As for "polyurethane elastomer", trade name "Kuramilon (registered trademark)" (manufactured by Kuraray Co., Ltd.) is used. As for "polyester-based elastomer", trade name "Pelprene (registered trademark) P-40H" (manufactured by Toyobo Co., Ltd.) is used.

prepared. Note that, as for the metal conductor, a twisted wire is first prepared by twisting 19 pure copper strands together, each having the outside diameter of 0.32 mm, and then 26 of such twisted wires are twisted into one twisted

TABLE 1

| | | Evaluation Item | | | | |
|---|---|---|---|---|---|---|
| | | Flexibility | Strength | Fluid Resistance (Battery Fluid) | Fluid Resistance (Gasoline) | Heat Resistance |
| | | Criteria | | | | |
| | | Shore D/Shore A = 32/85 or less | Tensile rupture strength is 10.3 MPa or more | Extension percentage after immersion is 50% or more | Change rate after endurance test is 15% or less | Estimated life expectancy by Arrhenius-plotting is 150° c. or more |
| Resin Material | EVA | ○ | ○ | ○ | x | ○ |
| | EEA | ○ | ○ | ○ | ○ | ○ |
| | EMA | ○ | ○ | ○ | ○ | ○ |
| | LDPE | x | ○ | ○ | ○ | ○ |
| Rubber Material | HNBR | ○ | ○ | ○ | ○ | x |
| | AEM | ○ | x | ○ | ○ | ○ |
| | EPDM | ○ | ○ | ○ | x | ○ |
| | Fluoro-Rubber | ○ | ○ | ○ | ○ | ○ |
| | Silicone Rubber | ○ | x | x | ○ | ○ |
| | CSM | ○ | ○ | ○ | ○ | x |
| | CM | ○ | x | ○ | ○ | x |
| Elastomer Material | Styrenic Elastome | ○ | x | ○ | x | x |
| | Polyurethane Elastomer | ○ | ○ | ○ | ○ | x |
| | Polyester-Based Elastomer | ○ | ○ | ○ | ○ | x |

As shown in Table 1, the resin material tends to be excellent in mechanical strength but poor in flexibility. On the other hand, the rubber material may be excellent in flexibility but have a problem with mechanical strength and fluid resistance. Moreover, as for the resin material and the rubber material, materials having high heat resistance are limited. The fluororubber is excellent in strength and chemical resistance, but not practical because of high cost for use in highly flexible wire. Furthermore, the elastomer material tends to be excellent in flexibility but poor in heat resistance.

Therefore, the inventors of the present invention have carried out a selection of the resin material in consideration of the properties described above, and identified a compounding ratio to achieve the target flexibility by compounding the rubber material to the selected resin material. As a result, the inventors of the present invention have found an insulator composition with high fluid resistance, abrasion resistance, and heat resistance while maintaining flexibility.

The insulator composition according to this embodiment contains ethylene copolymer as the resin material and at least one of ethylene-acrylic rubber and vinyl acetate rubber as the rubber material. The insulator composition according to this embodiment contains ethylene copolymer having relatively high heat resistance and high flexibility as the resin material and at least one of ethylene-acrylic rubber and vinyl acetate rubber poor in mechanical strength but excellent in heat resistance and flexibility.

Here, the inventors of the present invention have studied adhesive force between the insulator composition and the conductor, in order to achieve the flexibility of the wire (high-voltage wire). To be more specific, an insulator composition obtained by mixing materials A shown in Table 2 is applied onto a metal conductor by extrusion molding. Furthermore, electron beam cross-linking (750 kV×16 Mrad) is performed on a cable thus obtained, thereby cross-linking the resins included in the insulator. Thus, a wire sample is wire having the outside diameter of 9.1 mm. Furthermore, adjustments are made such that the thickness of the insulator is 1.4 mm and the outside diameter of the wire sample to be obtained is 11.9 mm. Moreover, the insulator is formed by full extrusion whereby the inner periphery thereof enters between the strands of the metal conductor.

TABLE 2

| Material | Composition | Compounding Ratio (Parts Mass) |
|---|---|---|
| A | EEA | 60 |
| | AEM | 40 |
| | Aluminum Hydroxide (Without Treatment) | 100 |

In Table 2, "EEA" represents ethylene-ethyl acrylate copolymer (trade name "Rexpearl (registered trademark) EEA A1150" (Nippon Polyethylene Co., Ltd.)). "AEM" represents ethylene-acrylic rubber (trade name "VAMAC (registered trademark)-DP" (DuPont Corporation)). As for aluminum hydroxide, BF013 manufactured by Nippon Light Metal Company, Ltd is used.

Figure 34:
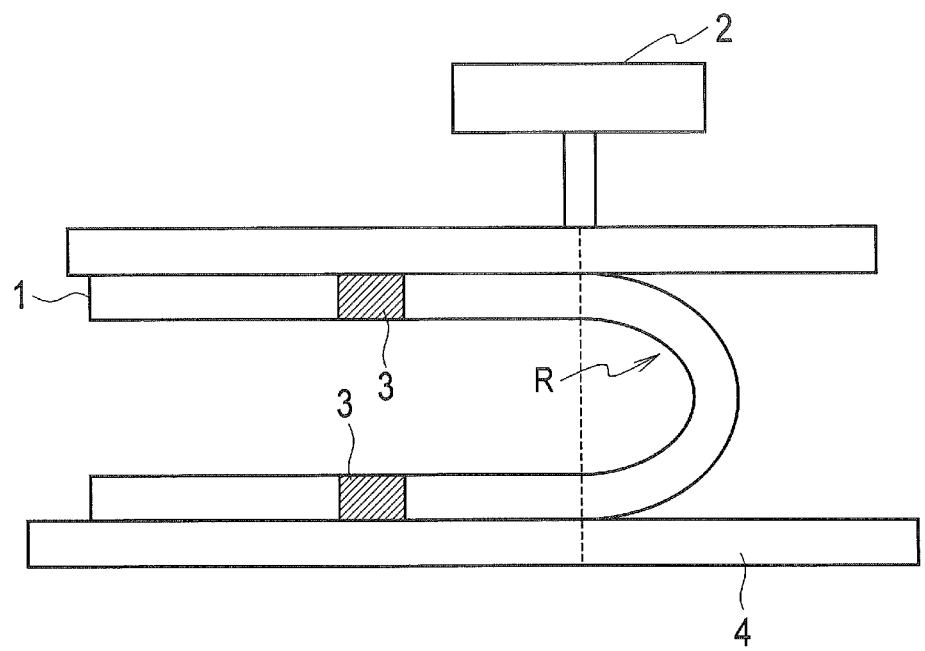
FIG. 34 is a schematic diagram for explaining a method for measuring flexibility of the wire.

Next, multiple wire samples different in the number of bends are prepared by bending the wire sample thus obtained by 180 degrees. Then, flexibility and adhesive force are evaluated on the bent wire samples. To be more specific, as for the flexibility, a bent wire sample 1 having a length of 400 mm is bent at a rate of 100 mm/min as shown in FIG. 34, and the maximum bending stress at a spot where the bend radius R is 40 is measured by a load cell 2. Note that, during the measurement, the wire sample 1 is fixed to the load cell 2 and a support table 4 at spots denoted by reference numeral 3.

Figure 35A:
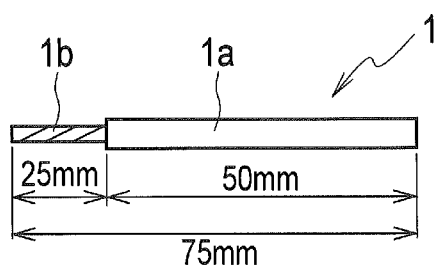
FIG. 35A is a schematic diagram for explaining a method for measuring adhesive force of the wire.
Figure 35B:
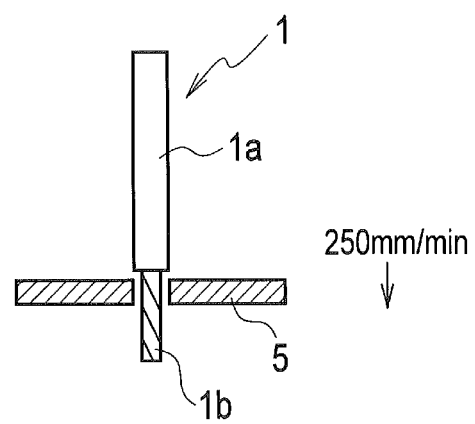
FIG. 35B is a schematic diagram for explaining a method for measuring adhesive force of the wire.
Figure 36:
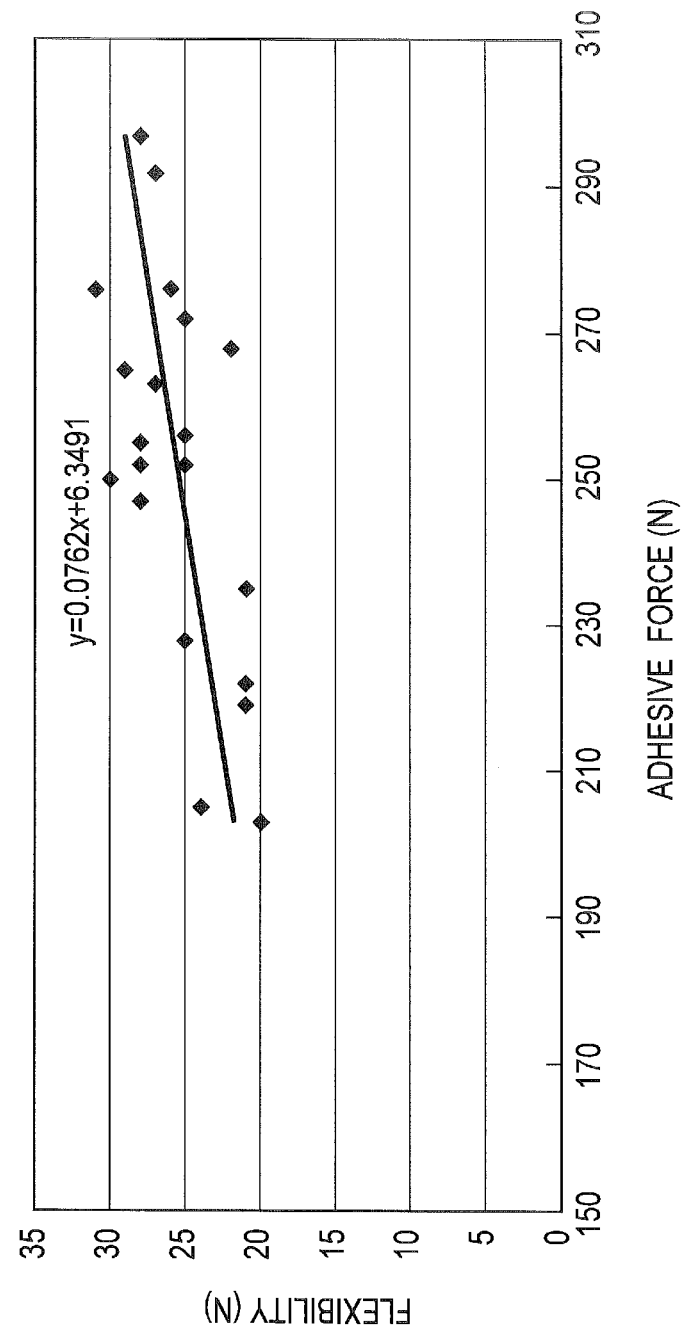
FIG. 36 is a graph showing a relationship between the flexibility and adhesive force of the wire.
Figure 37A:
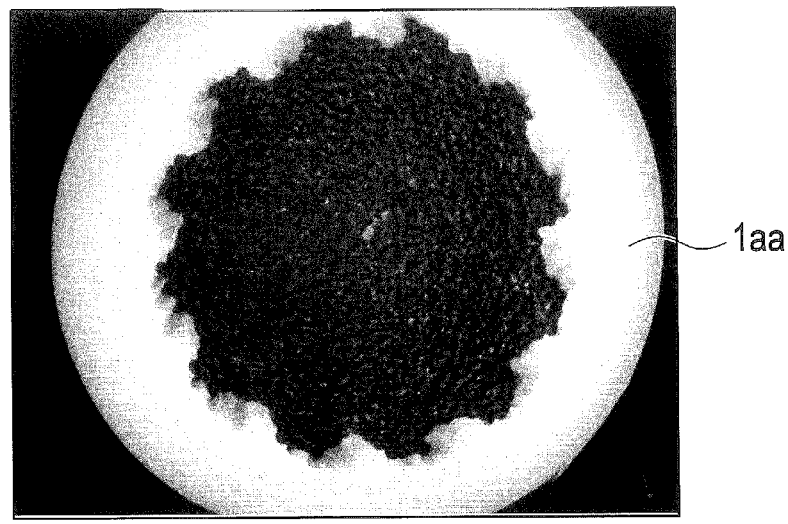
FIG. 37A is a diagram showing a cross-section of an insulator obtained by full extrusion.
Figure 37B:
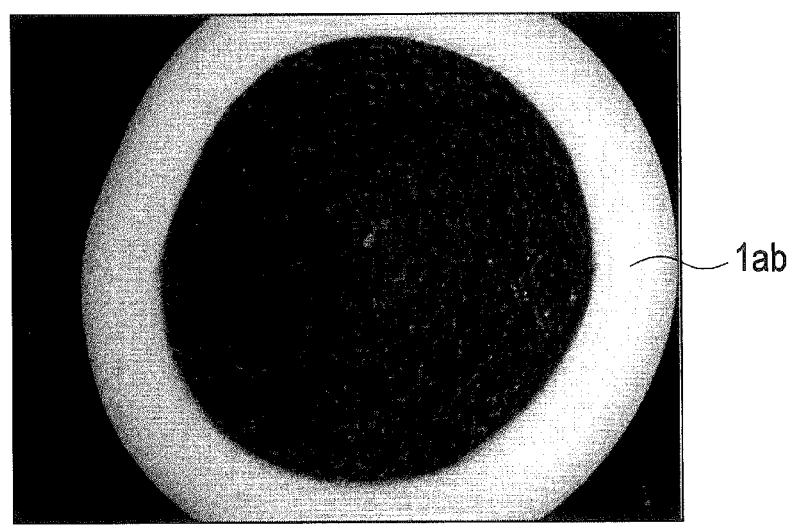
FIG. 37B is a diagram showing a cross-section of an insulator obtained by tube extrusion.

As for the adhesive force, first, a test sample is prepared by exposing a metal conductor 1b from a bent wire sample 1 having a length of 75 mm by removing an insulator 1a by 25 mm from one end thereof, as shown in FIG. 35A. Next, as shown in FIG. 35B, the metal conductor 1b of the test sample is set so as to penetrate a test stand 5 having a hole through which only the metal conductor 1b passes and the insulator 1a does not pass. Then, the metal conductor 1b is pulled at a rate of 250 mm/min, and the maximum stress is measured until the insulator 1a is completely peeled off from the metal conductor 1b. FIG. 36 shows the relationship between the flexibility and the adhesive force of the respective wire samples different in the number of bends. Note that FIG. 36 shows the average of the results of measurement of the flexibility and adhesive force carried out six times for each wire sample.

It can be seen from FIG. 36 that the wire sample 1 has good flexibility when the adhesive force between the insulator 1a and the metal conductor 1b in the wire sample 1 is low. That is, it is inferred that the bending stress is likely to escape when the adhesive force between the insulator 1a and the metal conductor 1b is low, leading to good flexibility. As for the wire with high adhesive force, on the other hand, it is inferred that good flexibility cannot be achieved since no bending stress escapes.

Figure 38:
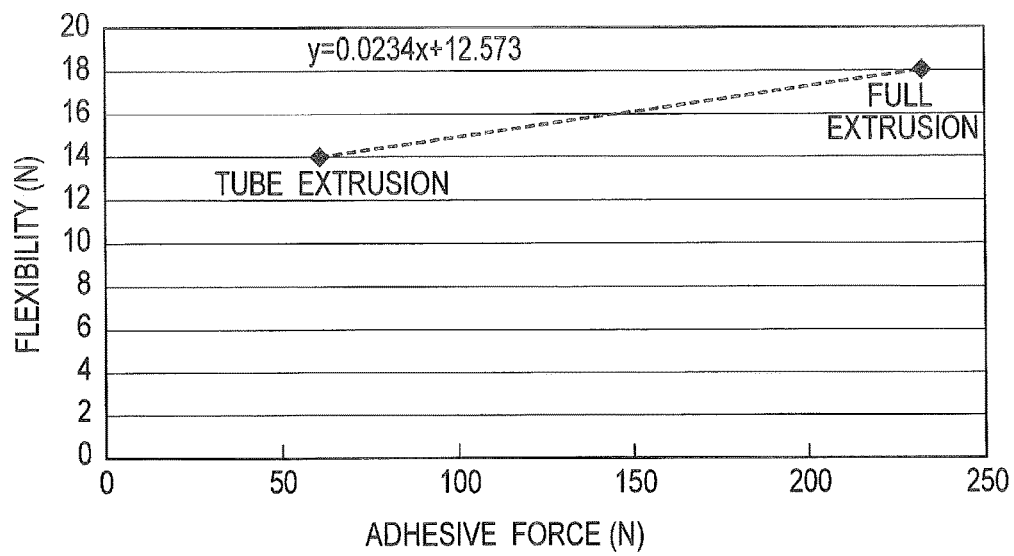
FIG. 38 is a graph showing a relationship between the flexibility and the adhesive force for the wire obtained by full extrusion and the wire obtained by tube extrusion.
Figure 39:
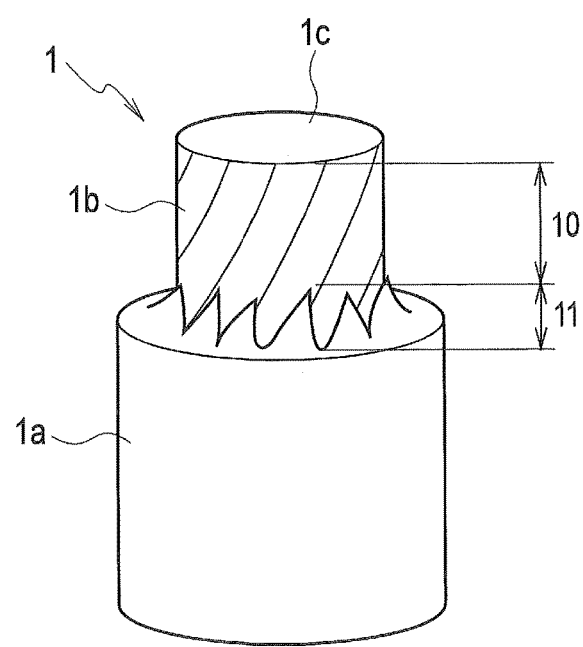
FIG. 39 is a schematic diagram for explaining tearing of the insulator.

Next, the inventors of the present invention have studied a method for extruding the insulator, in order to achieve the flexibility of the wire. To be more specific, an insulator composition obtained by mixing materials B shown in Table 3 is applied onto a metal conductor by extrusion molding. Furthermore, electron beam cross-linking (750 kV×16 Mrad) is performed on a cable thus obtained, thereby cross-linking the resins included in the insulator. Thus, a wire sample is prepared. Note that, as for the metal conductor, the same one as that in the wire sample measured for the adhesive force and flexibility described above is used. Here, as the method for extruding the insulator, full extrusion whereby the inner periphery of an insulator 1aa enters between the strands of the metal conductor as well as tube extrusion whereby the inner periphery of an insulator 1ab does not enter between the strands of the metal conductor are conducted. Then, the flexibility and adhesive force described above are measured for the wire sample obtained by the full extrusion and the wire sample obtained by the tube extrusion. FIG. 38 shows the result of the measurement.

TABLE 3

| Material | Composition | Compounding Ratio (Parts Mass) |
|---|---|---|
| B | EVM | 50 |
|  | EMA | 30 |
|  | Modified LLDPE | 20 |
|  | Aluminum Hydroxide Subjected to Silane Coupling Treatment | 100 |

In Table 3, "EVM" represents rubbery copolymer of ethylene and vinyl acetate (trade name "Levapren (registered trademark) 700" (Lanxess Co., Ltd.)). "EMA" represents ethylene-methyl acrylate copolymer (trade name "Elvaloy (registered trademark) AC1125" (Mitsui DuPont Polychemical Co., Ltd.)). "Modified LLDPE" represents a compound having polar groups introduced into the side chain of linear low-density polyethylene (trade name "MODIC (registered trademark) LLDPE M545" (Mitsubishi Chemical Corporation). As for aluminum hydroxide subjected to silane coupling treatment, BF013STV manufactured by Nippon Light Metal Company, Ltd. is used.

As shown in FIG. 38, compared with the full extrusion with high adhesive force between the insulator and the metal conductor, the tube extrusion with low adhesive force achieves good flexibility. More specifically, by changing the method for extruding the insulator, the adhesive force between the insulator and the metal conductor can be reduced, leading to improved flexibility.

Here, upon evaluation of workability (stripping properties) on the wire sample prepared with the materials A shown in Table 2 described above, tearing of the insulator occurs, resulting in a problem of insufficient stripping dimension. The "tearing of the insulator" is a phenomenon that a part of the insulator is left behind due to poor cutting during stripping, leading to poor connection between the conductor and a terminal during pressure bonding of the terminal. Moreover, the "stripping dimension" means a dimension 10 from a cutting surface 1c of the wire to a torn part of the insulator 1a. Therefore, the stripping dimension is insufficient when a dimension 11 from the base of the torn part to the tip thereof is large. For this reason, the stripping dimension is an important element in the wire to be used for the wire harness.

Therefore, the inventors of the present invention have focused on reducing the extension percentage of the insulator, in order to ensure the sufficient stripping dimension. As a method for reducing the extension percentage of the insulator, mixing a large amount of flame retardant, and the like are conceivable. However, such a method leads to a possible reduction in abrasion resistance. Therefore, as the method for reducing the extension percentage of the insulator, the inventors of the present invention have studied addition of modified resin.

To be more specific, an insulator composition obtained by mixing materials shown in Table 4 is applied onto a metal conductor by extrusion molding. Furthermore, electron beam cross-linking (750 kV×16 Mrad) is performed on a cable thus obtained, thereby cross-linking the resins included in the insulator. Thus, wire samples 1-1 to 1-3 are prepared. Note that, as for the metal conductor, a twisted wire having the outside diameter of 2.25 mm is used, which is obtained by twisting 37 pure copper strands together, each having the outside diameter of 0.32 mm. Furthermore, adjustments are made such that the thickness of the insulator is 0.7 mm and the outside diameter of the wire sample to be obtained is 3.65 mm. Moreover, the insulator is formed by full extrusion whereby the inner periphery thereof enters between the strands of the metal conductor.

TABLE 4

|  | Compounding Ratio (Parts mass) | | |
|---|---|---|---|
| Sample Number | 1-1 | 1-2 | 1-3 |
| EEA | 70 | 60 | 50 |
| AEM | 30 | 30 | 30 |
| Modified EEA | 0 | 10 | 20 |
| Aluminum Hydroxide Subjected to Silane Coupling Treatment | 100 | 100 | 100 |

In Table 4, "EEA" represents ethylene-ethyl acrylate copolymer (trade name "NUC-6520" (Nippon Unicar Company Limited)). "AEM" represents ethylene-acrylic rubber (trade name "VAMAC (registered trademark)-DP" (DuPont Corporation)). "Modified EEA" represents ethylene-acrylic acid ester-maleic anhydride ternary copolymer (trade name "BONDINE" (registered trademark) LX4110) (Arkema K.K.). As for aluminum hydroxide subjected to silane coupling treatment, BF013STV manufactured by Nippon Light Metal Company, Ltd. is used.

Figure 40:
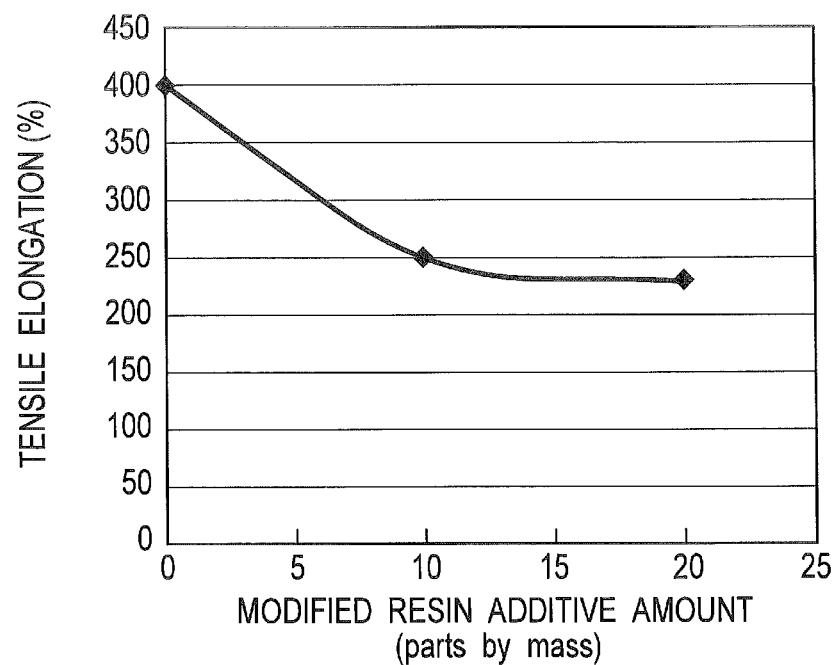
FIG. 40 is a graph showing a relationship between an additive amount of modified resin and a tensile elongation of the insulator.

As for the wire samples of the respective compositions thus obtained, the tensile elongation of the insulator, tearing dimension of the insulator, and stripping dimension accuracy are measured. As for the tensile elongation of the insulator, first, a tube-shaped sample including only the insulator is prepared by removing the metal conductor from the wire sample. Then, the tube-shaped sample is pulled at a tension rate of 200 mm/min, thereby measuring the elongation percentage before the sample fractures. Note that FIG. 40 shows the average of the results of measurement of the elongation percentage carried out six times for each wire sample.

Figure 41:
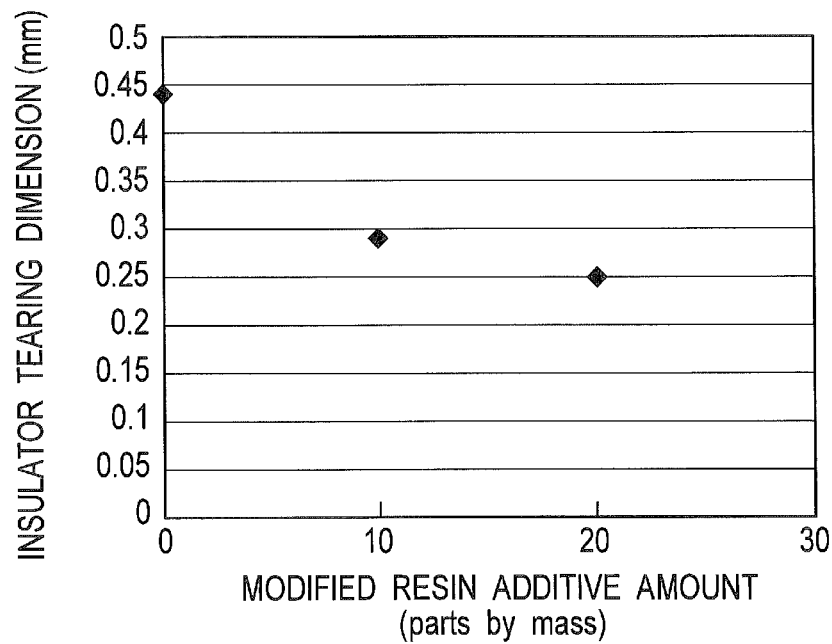
FIG. 41 is a graph showing a relationship between the additive amount of modified resin and a tearing dimension of the insulator.

As for the tearing dimension of the insulator, stripping of the wire sample is first performed. To be more specific, a coaxial cable stripping machine CS5500 manufactured by Schleuniger Japan Co., Ltd. is used to perform stripping of the wire sample while setting a target value of the stripping dimension to 5 mm and a depth for insertion of a stripping blade to 3.05 mm. Note that the outside diameter of the metal conductor in the wire sample is 2.25 mm. However, the depth for insertion of the stripping blade is set high so as not to damage the strands of the conductor, and the like. When the depth for insertion of the stripping blade is high, the stripping blade does not enter deeply into the insulator, making it easier to tear the insulator. Then, assuming that the dimension 11 from the portion where the stripping blade is inserted to the tip of the torn part of the insulator is the tearing dimension of the insulator, the length thereof is measured. Note that FIG. 41 shows the average of the results of measurement of the tearing dimension of the insulator carried out fifty times for each wire sample.

As for the stripping dimension accuracy, the dimension 10 from the cutting surface 1c of the wire sample to the torn part of the insulator 1a is measured for 50 samples, and a variation Cp thereof is obtained by the following calculating formula. Then, the sample with the variation Cp of 1.67 or more is determined as "good".

$Cp$=(standard width)/(6×standard deviation of dimension 10)

Figure 42:
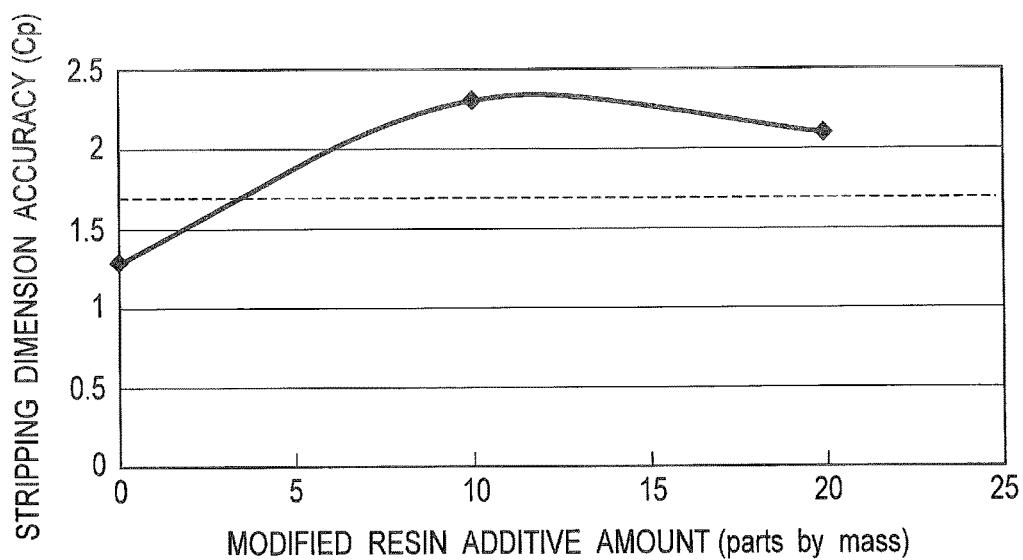
FIG. 42 is a graph showing a relationship between the additive amount of modified resin and stripping dimension accuracy.

FIG. 40 shows the relationship between the additive amount of the modified resin and the tensile elongation of the insulator. FIG. 41 shows the relationship between the additive amount of the modified resin and the tearing dimension of the insulator. FIG. 42 shows the relationship between the additive amount of the modified resin and the stripping dimension accuracy. As shown in FIGS. 40 to 42, the tensile elongation of the insulator is reduced by adding the modified resin. As a result, it can be seen that the tearing dimension of the insulator is also reduced, and the stripping dimension accuracy is also improved. It can also be seen that 3 parts mass or more of the modified resin needs to be added to 100 parts mass of ethylene copolymer and ethylene-acrylic rubber, in order to improve the workability (stripping properties) of the wire.

As described above, it can be seen that the workability (stripping properties) of the wire is improved by adding the modified resin to the resin material and the rubber material. However, the addition of the modified resin hardens the material, that is, lowers the flexibility. Therefore, it is attempted to optimize the addition ration of the rubber material to achieve the flexibility. To be more specific, an insulator composition obtained by mixing materials shown in Table 5 is applied onto a metal conductor by extrusion molding. Furthermore, electron beam cross-linking (750 kV×16 Mrad) is performed on a cable thus obtained, thereby cross-linking the resins included in the insulator. Thus, wire samples 2-1 to 2-5 are prepared. Note that, as for the metal conductor, a twisted wire having the outside diameter of 2.25 mm is used, which is obtained by twisting 37 pure copper strands together, each having the outside diameter of 0.32 mm. Furthermore, adjustments are made such that the thickness of the insulator is 0.7 mm and the outside diameter of the wire sample to be obtained is 3.65 mm. Moreover, the insulator is formed by full extrusion whereby the inner periphery thereof enters between the strands of the metal conductor.

TABLE 5

| | Compounding Ratio (Parts mass) | | | | |
|---|---|---|---|---|---|
| Sample Number | 2-1 | 2-2 | 2-3 | 2-4 | 2-5 |
| EEA | 70 | 60 | 50 | 40 | 30 |
| AEM | 30 | 30 | 30 | 40 | 50 |
| Modified EEA | 0 | 10 | 20 | 20 | 20 |
| Aluminum Hydroxide Subjected to Silane Coupling Treatment | 100 | 100 | 100 | 100 | 100 |

In Table 5, "EEA" represents ethylene-ethyl acrylate copolymer (trade name "NUC-6520" (Nippon Unicar Company Limited)). "AEM" represents ethylene-acrylic rubber (trade name "VAMAC (registered trademark)-DP" (DuPont Corporation)). "Modified EEA" represents ethylene-acrylic acid ester-maleic anhydride ternary copolymer (trade name "BONDINE" (registered trademark) LX4110) (Arkema K.K.). As for aluminum hydroxide subjected to silane coupling treatment, BF013STV manufactured by Nippon Light Metal Company, Ltd. is used.

Figure 46:
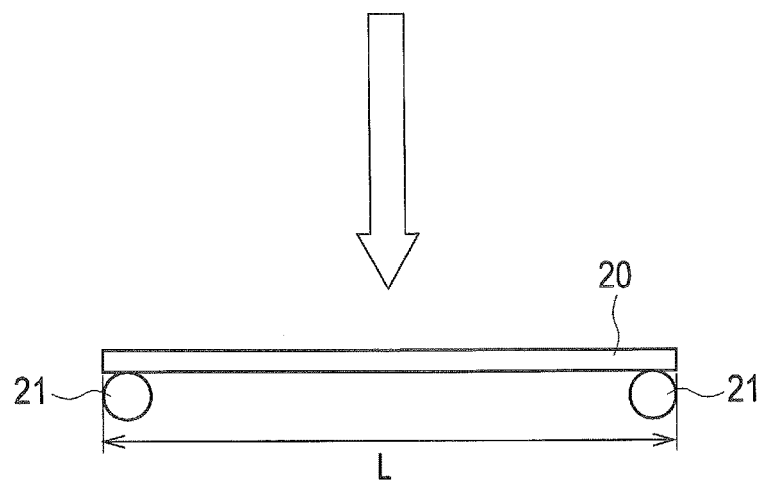
FIG. 46 is a schematic diagram for explaining a method for measuring the wire flexibility.

Then, Shore D hardness is measured for each of the insulator compositions obtained by mixing the materials of Samples 2-1 to 2-5. Furthermore, the wire flexibility and adhesive force are measured for the wire samples of the respective compositions thus obtained. As for the wire flexibility, the wire sample is cut such that the length L is 100 mm Next, as shown in FIG. 46, both ends of the wire sample 20 are placed on support stands 21. Then, the reaction force when the center of the wire sample 20 is pressed at a rate of 100 mm/minute is measured using a force gauge. Note that the adhesive force is measured using the same method as described above.

Figure 43:
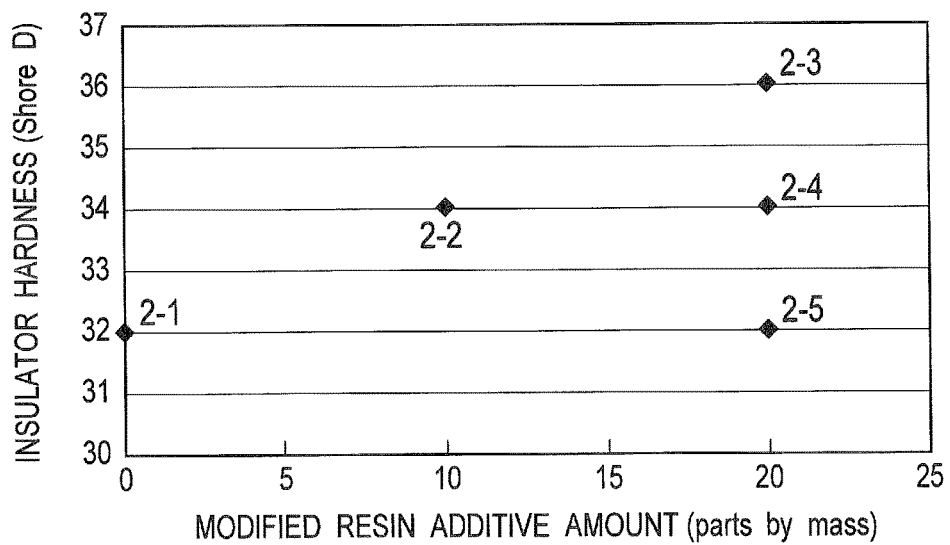
FIG. 43 is a graph showing a relationship between the additive amount of modified resin and hardness (Shore D) of the insulator.

FIG. 43 shows the relationship between the additive amount of the modified resin and the hardness (Shore D) of the insulator. It can be seen from FIG. 43 that the hardness is improved by increasing the additive amount of the modified resin compared with Samples 2-1 to 2-3. However, it can also be seen from FIG. 43 that the hardness is reduced when the additive amount of the rubber material is increased compared with Samples 2-3 to 2-5. Therefore, it can be seen that the insulator can be made more flexible by increasing the additive ratio of the rubber material.

Figure 44:
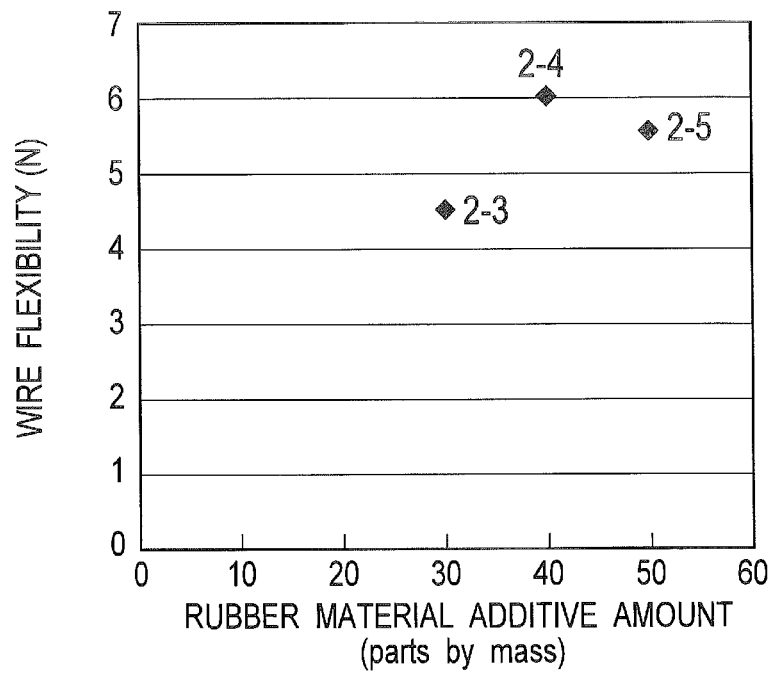
FIG. 44 is a graph showing a relationship between an additive amount of a rubber material and wire flexibility.
Figure 45:
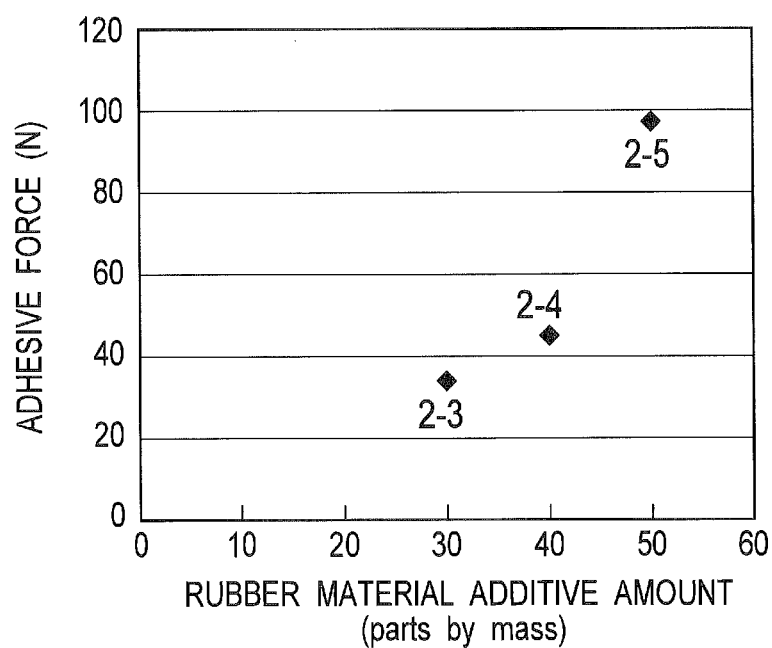
FIG. 45 is a graph showing a relationship between the additive amount of the rubber material and adhesive force.

FIG. 44 shows the relationship between the additive amount of the rubber material and the wire flexibility. FIG. 45 shows the relationship between the additive amount of the rubber material and the adhesive force. As shown in FIG. 44, the flexibility of the wire is not necessarily improved even though the additive amount of the rubber material is increased. More specifically, as shown in FIG. 45, when the additive amount of the rubber material is simply increased, the adhesive force between the insulator and the metal conductor is increased. Thus, the flexibility of the wire may not be improved.

As described above, in order to achieve the flexibility of the wire, not only is it important to make the insulator composition flexible, but it is also required to give adequate consideration to adhesion between the insulator composition and the conductor. Also, the adhesion between the insulator composition and the conductor can be drastically changed by changing the extrusion method, and can also be reduced by the lubricant contained in the insulator composition. Therefore, the inventors of the present invention have studied the kind of the lubricant and the additive amount thereof to achieve the flexibility. To be more specific, an insulator composition obtained by mixing materials shown in Tables 6 and 7 is applied onto a metal conductor by extrusion molding. Furthermore, electron beam cross-linking (750 kV×16 Mrad) is performed on a cable thus obtained, thereby cross-linking the resins included in the insulator. Thus, wire samples 3-1 to 3-16 are prepared. Note that, as for the metal conductor, a twisted wire having the outside diameter of 2.25 mm is used, which is obtained by twisting 37 pure copper strands together, each having the outside diameter of 0.32 mm. Furthermore, adjustments are made such that the thickness of the insulator is 0.7 mm and the outside diameter of the wire sample to be obtained is 3.65 mm. Moreover, the insulator is formed by full extrusion whereby the inner periphery thereof enters between the strands of the metal conductor.

TABLE 6

| Sample Number | Compounding Ratio (Parts mass) | | | | | | | |
|---|---|---|---|---|---|---|---|---|
| | 3-1 | 3-2 | 3-3 | 3-4 | 3-5 | 3-6 | 3-7 | 3-8 |
| EEA | 30 | 30 | 30 | 30 | 30 | 30 | 30 | 30 |
| EVM | 50 | 50 | 50 | 50 | 50 | 50 | 50 | 50 |
| Modified LLDPE | 20 | 20 | 20 | 20 | 20 | 20 | 20 | 20 |
| Aluminum Hydroxide Subjected to Silane Coupling Treatment | 100 | 100 | 100 | 100 | 100 | 100 | 100 | 100 |
| Silicone-Based Lubricant | 0 | 1 | 2 | 4 | 0 | 0 | 0 | 0 |
| Zinc Behanate (Lubricant) | 0 | 0 | 0 | 0 | 1 | 2 | 4 | 0 |
| Fatty Acid Ester (Lubricant) | 0 | 0 | 0 | 0 | 0 | 0 | 0 | 1 |
| Polyethylene-Based (Lubricant) | 0 | 0 | 0 | 0 | 0 | 0 | 0 | 0 |
| Stearic Acid (Lubricant) | 0 | 0 | 0 | 0 | 0 | 0 | 0 | 0 |

TABLE 7

| Sample Number | Compounding Ratio (Parts mass) | | | | | | | |
|---|---|---|---|---|---|---|---|---|
| | 3-9 | 3-10 | 3-11 | 3-12 | 3-13 | 3-14 | 3-15 | 3-16 |
| EMA | 30 | 30 | 30 | 30 | 30 | 30 | 30 | 30 |
| EVM | 50 | 50 | 50 | 50 | 50 | 50 | 50 | 50 |
| Modified LLDPE | 20 | 20 | 20 | 20 | 20 | 20 | 20 | 20 |
| Aluminum Hydroxide Subjected to Silane Coupling Treatment | 100 | 100 | 100 | 100 | 100 | 100 | 100 | 100 |
| Silicone-Based Lubricant | 0 | 0 | 0 | 0 | 0 | 0 | 0 | 0 |
| Zinc Behanate (Lubricant) | 0 | 0 | 0 | 0 | 0 | 0 | 0 | 0 |
| Fatty Acid Ester (Lubricant) | 2 | 4 | 0 | 0 | 0 | 0 | 0 | 0 |
| Polyethylene-Based (Lubricant) | 0 | 0 | 1 | 2 | 4 | 0 | 0 | 0 |
| Stearic Acid (Lubricant) | 0 | 0 | 0 | 0 | 0 | 1 | 2 | 4 |

In Tables 6 and 7, "EMA" represents ethylene-methyl acrylate copolymer (trade name "Elvaloy (registered trademark) AC1125" (Mitsui DuPont Polychemical Co., Ltd.)). "EVM" represents rubbery copolymer of ethylene and vinyl acetate (trade name "Levapren (registered trademark) 700" (Lanxess Co., Ltd.)). "Modified LLDPE" represents a compound having polar groups introduced into the side chain of linear low-density polyethylene (trade name "MODIC (registered trademark) LLDPE M545" (Mitsubishi Chemical Corporation). As for aluminum hydroxide subjected to silane coupling treatment, BF013STV manufactured by Nippon Light Metal Company, Ltd. is used.

Also, as the silicone-based lubricant, GENIOPLAST (registered trademark) Pellet S manufactured by Asahikasei Wacker Silicone Co., Ltd. is used. As the zinc behanate, SCI-ZNB manufactured by Sun-Ace Company Ltd. is used. As the fatty acid ester, RIKESTER (registered trademark) EW-100 manufactured by Riken Vitamin Co., Ltd. is used. As the polyethylene-based lubricant, Hiwax (registered trademark) 400P manufactured by Mitsui Chemicals, Inc. is used. As the stearic acid, LUNAC S-50V manufactured by Kao Corporation is used.

As for the wire samples of the respective compositions thus obtained, the adhesive force and the tensile strength of the insulator are measured. The adhesive force is measured using the same method as described above. As for the tensile strength of the insulator, first, a tube-shaped sample including only the insulator is prepared by removing the metal conductor from the wire sample. Then, the tensile strength is measured by conducting a tensile test on the tube-shaped sample at a rate of 200 mm/min based on JIS K7161.

Figure 47:
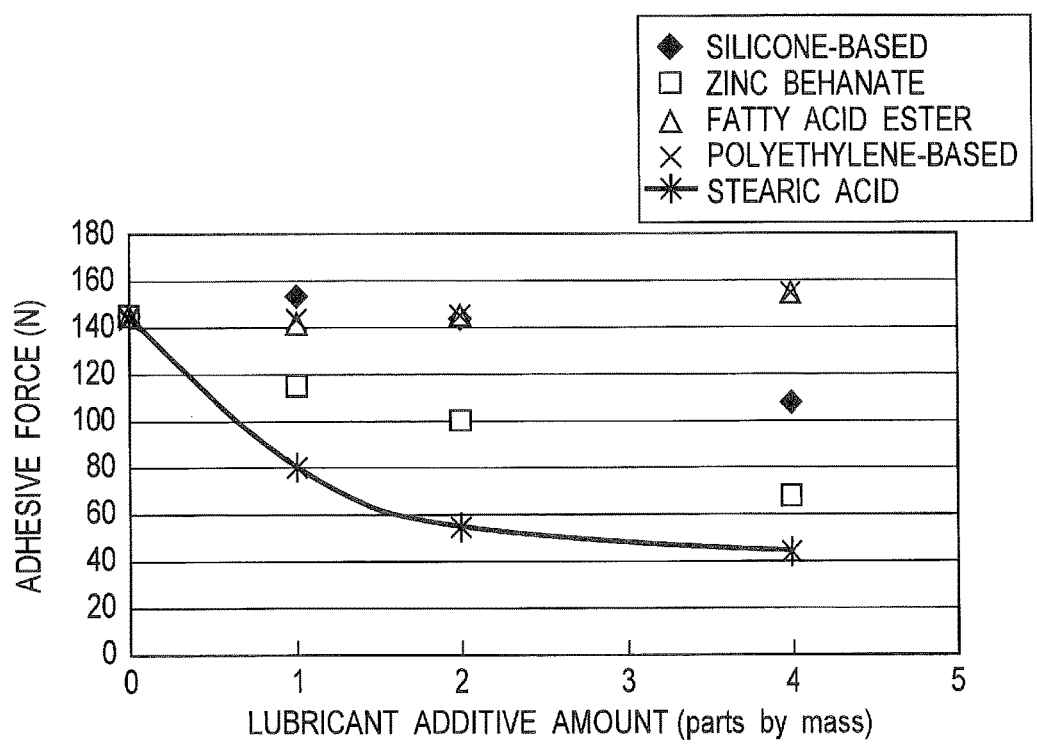
FIG. 47 is a graph showing a relationship between an additive amount of each lubricant and adhesive force.
Figure 48:
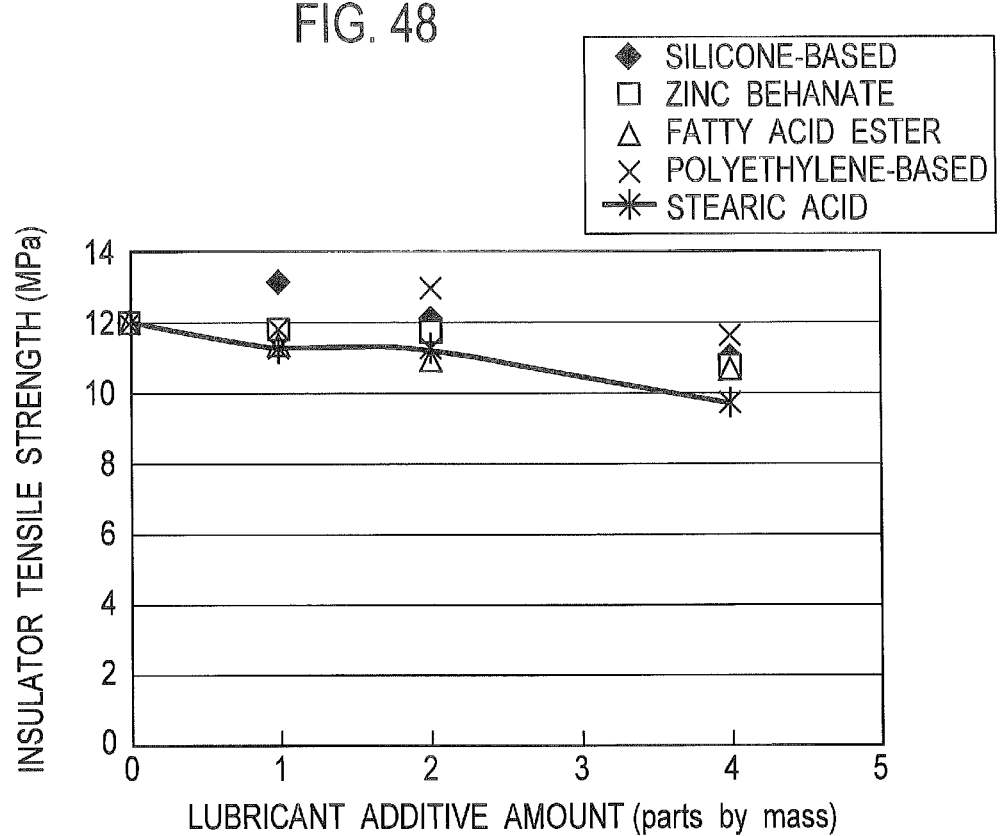
FIG. 48 is a graph showing a relationship between the additive amount of each lubricant and tensile strength of the insulator.

FIG. 47 shows the relationship between the additive amount in each lubricant and the adhesive force. FIG. 48 shows the relationship between the additive amount in each lubricant and the tensile strength of the insulator. It can be seen from FIG. 47 that the stearic acid has the largest effect of reducing the adhesive force. Also, the effect of reducing the adhesive force appears when 0.5 parts mass (phr) or more is added. However, as shown in FIG. 48, the tensile strength is lowered as the additive amount of the stearic acid is increased. Therefore, from the viewpoint of maintaining the strength of the insulator, it is preferable that the additive amount of the stearic acid is 4 parts mass (phr) or less. Moreover, from the viewpoint of achieving the effect of reducing the adhesive force, it is preferable that the additive amount of the stearic acid is 0.5 parts mass (phr) or more.

Next, the inventors of the present invention have also studied the combination of lubricants described above. To be more specific, an insulator composition obtained by mixing materials shown in Tables 8 and 9 is applied onto a metal conductor by extrusion molding. Furthermore, electron beam cross-linking (750 kV×16 Mrad) is performed on a cable thus obtained, thereby cross-linking the resins included in the insulator. Thus, wire samples 4-1 to 4-10 are prepared. Note that, as for the metal conductor, a twisted wire having the outside diameter of 2.25 mm is used, which is obtained by twisting 37 pure copper strands together, each having the outside diameter of 0.32 mm. Furthermore, adjustments are made such that the thickness of the insulator is 0.7 mm and the outside diameter of the wire sample to be obtained is 3.65 mm. Moreover, the insulator is formed by full extrusion whereby the inner periphery thereof enters between the strands of the metal conductor. Note that, as for EMA, EVM, modified LLDPE, aluminum hydroxide subjected to silane coupling treatment, silicone-based lubricant, zinc behanate, fatty acid ester, polyethylene-based lubricant, and stearic acid, the same ones as those in Samples 3-1 to 3-16 are used.

TABLE 8

| Sample Number | Compounding Ratio (Parts mass) | | | | |
|---|---|---|---|---|---|
| | 4-1 | 4-2 | 4-3 | 4-4 | 4-5 |
| EMA | 30 | 30 | 30 | 30 | 30 |
| EVM | 50 | 50 | 50 | 50 | 50 |
| Modified LLDPE | 20 | 20 | 20 | 20 | 20 |
| Aluminum Hydroxide Subjected to Silane Coupling Treatment | 100 | 100 | 100 | 100 | 100 |
| Silicone-Based Lubricant | 2 | 2 | 2 | 2 | 0 |
| Zinc Behanate (Lubricant) | 2 | 0 | 0 | 0 | 2 |
| Fatty Acid Ester (Lubricant) | 0 | 2 | 0 | 0 | 2 |
| Polyethylene-Based (Lubricant) | 0 | 0 | 2 | 0 | 0 |
| Stearic Acid (Lubricant) | 0 | 0 | 0 | 2 | 0 |

TABLE 9

| Sample Number | Compounding Ratio (Parts mass) | | | | |
|---|---|---|---|---|---|
| | 4-6 | 4-7 | 4-8 | 4-9 | 4-10 |
| EMA | 30 | 30 | 30 | 30 | 30 |
| EVM | 50 | 50 | 50 | 50 | 50 |
| Modified LLDPE | 20 | 20 | 20 | 20 | 20 |
| Aluminum Hydroxide Subjected to Slime Coupling Treatment | 100 | 100 | 100 | 100 | 100 |
| Silicone-Based Lubricant | 0 | 0 | 0 | 0 | 0 |
| Zinc Behanate (Lubricant) | 2 | 2 | 0 | 0 | 0 |
| Fatty Acid Ester (Lubricant) | 0 | 0 | 2 | 2 | 0 |

TABLE 9-continued

| Sample Number | Compounding Ratio (Parts mass) | | | | |
|---|---|---|---|---|---|
| | 4-6 | 4-7 | 4-8 | 4-9 | 4-10 |
| Polyethylene-Based (Lubricant) | 2 | 0 | 2 | 0 | 2 |
| Stearic Acid (Lubricant) | 0 | 2 | 0 | 2 | 2 |

Figure 49:
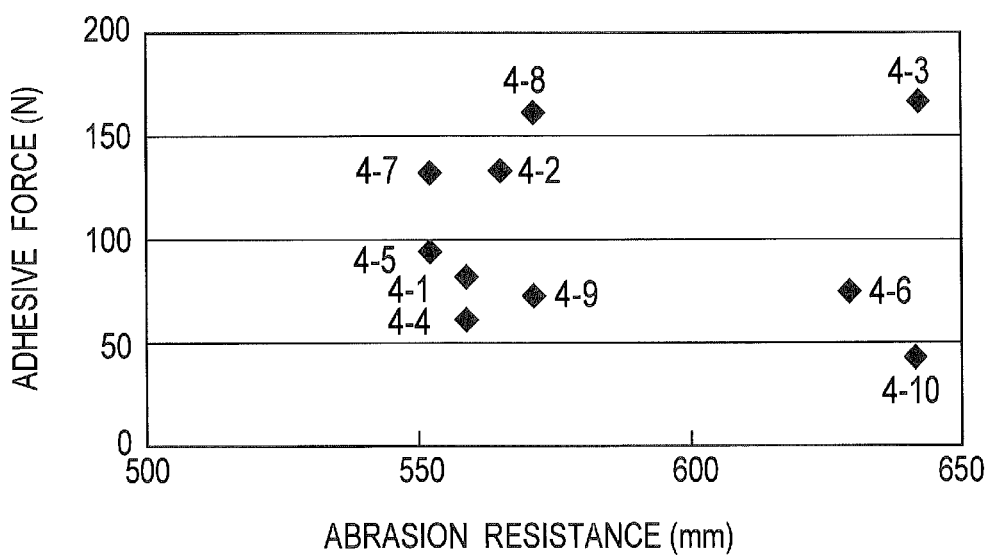
FIG. 49 is a graph showing a relationship between abrasion resistance and adhesive force of the insulator when the lubricants are combined.

As for the wire samples 4-1 to 4-10 of the respective compositions thus obtained, the adhesive force is measured using the same method as described above. In FIG. 49, a material with large abrasion resistance and low adhesive force indicates a better performance. Method for evaluating abrasion resistance will be described later. As shown in FIG. 49, combinations of silicone-based lubricant and zinc behanate, of zinc behanate and fatty acid ester, of silicone-based lubricant and stearic acid, of fatty acid ester and stearic acid, of zinc behanate and polyethylene-based lubricant, and of polyethylene-based lubricant and stearic acid are preferable as the combination of the lubricants.

Next, the inventors of the present invention have studied the relationship between the compounding ratio of metal hydroxide as the flame retardant and the wire flexibility and strength. First, an insulator composition obtained by mixing materials shown in Tables 10 and 11 is applied onto a metal conductor by extrusion molding. Furthermore, electron beam cross-linking (750 kV×16 Mrad) is performed on a cable thus obtained, thereby cross-linking the resins included in the insulator. Thus, wire samples 5-1 to 5-14 are prepared. Note that, as for the metal conductor, a twisted wire having the outside diameter of 2.25 mm is used, which is obtained by twisting 37 pure copper strands together, each having the outside diameter of 0.32 mm. Furthermore, adjustments are made such that the thickness of the insulator is 0.7 mm and the outside diameter of the wire sample to be obtained is 3.65 mm. Moreover, the insulator is formed by full extrusion whereby the inner periphery thereof enters between the strands of the metal conductor.

TABLE 10

| Sample Number | Compounding Ratio (Parts Mass) and Evaluation Result | | | | | | |
|---|---|---|---|---|---|---|---|
| | 5-1 | 5-2 | 5-3 | 5-4 | 5-5 | 5-6 | 5-7 |
| EEA | 70 | 70 | 70 | 70 | 70 | 70 | 70 |
| AEM | 30 | 30 | 30 | 30 | 30 | 30 | 30 |
| Aluminum Hydroxide (Untreated) | 40 | 60 | 80 | 100 | 120 | 140 | 160 |
| Flame Retardance | x | x | ○ | ○ | ○ | ○ | ○ |
| Wire Flexibility | ○ | ○ | ○ | ○ | ○ | ○ | x |

TABLE 11

| Sample Number | Compounding Ratio (Parts Mass) and Evaluation Result | | | | | | |
|---|---|---|---|---|---|---|---|
| | 5-8 | 5-9 | 5-10 | 5-11 | 5-12 | 5-13 | 5-14 |
| EEA | 70 | 70 | 70 | 70 | 70 | 70 | 70 |
| AEM | 30 | 30 | 30 | 30 | 30 | 30 | 30 |
| Magnesium Hydroxide (Untreated) | 40 | 60 | 80 | 100 | 120 | 140 | 160 |
| Flame Retardance | x | ○ | ○ | ○ | ○ | ○ | ○ |
| Wire Flexibility | ○ | ○ | ○ | ○ | ○ | ○ | x |

In Tables 10 and 11, "EEA" represents ethylene-ethyl acrylate copolymer (trade name "NUC-6520" (Nippon Unicar Company Limited)). "AEM" represents ethylene-acrylic rubber (trade name "VAMAC (registered trademark)-DP" (DuPont Corporation)). Furthermore, as for aluminum hydroxide, trade name "BF013" (Nippon Light Metal Company, Ltd) is used. As for magnesium hydroxide, trade name "Kisuma (registered trademark) 5A" (Kyowa Chemical Industry Co., Ltd.) is used.

Then, the wire flexibility and flame retardance are evaluated for the wire samples thus obtained. The evaluation of the wire flexibility is performed using the method shown in FIG. 46 described above. The evaluation of the flame retardance is performed based on a flame retardant test specified by ISO6722 by placing each of the wire samples in a fume hood at the angle of 45 degrees. More specifically, in the case of a wire sample in which the cross-sectional area φ of the metal conductor is 2.5 mm$^2$ or less, an inner flame of a bunsen burner is brought into contact with the lower end of the wire sample for 15 seconds, and then the sample is removed from the bunsen burner. Then, the sample in which the flame on the insulator goes out completely within 70 seconds after the bunsen burner is removed from the wire sample and 50 mm or more of the insulator in the wire sample is left without being combusted is evaluated as "o". On the other hand, the sample in which the flame goes on for over 70 seconds after the bunsen burner is removed from the wire sample or the remnant of the insulator in the wire sample is less than 50 mm is evaluated as "x". Tables 10 and 11 show the evaluation results of the wire flexibility and the flame retardance.

From Table 10, when the flame retardant is aluminum hydroxide, the flame retardance and the wire flexibility can be both achieved if the compounding ratio of aluminum hydroxide is within the range of 80 to 140 parts mass per 100 parts mass of EEA as the resin material and AEM as the rubber material. On the other hand, from Table 11, when the flame retardant is magnesium hydroxide, the flame retardance and the wire flexibility can be both achieved if the compounding ratio of magnesium hydroxide is within the range of 60 to 140 parts mass per 100 parts mass of EEA and AEM.

According to the result of the study described above, the insulator composition according to this embodiment contains: (A) ethylene copolymer and modified resin as the resin material; (B) at least one of ethylene-acrylic rubber and vinyl acetate rubber as the rubber material; (C) aluminum hydroxide subjected to silane coupling treatment as the flame retardant; and (D) lubricant.

As the ethylene copolymer, at least one selected from the group consisting of ethylene-ethyl acrylate copolymer (EEA), ethylene-methyl acrylate copolymer (EMA), and ethylene-vinyl acetate copolymer (EVA) can be used.

The modified resin is not particularly limited as long as the elongation percentage of the insulator composition obtained can be reduced. As the modified resin, for example, ethylene-acrylic acid ester-maleic anhydride ternary copolymer obtained by copolymerizing maleic anhydride with ethylene-ethyl acrylate copolymer, resin having polar groups introduced into the side chain of linear low-density polyethylene, maleic acid modified resin obtained by graft-copolymerizing maleic anhydride with polypropylene resin, modified ethylene-vinyl acetate copolymer (modified EVA) or the like can be used. As for the modified resin, just one kind may be used, or two or more kinds may be mixed and used.

Moreover, as the ethylene-acrylic rubber, rubbery copolymer of ethyl acrylate or other acrylic acid ester with ethylene can be used. As the vinyl acetate rubber, rubbery copolymer (EVM) of ethylene and vinyl acetate can be used.

It is preferable that the ethylene copolymer and the modified resin satisfy the relationship of 20:20 to 77:3 in parts mass. When the ethylene copolymer is less than 20 parts mass and the modified resin exceeds 20 parts mass, the strength may be lowered, leading to insufficient durability of the wire. On the other hand, when the ethylene copolymer exceeds 77 parts mass and the modified resin is less than 3 parts mass, the workability (stripping properties) may be insufficient.

It is preferable that (A) ethylene copolymer and modified resin and (B) at least one of ethylene-acrylic rubber and vinyl acetate rubber satisfy the relationship of (A):(B)=40:60 to 80:20. When the component (A) that is the resin component is less than 40 parts mass and the component (B) that is the rubber component exceeds 60 parts mass, the strength may be lowered, leading to insufficient durability of the wire. On the other hand, when the component (A) exceeds 80 parts mass and the component (B) is less than 20 parts mass, the flexibility may be insufficient.

The insulator composition according to this embodiment contains metal hydroxide as the flame retardant to achieve the flame retardance. Examples of the metal hydroxide include metal compounds having a hydroxyl group or crystal water, such as aluminum hydroxide (Al(OH)$_3$), magnesium hydroxide (Mg(OH)$_2$), calcium hydroxide (Ca(OH)$_2$), basic magnesium carbonate (mMgCO$_3$.Mg(OH)$_2$.nH$_2$O), aluminum silicate hydrate (Al$_2$O$_3$.3SiO$_2$.nH$_2$O), and magnesium silicate hydrate (magnesium silicate pentahydrate, Mg$_2$Si$_3$O$_8$.5H$_2$O). As for the metal hydroxide, just one kind may be used, or two or more kinds may be mixed and used. Among the above, aluminum hydroxide is particularly preferable as the metal hydroxide.

It is preferable that the amount of aluminum hydroxide to be mixed as the metal hydroxide is 80 to 140 parts mass per 100 parts mass of the component (A) as the resin material and the component (B) as the rubber material combined. When the aluminum hydroxide is less than 80 parts mass, sufficient flame retardance may not be achieved. On the other hand, when the aluminum hydroxide exceeds 140 parts mass, flexibility required for the wire may not be obtained.

Moreover, it is preferable that the metal hydroxide is surface-treated in consideration of compatibility with the resin material. For surface treatment of the metal hydroxide, a silane coupling agent, a titanate coupling agent, fatty acid such as stearic acid and stearic acid calcium, metal salt of fatty acid or the like can be used. Among the above, it is preferable to use metal hydroxide surface-treated with a silane coupling agent for the insulator composition according to this embodiment, and more preferable to use aluminum hydroxide subjected to silane coupling treatment. The abrasion resistance and the heat resistance can be both achieved by using aluminum hydroxide subjected to silane coupling treatment.

A silane coupling agent for the silane coupling treatment is not particularly limited. Examples of the silane coupling agent include: vinyl silanes such as vinyl ethoxy silane and vinyl tris(2-methoxyethoxy) silane; γ-methacryloxypropyltrimethoxysilane; γ-aminopropyltrimethoxysilane; β-(3,4-epoxycyclohexyl)ethyltrimethoxysilane); γ-mercaptopropyl trimethoxysilane; γ-mercaptopropyl triethoxysilane; and the like. Among the above, from the viewpoint of achieving high abrasion resistance and reducing the cost, a vinyl silane-based silane coupling agent is preferable, which imparts a vinylsilyl group to the surface of the metal hydroxide. Moreover, the amount of such a silane coupling agent to be used is not particularly limited. For example, it is preferable to use the silane coupling agent within the range of 0.1 to 5 mass % relative to the metal hydroxide, and particularly preferable to use the silane coupling agent within the range of 0.3 to 1 mass %.

The insulator composition according to this embodiment contains a lubricant to improve the flexibility by reducing the adhesion between the conductor and the insulator of the wire. As the lubricant, at least one selected from the group consisting of a silicone-based lubricant, zinc behanate, fatty acid ester, a polyethylene-based lubricant, and stearic acid can be used. Among the above, stearic acid is preferable. As described above, stearic acid has a particularly significant effect of reducing the adhesive force, and thus can further improve the flexibility.

Alternatively, as for the lubricant, multiple kinds may be used in combination. As for the combination of the lubricants, for example, combinations of silicone-based lubricant and zinc behanate, of zinc behanate and fatty acid ester, of silicone-based lubricant and stearic acid, of fatty acid ester and stearic acid, of zinc behanate and polyethylene-based lubricant, and of polyethylene-based lubricant and stearic acid are preferable because of the significant effect of reducing the adhesive force. Therefore, in this embodiment, the lubricant is preferably one selected from the group consisting of stearic acid, a mixture of silicone-based lubricant and zinc behanate, a mixture of zinc behanate and fatty acid ester, a mixture of silicone-based lubricant and stearic acid, a mixture of fatty acid ester and stearic acid, a mixture of zinc behanate and polyethylene-based lubricant, and a mixture of polyethylene-based lubricant and stearic acid.

Note that the additive amount of the lubricant is preferably 0.5 to 4 parts mass per 100 parts mass of the component (A) and the component (B) combined. When the additive amount of the lubricant is less than 0.5 parts mass, the effect of reducing the adhesive force may be insufficient. On the other hand, when the additive amount of the lubricant exceeds 4 parts mass, a bleed-out may occur. Note that the bleed-out is a phenomenon that additives and the like exude from the surface of the material. This phenomenon is the main cause of scratches and the like on the surface of the wire through deposition on processing equipment during processing of the wire into the wire harness.

The insulator composition according to this embodiment can be mixed with various additives without hindering the effect of this embodiment, in addition to the essential components described above. Examples of the additives include flame retardant aid, antioxidant, metal deactivator, anti-aging agent, filler, stiffener, ultraviolet absorber, stabilizer, pigment, dye, colorant, antistat, foaming agent, and the like.

Figure 50:
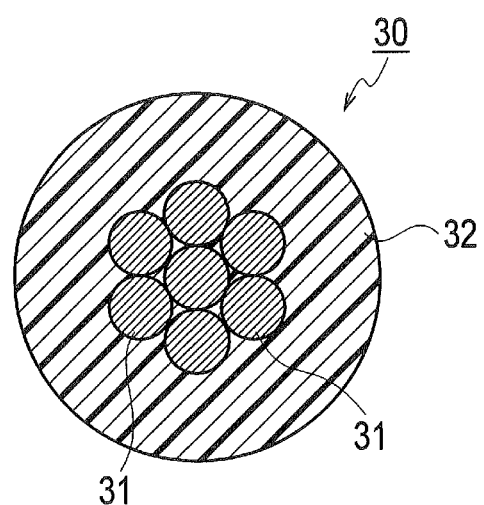
FIG. 50 is a cross-sectional view showing a highly flexible wire according to the first and second embodiments of the present invention.

FIG. 50 shows an example of a highly flexible wire 30 according to this embodiment. The highly flexible wire 30 is formed by covering a metal conductor 31 with an insulator 32 made of the insulator composition described above.

The metal conductor 31 may include only one strand or may be formed by bundling multiple strands together. As for the metal conductor 31, the conductor diameter, the material of the conductor, and the like are not particularly limited, and may be determined depending on the intended use. As the material of the metal conductor 31, heretofore known conductive metal materials can be used, such as copper, copper alloy, aluminum, and aluminum alloy.

Next, description is given of a method for manufacturing the highly flexible wire according to this embodiment. The insulator 32 of the highly flexible wire 30 is prepared by mixing the materials described above. As for the method for preparing the insulator, heretofore known means can be used. For example, the insulator composition included in the insulator 32 can be obtained by pre-blending the materials with a high-speed mixer such as a Henschel mixer and then kneaded with a heretofore known kneader such as a Banbury mixer, a kneader, and a roll mill.

Moreover, as for the method for covering the metal conductor 31 with the insulator 32 in the highly flexible wire according to this embodiment, heretofore known means can be used. For example, the insulator 32 can be formed by a general extrusion molding method. As an extruder used in the extrusion molding method, a single-screw extruder or a twin-screw extruder can be used, which includes a screw, a breaker plate, a cross-head, a distributor, a nipple, and a dice.

To prepare the insulator composition of the insulator 32, an ethylene copolymer and a rubber material are loaded into a twin-screw extruder set at a temperature sufficient to melt a resin material and the rubber material. In this event, other components are also loaded, such as a metal hydroxide and a lubricant as well as a flame retardant aid and an antioxidant as needed. Then, the resin material, the rubber material, and the like are melt and kneaded by the screw, and a certain amount thereof is supplied to the cross-head through the breaker plate. The distributor causes the melt resin material, rubber material, and the like to flow onto the circumference of the nipple, and the dice extrudes the materials in a state of covering the periphery of the conductor. Thus, the insulator 32 covering the periphery of the metal conductor 31 can be obtained.

The insulator composition according to this embodiment contains: (A) ethylene copolymer and modified resin; (B) at least one of ethylene-acrylic rubber and vinyl acetate rubber; (C) 80 to 140 parts mass of aluminum hydroxide subjected to silane coupling treatment per 100 parts mass of the component (A) and the component (B) combined; and (D) 0.5 to 4 parts mass of lubricant per 100 parts mass of the component (A) and the component (B) combined. The ethylene copolymer and the modified resin satisfy the relationship of 20:20 to 77:3 in parts mass, and the component (A) and the component (B) satisfy the relationship of (A):(B)=40:60 to 80:20 in parts mass. Such an insulator composition has not only good flexibility for bending and workability (stripping properties) but also high fluid resistance and mechanical strength. Therefore, routing in a vehicle can be successfully performed by using the insulator composition as the insulator in the wire. Moreover, a wire with improved durability can be obtained since the insulator composition according to this embodiment has high strength and heat resistance.

Furthermore, it is preferable that the insulator composition according to this embodiment has a tensile elongation of 50 to 350%. With the tensile elongation of 50% or more, the flexibility of the wire can be ensured, and the wire can be significantly bent and routed within a short path in the vehicle. Moreover, with the tensile elongation of 350% or less, tearing of the insulator is reduced, and thus the workability (stripping properties) can be improved. Note that the tensile elongation can be obtained in accordance with JIS K6251 (vulcanized rubber and thermoplastic rubber—how to obtain tensile characteristics).

The highly flexible wire 30 according to this embodiment includes the insulator composition described above and the metal conductor 31 covered with the insulator composition.

For the highly flexible wire 30 as described above, the insulator 32 is formed using the insulator composition with good flexibility and workability as well as high fluid resistance, abrasion resistance, and heat resistance. Therefore, the wire has good flexibility for bending, and also has fluid resistance for gasoline or the like as well as abrasion resistance for breaking of wire or the like. Furthermore, the highly flexible wire 30 can be installed near an internal combustion engine, a motor, a converter, and the like as hot parts, because of the high heat resistance. As a result, the highly flexible wire 30 can be favorably used for routing in a vehicle such as an electric vehicle. Moreover, the highly flexible wire 30 can be favorably used as a high-voltage wire because of the high voltage resistance.

Note that, in the highly flexible wire 30 according to this embodiment, the insulator 32 may be formed by full extrusion or tube extrusion. Since the insulator composition according to this embodiment contains the lubricant as described above, the adhesive force between the metal conductor 31 and the insulator 32 is reduced. Therefore, good flexibility can be achieved with any extrusion method. Note, however, that, when higher flexibility is required, the insulator 32 is preferably formed by tube extrusion.

EXAMPLES

Although the present invention is described in more detail below with examples and comparative examples, the present invention is not limited to these examples.

[Preparation of Test Sample]

In the following examples, first, an insulator composition obtained by melting and kneading materials shown in Tables 12 to 14 is applied onto a metal conductor by extrusion molding. Furthermore, electron beam cross-linking (750 kV×16 Mrad) is performed on a cable thus obtained, thereby cross-linking the resins included in the insulator. Thus, wire samples 6-1 to 6-16, 7-1 to 7-16, and 8-1 to 8-8 are prepared. Note that, as for the metal conductor, a twisted wire having the outside diameter of 2.25 mm is used, which is obtained by twisting 37 pure copper strands together, each having the outside diameter of 0.32 mm. Furthermore, adjustments are made such that the thickness of the insulator is 0.7 mm and the outside diameter of the wire sample to be obtained is 3.65 mm. Moreover, the insulator is formed by full extrusion whereby the inner periphery thereof enters between the strands of the metal conductor.

TABLE 12

| Sample Number | Compounding Ratio (Parts Mass) and Evaluation Result | | | | | | | | | | | | | | | |
|---|---|---|---|---|---|---|---|---|---|---|---|---|---|---|---|---|
| | 6-1 | 6-2 | 6-3 | 6-4 | 6-5 | 6-6 | 6-7 | 6-8 | 6-9 | 6-10 | 6-11 | 6-12 | 6-13 | 6-14 | 6-15 | 6-16 |
| EEA | 90 | 80 | 77 | 70 | 60 | 67 | 50 | 57 | 40 | 47 | 30 | 37 | 20 | 27 | 10 | 0 |
| AEM | 10 | 20 | 20 | 20 | 20 | 30 | 30 | 40 | 40 | 50 | 50 | 60 | 60 | 70 | 70 | 60 |
| Modified EEA | 0 | 0 | 3 | 10 | 20 | 3 | 20 | 3 | 20 | 3 | 20 | 3 | 20 | 3 | 20 | 40 |
| Aluminum Hydroxide Subjected to Silane Coupling Treatment | 100 | 100 | 100 | 100 | 100 | 100 | 100 | 100 | 100 | 100 | 100 | 100 | 100 | 100 | 100 | 100 |
| Tensile Strength | ○ | ○ | ○ | ○ | ○ | ○ | ○ | ○ | ○ | ○ | ○ | ○ | ○ | x | x | x |
| Abrasion Resistance | ○ | ○ | ○ | ○ | ○ | ○ | ○ | ○ | ○ | ○ | ○ | ○ | ○ | ○ | ○ | ○ |
| Fluid Resistance (Gasoline) | ○ | ○ | ○ | ○ | ○ | ○ | ○ | ○ | ○ | ○ | ○ | ○ | ○ | x | x | ○ |
| Flexibility | x | ○ | ○ | ○ | ○ | ○ | ○ | ○ | ○ | ○ | ○ | ○ | ○ | ○ | ○ | ○ |
| Stripping Properties | x | x | ○ | ○ | ○ | ○ | ○ | ○ | ○ | ○ | ○ | ○ | ○ | ○ | ○ | ○ |
| Tensile Elongation Percentage | x | x | ○ | ○ | ○ | ○ | ○ | ○ | ○ | ○ | ○ | ○ | ○ | ○ | ○ | ○ |

TABLE 13

| Sample Number | Compounding Ratio (Parts Mass) and Evaluation Result | | | | | | | | | | | | | | | |
|---|---|---|---|---|---|---|---|---|---|---|---|---|---|---|---|---|
| | 7-1 | 7-2 | 7-3 | 7-4 | 7-5 | 7-6 | 7-7 | 7-8 | 7-9 | 7-10 | 7-11 | 7-12 | 7-13 | 7-14 | 7-15 | 7-16 |
| EMA | 90 | 80 | 77 | 70 | 60 | 67 | 50 | 57 | 40 | 47 | 30 | 37 | 20 | 27 | 10 | 0 |
| EVM | 10 | 20 | 20 | 20 | 20 | 30 | 30 | 40 | 40 | 50 | 50 | 60 | 60 | 70 | 70 | 60 |
| Modified LLDPE | 0 | 0 | 3 | 10 | 20 | 3 | 20 | 3 | 20 | 3 | 20 | 3 | 20 | 3 | 20 | 40 |
| Aluminum Hydroxide Subjected to Silane Coupling Treatment | 100 | 100 | 100 | 100 | 100 | 100 | 100 | 100 | 100 | 100 | 100 | 100 | 100 | 100 | 100 | 100 |
| Tensile Strength | ○ | ○ | ○ | ○ | ○ | ○ | ○ | ○ | ○ | ○ | ○ | ○ | ○ | x | x | x |
| Abrasion Resistance | ○ | ○ | ○ | ○ | ○ | ○ | ○ | ○ | ○ | ○ | ○ | ○ | ○ | ○ | ○ | ○ |
| Fluid Resistance (Gasoline) | ○ | ○ | ○ | ○ | ○ | ○ | ○ | ○ | ○ | ○ | ○ | ○ | ○ | ○ | ○ | ○ |
| Flexibility | x | ○ | ○ | ○ | ○ | ○ | ○ | ○ | ○ | ○ | ○ | ○ | ○ | ○ | ○ | ○ |
| Stripping Properties | x | x | ○ | ○ | ○ | ○ | ○ | ○ | ○ | ○ | ○ | ○ | ○ | ○ | ○ | ○ |
| Tensile Elongation Percentage | x | x | ○ | ○ | ○ | ○ | ○ | ○ | ○ | ○ | ○ | ○ | ○ | ○ | ○ | ○ |

TABLE 14

| Sample Number | Compounding Ratio (Parts Mass) and Evaluation Result | | | | | | | |
|---|---|---|---|---|---|---|---|---|
| | 8-1 | 8-2 | 8-3 | 8-4 | 8-5 | 8-6 | 8-7 | 8-8 |
| EVA | 90 | 80 | 77 | 60 | 37 | 20 | 27 | 10 |
| EVM | 10 | 20 | 20 | 20 | 60 | 60 | 70 | 70 |
| Modified LLDPE | 0 | 0 | 3 | 20 | 3 | 20 | 3 | 20 |

TABLE 14-continued

| | Compounding Ratio (Parts Mass) and Evaluation Result | | | | | | | |
|---|---|---|---|---|---|---|---|---|
| Sample Number | 8-1 | 8-2 | 8-3 | 8-4 | 8-5 | 8-6 | 8-7 | 8-8 |
| Aluminum Hydroxide Subjected to Silane Coupling Treatment | 100 | 100 | 100 | 100 | 100 | 100 | 100 | 100 |
| Tensile Strength | o | o | o | o | o | o | o | x |
| Abrasion Resistance | o | o | o | o | o | o | o | o |
| Fluid Resistance (Gasoline) | o | o | o | o | o | o | o | o |
| Flexibility | x | o | o | o | o | o | o | o |
| Stripping Properties | x | x | o | o | o | o | o | o |
| Tensile Elongation Percentage | x | x | o | o | o | o | o | o |

In Tables 12 to 14, "EEA" represents ethylene-ethyl acrylate copolymer (trade name "NUC-6520" (Nippon Unicar Company Limited)). "AEM" represents ethylene-acrylic rubber (trade name "VAMAC (registered trademark)-DP" (DuPont Corporation)). "Modified EEA" represents ethylene-acrylic acid ester-maleic anhydride ternary copolymer (trade name "BONDINE" (registered trademark) LX4110) (Arkema K.K.). "EMA" represents ethylene-methyl acrylate copolymer (trade name "Elvaloy (registered trademark) AC1125" (Mitsui DuPont Polychemical Co., Ltd.)). "EVM" represents rubbery copolymer of ethylene and vinyl acetate (trade name "Levapren (registered trademark) 700" (Lanxess Co., Ltd.)). "Modified LLDPE" represents a compound having polar groups introduced into the side chain of linear low-density polyethylene (trade name "MODIC (registered trademark) LLDPE M545" (Mitsubishi Chemical Corporation). "EVA" represents ethylene-vinyl acetate copolymer (trade name "UBE polyethylene (registered trademark) VZ732" (Ube-Maruzen Plyethylene Co., Ltd.)). As for aluminum hydroxide subjected to silane coupling treatment, BF013STV manufactured by Nippon Light Metal Company, Ltd. is used.

The insulator composition in every test sample contains 1 part mass of stearic acid and 2 parts mass of a polyethylene-based lubricant (polyethylene-based wax) as a lubricant. As the stearic acid, LUNAC S-50V manufactured by Kao Corporation is used. As the polyethylene-based lubricant, Hiwax (registered trademark) 400P manufactured by Mitsui Chemicals, Inc. is used.

[Evaluation]

<Tensile Strength>

In accordance with JIS K7161, only the insulator is sampled from each test sample and a tensile test is conducted at a rate of 200 mm/min. In this event, the tensile strength of 10 MPa or more is evaluated as "o" and that of less than 10 MPa is evaluated as "x".

<Abrasion Resistance>

The abrasion resistance is evaluation with a tape abrasion property. To be more specific, a test sample having a length of 900 mm is fixed, an abrasive tape of No. 150 G specified in JIS R6251 is brought into contact with the test sample, and a weight of 1500 g is applied onto the abrasive tape. Then, a length of the abrasive tape is measured before the test sample is abraded by moving the abrasive tape at a rate of 1500 mm/min in this state and the metal conductor and the abrasive tape come into contact with each other. As a result, the abrasion resistance is evaluated as "o" when the length before the contact is 330 mm or more, and is evaluated as "x" when the length before the contact is less than 330 mm.

<Fluid Resistance>

The evaluation of the fluid resistance (gasoline) is performed in accordance with ISO6722. More specifically, the outside diameter of the test sample is measured before immersion in gasoline. Next, the test sample is immersed in gasoline and left for 30 minutes. After the immersion, the test sample is taken out of the gasoline, and the gasoline adhering to the surface is wiped off. Then, the outside diameter is measured at the same spot as before the immersion. Thus, a change rate (%) of the outside diameter after the immersion is obtained relative to the outside diameter before the immersion in gasoline. The fluid resistance (gasoline) is evaluated as "o" when the change rate of the outside diameter after the immersion relative to the outside diameter before the immersion in gasoline is 15% or less, and is evaluated as "x" when the change rate exceeds 15%.

Change rate (%)=(outside diameter after immersion−outside diameter before immersion)/(outside diameter before immersion)×100

<Wire Flexibility>

A test sample formed of a cable is cut so as to have a length L of 100 mm. Next, as shown in FIG. 46, both ends of the test sample are placed on support stands 21. Then, the reaction force when the center of the test sample is pressed at a rate of 100 mm/minute is measured using a force gauge. As a result, the wire flexibility is evaluated as "o" when the value of the force gauge is 6.50 N or less, and is evaluated as "x" when the value of the force gauge exceeds 6.50 N.

As for the test samples 6-3 to 6-13, 7-3 to 7-13, and 8-3 to 8-7 according to this embodiment, good results are obtained in all the evaluations described above. On the other hand, as for the other test samples, inadequate results are obtained on at least the tensile strength or stripping properties.

While the present invention has been described above with reference to the embodiments, the present invention is not limited thereto, but various modifications can be made without departing from the scope of the present invention.

Moreover, not only the cover 56 of the high-voltage wire 55, but the exterior part 63 may be formed using the same material as that of the cover 56.

In the wire harness 41, the bending load at the bent portion of the harness main body 51 is set to less than 44 N. Thus, an operation of fitting the connector 53 is improved even with the high-voltage wire 55. More specifically, the use of the flexible high-voltage wire 55 improves routing and assembly performance of the wire harness 41.

Moreover, in the wire harness 41, when the bending load of the harness main body 55 is set to less than 44 N and the connector 53 is connected to the counterpart connector 57, the length LX of the straight portion of the wire 55 may be not more than three times larger than the value of the outside diameter DX of the harness main body 51 in a part where the harness main body 51 starts to extend from the connector 53. In the high-voltage wire that is the constituent member of the automobile wire harness, the large outside diameter and increase in bending radius (curvature radius) in bending and routing lead to a problem that space saving in routing cannot be achieved and that the high-voltage wire required for routing is increased in length. However, with the above configuration, the straight portion can be shortened compared with the conventional case, making it possible to achieve space saving in routing of the wire harness 41 including the high-voltage wire 55 and to reduce the high-voltage wire length required for routing. As a result, manufacturing cost for the wire harness 41 can be reduced.

Moreover, the wire harness 41 improves the operation of fitting the connector even when the harness main body 51 includes the exterior part 63 such as a corrugated tube.

Moreover, in the wire harness 41, the constituent members of the harness main body 51 are set with a combination leading to the sum of bending loads less than 44 N, based on previously calculated bending load data for each of bending forms in such constituent members. Thus, the combination that sets the total bending load of the harness main body 51 to be less than 44 N can be easily selected.

Moreover, in the wire harness 41, the previously calculated bending load data indicates a bending form in which at least a part of the harness main body 51 is bent. When the constituent member is the high-voltage wire 55, the bending load data includes data indicating a correlation between the curvature radius R and the bending load of the high-voltage wire 55 and data indicating a correlation between the diameter and the bending load of the high-voltage wire 55. When the exterior part 63 as the constituent member is a corrugated tube, the bending load data is data indicating a correlation between the thickness and bending load of the corrugated tube. Thus, a proper bending load of each constituent member corresponding to the bending form can be identified, and an accurate total bending load of the harness main body 51 can be identified.

Moreover, in the wire harness 41, when the high-voltage wires 55 have different lengths L, the curvature radius R of the high-voltage wire 55B having the larger length L is set larger than that of the shorter high-voltage wire 55A. Thus, in the connector fitted state, a variation in wire length based on a difference in the curvature radius R between the high-voltage wires 55 can be absorbed.

Moreover, the wire harness 41 improves the fluid resistance, workability, and the like, since the cover 56 of the high-voltage wire 55 has the composition described above.

Moreover, the wire harness 41 facilitates routing in a narrow installation space, since the curvature radius R at the bent portion of the harness main body 51 is 60 mm or less.

Moreover, according to the wire harness 41, bending load data is previously calculated for each of bending forms in each of the constituent members of the harness main body 51. Then, each of the constituent members is selected using a combination leading to the sum of bending loads less than 44 N, based on the bending load data. Thereafter, the harness main body 51 is formed using the selected constituent member, and the connector 53 is connected to the counterpart connector 57 by bending the harness main body 51. Thus, the operation of fitting the connector is improved even with the high-voltage wire 55. Moreover, each of the constituent members of the harness main body 51 can be easily selected such that the total bending load of the harness main body 51 is less than 44 N.

Furthermore, according to the wire harness 41, a proper bending load of each constituent member corresponding to the bending form can be identified, and thus an accurate total bending load of the harness main body 51 can be identified.

Note that the contents described above may be considered as a method for routing a wire harness.

More specifically, a method for routing a wire harness including a harness main body including at least a plurality of high-voltage wires and a connector connected to one end of the harness main body, the connector being connected to a counterpart connector by bending the harness main body, includes the steps of: previously calculating (through additional measurement), when the harness main body includes a plurality of constituent members, bending load data for each of a plurality of bending forms (for each bending mode) in each of the constituent members; selecting each of the constituent members in a combination leading to the sum of bending loads less than 44 N, based on the calculated bending load data; and forming the harness main body with the selected constituent member, and connecting the connector to the counterpart connecting by bending the harness main body.

Furthermore, in the method for routing a wire harness, when the connector is connected to the counterpart connector, no straight portion may be provided or the length of the straight portion may be not more than three times larger than the value of the outside diameter of the harness main body in a part where the harness main body starts to extend from the connector.

In this case, the constituent members of the harness main body may include an exterior part covering the periphery of the high-voltage wire.

Moreover, the previously calculated bending load data indicates a bending form in which at least a part of the harness main body is bent (that is, a mode of bending the entire harness main body and a mode of bending a part of the harness main body). When the constituent member is the high-voltage wire, the bending load data includes data indicating a correlation (relationship) between the curvature radius and the bending load of the high-voltage wire and data indicating a correlation (relationship) between the diameter and the bending load of the high-voltage wire. When the exterior part as the constituent member is a corrugated tube, the bending load data is data indicating a correlation (relationship) between a thickness and a bending load of the corrugated tube.

Moreover, when the plurality of high-voltage wires differ in curvature radius in the bending mode of the harness main body, the length of the high-voltage wire having a smaller curvature radius is set larger than that of the high-voltage wire having a larger curvature radius.

Second Embodiment

Figure 51A:
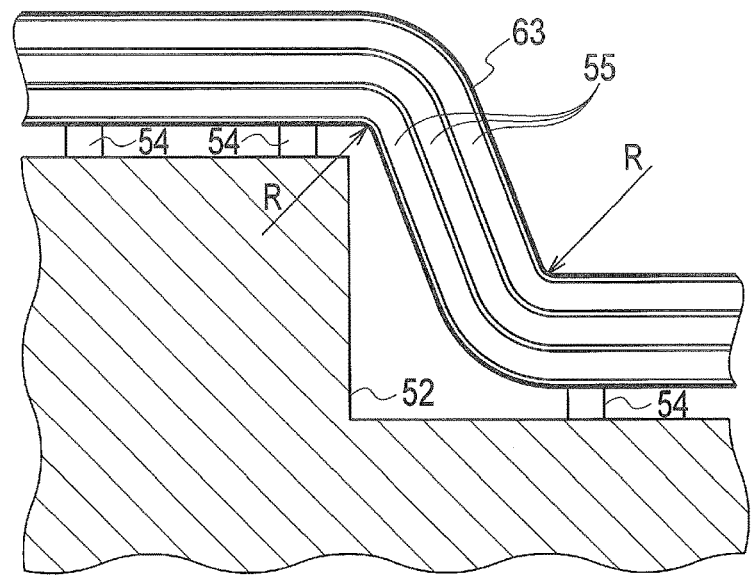
FIG. 51A is a diagram showing a mode of installing a wire harness according to the second embodiment (in a state where installation in a vehicle is completed)
Figure 51B:
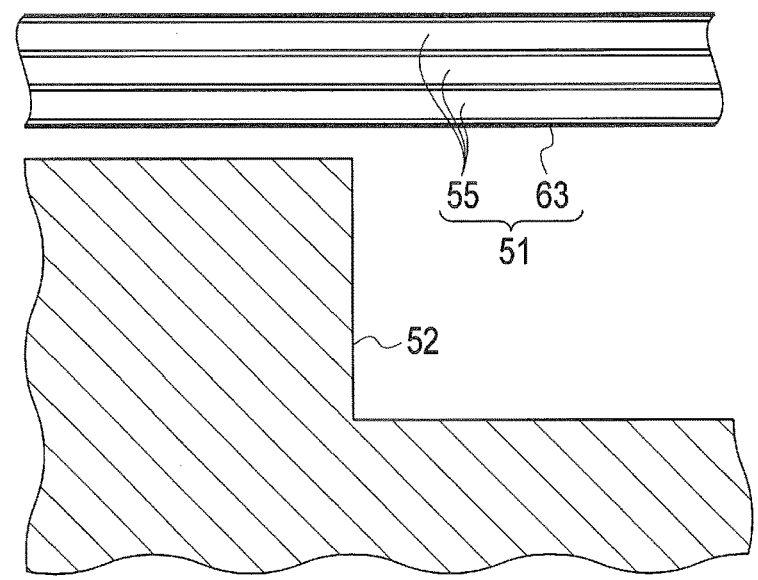
FIG. 51B is a diagram showing a state before installation of the wire harness according to the second embodiment of the present invention in the vehicle.
Figure 51C:
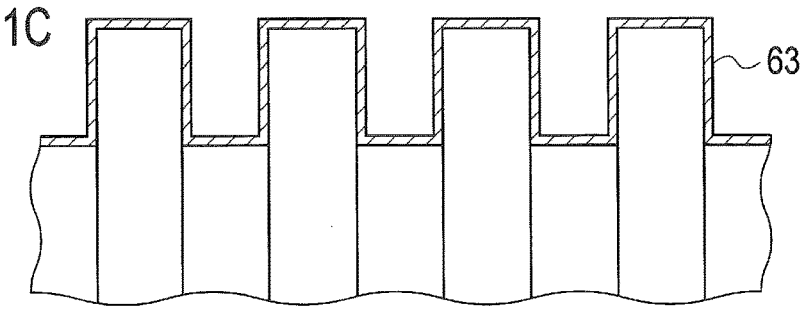
FIG. 51C is a diagram showing an exterior part (corrugated tube) of the wire harness according to the second embodiment of the present invention.
Figure 55:
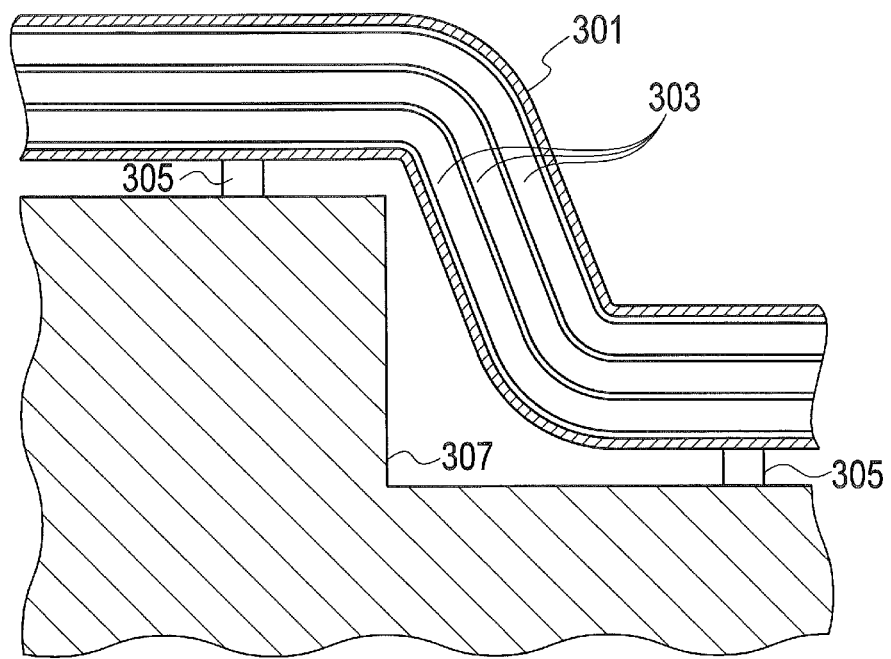
FIG. 55 is a diagram showing a conventional routing structure.

As shown in FIG. 1, a wire harness (wire harness routing structure) 41 according to a second embodiment of the present invention is used to connect an inverter 45 to a motor 47 in a vehicle (electric vehicle, hybrid vehicle, and fuel cell vehicle) 43 and to connect a battery 49 of the vehicle to the inverter 45. As shown in FIGS. 51A to 51C, the wire harness 41 includes a harness main body 51. The harness main body 51 includes a high voltage wire 55 and an exterior part 63. Note that, in FIG. 1, reference numeral 44 denotes a front wheel of the vehicle 43, which is driven to be rotated by the motor 47.

The exterior part 63 is formed using a corrugated tube that is easily deformed (for example, more easily deformed than one high-voltage wire 55), for example, and is covered with the high-voltage wire 55.

For example, the bending load in at least one bent portion of the linearly extending wire harness main body 51 (wire harness 41) is set to less than 44 newtons.

The harness main body 51 includes at least a plurality of high-voltage wires 55. Each of the high-voltage wires 55 is an automobile cable for use when a system voltage (circuit voltage) is direct current 60V or more, which is formed into an elongated cylindrical shape, for example. Also, the high-voltage wire 55 includes: a core made of a conductive material such as copper; and a cover 56 made of an insulating material (rubber, synthetic resin or the like) covering the core.

As shown in FIGS. 51A to 51C, the plurality of high-voltage wires 55 extend side by side such that longitudinal directions thereof coincide with each other. Note that, in FIGS. 51A and 51B, the illustration of the exterior part (corrugated tube) 63 is simplified, and the exterior part 63 is illustrated in the shape of a simple tube rather than a bellows shape shown in FIG. 51C.

In the wire harness 41, for example, connectors (not shown) are provided at both ends of the harness main body 51 (high-voltage wire 55). One of the connectors is connected to one electric device (for example, the inverter 45), and the other connector is connected to the other electric device (for example, the motor 47). Thus, one electric device (for example, the inverter 45) and the other electric device (for example, the motor 47) are electrically connected to each other by the wire harness 41.

In this event, the harness main body 51 (the high-voltage wire 55 and the exterior part 63) are bent from the state shown in FIG. 51B to the state shown in FIG. 51A. The bending load at the bent portion of the harness main body 51 in this event is set to less than 44 N (preferably, less than 42 N, more preferably, less than 38 N). 44 N is the maximum value of the bending load in bending the harness main body 51.

In the state shown in FIG. 51A, the harness main body is fixed to a vehicle body of a vehicle (electric vehicle or hybrid vehicle) 43 with at least two fixing members (clamp members) 54 in a state where the bending form of the bent portion is maintained.

As shown in FIG. 51A, in a state where the installation (routing) of the wire harness 41 is completed, the curvature radius R at the bent portion of the harness main body 51 is 60 mm or less (for example, about 40 mm to 60 mm).

To be more specific, in FIG. 51A, three high-voltage wires 55 extend close to each other, and the interval between the adjacent high-voltage wires 55 (distance between the central axis of one high-voltage wire 55 and the central axis of the other high-voltage wire 55) is slightly larger than the outside diameter of the high-voltage wire 55.

The curvature radius R of the bent portion of the harness main body 51 shown in FIG. 51A is of a portion where the curvature radius is minimized (a point on the inside of the surface of the exterior part 63 shown in FIG. 51A) in the exterior part 63, for example. However, as the curvature radius R of the bent portion of the harness main body 51, the curvature radius of the central axis of the high-voltage wire 55 may be adopted, or a curvature radius of a point on the outside of the surface of the exterior part 63 shown in FIG. 51A may be adopted.

Note that the tube-shaped exterior part 63 having the high-voltage wires 55 installed therein is formed using synthetic resin, for example.

Moreover, although the harness main body 51 is bent in a two-dimensional mode in the above description, the harness main body 51 may be bent in a three-dimensional mode. More specifically, in the above description, the harness main body 51 is bent into an arc shape only around the axis extending in the direction perpendicular to the page space of FIGS. 51A to 51C. In addition to this bending, the harness main body 51 may be simultaneously bent around the axis extending in the left-to-right direction or top-to-bottom direction of the page space of FIGS. 51A to 51C.

Moreover, in the wire harness 41, the constituent members of the harness main body 51 are set in a predetermined combination regarding the bending load. The predetermined combination is a combination leading to the sum of the bending loads less than 44 N, based on bending load data (bending load data previously obtained by additional measurement) previously calculated for each of bending forms (bending modes) in each of the constituent members (the high-voltage wires 55 and the exterior part 63).

Here, description is given of, as an example, a case where the harness main body 51 includes only the high-voltage wires 55 without the exterior part 63, and a part of the harness main body 51 is bent into a ¼ arc shape. Note that, in FIG. 51A, a part of the harness main body 51 is bent into an approximately ¼ arc shape.

FIG. 3 shows a measurement result of the bending load (bending load of bending as shown in FIG. 51A; maximum value of bending load) of the high-voltage wires 55 when the bending radius (curvature radius) R of the harness main body 51 is 60 mm. As the high-voltage wires 55, a high-voltage wire WA with a cover 56 made of cross-linked polyethylene, a high-voltage wire WB with a cover 56 made of flexible cross-linked polyethylene, a high-voltage wire WC with a cover 56 made of silicone rubber, a high-voltage wire WD with a cover 56 made of vinyl acetate rubber composition, and a high-voltage wire WE with a cover 56 made of flexible cross-linked polyethylene are adopted. The high-voltage wires WA, WB, WC, and WD have the same configuration except for the material of the cover 56.

The thickness of the cover (insulator) of each of the high-voltage wires WA to WE is 1.4 mm, and the outside diameter of each of the high-voltage wires WA to WE is 9.1 mm.

Note that the core (strand configuration) of the high-voltage wires WA, WB, WC, and WD is "0.32/19/26". In "0.32/19/26", 19 strands, each having a diameter of 0.32 mm, are twisted into one twisted wire, and 26 twisted wires are twisted into the core.

Moreover, the core of the high-voltage wire WE is "0.18/19/80". In "0.18/19/80", 19 strands, each having a diameter of 0.18 mm, are twisted into one twisted wire, and 80 twisted wires are twisted into the core.

The bending loads (bending loads previously obtained by measurement) of the high-voltage wires WA, WB, WC, WD, and WE in this event are 22 N, 16 N, 6 N, 8 N, and 12 N, respectively.

FIG. 4 shows bending loads when the harness main body is bent in the mode shown in FIGS. 51A to 51C by selecting (including redundant selections) two high-voltage wires from the high-voltage wires WA, WB, WC, WD, and WE, and combining the selected two high-voltage wires. The bending load of the two high-voltage wires is the sum of the bending load of one high-voltage wire and the bending load of another high-voltage wire.

FIG. 5 shows the result of a questionnaire for operators during an operation of bending the harness main body into a ¼ arc shape as shown in FIGS. 51A to 51C.

The combinations of the high-voltage wires 55 are the same as those shown in FIG. 4. In the second embodiment, the "load on the housing" described in FIG. 5 corresponds to the load shown in FIG. 4, which is the bending load of the high-voltage wires 55 combined.

Targets (operators; subjects) are twelve females and males, Female A, Female B, Female C, Female D, Female F, Female G, Female H, Female I, Male A, Male B, Male C, and Male D. "○" in the table of FIG. 5 means that the target (operator; subject) can perform the operation of bending the high-voltage wires 55 and that he/she can carry on the operation.

For example, in the bending operation of the wire harness 41 (this test was performed on high-voltage wires 55, which is a wire harness 41 without an exterior part 63), the harness main body 51 includes two high-voltage wires WA and the bending load at the bent portion of the harness main body 51 is 44 N, as shown in FIG. 5. In this case, Female A cannot perform the bending operation of the wire harness 41. Also, when the harness main body 51 includes one high-voltage wire WA and one high-voltage wire WB and the bending load at the bent portion of the harness main body 51 is 38 N, Female A can perform the bending operation of the wire harness 41.

Referring to FIG. 5 as a whole, it can be considered that the operator can perform the bending operation of the wire harness 41 when the bending load at the bent portion of the harness main body 51 is less than 44 N.

Next, description is given of a case where the harness main body 51 is bent into a ½ arc shape.

FIG. 8 shows a measurement result of the bending load (bending load of bending the harness main body 51 into a ½ arc shape; maximum value of bending load) of the high-voltage wires 55 when the bending radius (curvature radius) R of the harness main body 51 is 40 mm. As the high-voltage wires 55, a high-voltage wire WA with a cover 56 made of cross-linked polyethylene, a high-voltage wire WB with a cover 56 made of flexible cross-linked polyethylene, a high-voltage wire WC with a cover 56 made of silicone rubber, a high-voltage wire WD with a cover 56 made of vinyl acetate rubber composition, and a high-voltage wire WE with a cover 56 made of flexible cross-linked polyethylene are adopted as in the case of FIG. 3.

The thickness of the cover (insulator) of each of the high-voltage wires WA to WE is 1.4 mm, and the outside diameter of each of the high-voltage wires WA to WE is 9.1 mm, as in the case of FIG. 3.

Note that, as in the case of FIG. 3, the core (strand configuration) of the high-voltage wires WA, WB, WC, and WD is "0.32/19/26". Moreover, the core of the high-voltage wire WE is "0.18/19/80".

The bending loads (bending loads previously obtained by measurement) of the high-voltage wires WA, WB, WC, WD, and WE in this event are 43 N, 28 N, 13 N, 14 N, and 20 N, respectively.

FIG. 9 shows bending loads when the harness main body 51 is bent into a ½ arc shape by selecting (including redundant selections) two high-voltage wires from the high-voltage wires WA, WB, WC, WD, and WE, and combining the selected two high-voltage wires, as in the case of FIG. 4. The bending load of the two high-voltage wires is the sum of the bending load of one high-voltage wire and the bending load of another high-voltage wire.

FIG. 10 shows the result of a questionnaire for operators during an operation of bending the high-voltage wires 55 into a ½ arc shape.

The combinations of the high-voltage wires 55 are the same as those shown in FIG. 9. In the second embodiment, the "load on the housing" described in FIG. 10 corresponds to the load shown in FIG. 9, which is the bending load of the high-voltage wires 55 combined.

As in the case of FIG. 5, targets are twelve females and males, Female A, Female B, Female C, Female D, Female F, Female G, Female H, Female I, Male A, Male B, Male C, and Male D.

For example, in the bending operation of the wire harness 41 bent into a ½ arc shape, when the harness main body 51 includes two high-voltage wires WB and the bending load at the bent portion of the harness main body 51 is 56 N, Female A cannot perform the bending operation of the wire harness 41, as shown in FIG. 10. Also, when the harness main body 51 includes one high-voltage wire WB and one high-voltage wire WD and the bending load at the bent portion of the harness main body 51 is 42 N, Female A can perform the bending operation of the wire harness 41.

Referring to FIG. 10 as a whole, as in the case of FIG. 5, it can be considered that the operator can perform the bending operation of the wire harness 41 when the bending load at the bent portion of the harness main body 51 is less than 42 N.

Next, description is given of, as an example, a case where the harness main body 51 includes the exterior part 63 and the high-voltage wires 55.

The exterior part 63 has a rectangular cross-section (cross-section along the plane perpendicular to the longitudinal direction) as shown in FIG. 16, for example. Thus, the exterior part 63 has the shape of a rectangular tube and is configured to have a plurality of high-voltage wires 55 installed therein. Note that the cross-sectional shape of the exterior part 63 may be another shape such as circular shape.

A width W1 of the exterior part 63 is a predetermined value, and a height T1 thereof is also a predetermined value. The exterior part 63 has a wall thickness of "t1".

Note that, in the above description, the cross-sectional shape of the exterior part 63 is a fixed shape. However, the cross-sectional shape may change periodically as shown in FIGS. 51C and 52. More specifically, the exterior part 63 may have a shape in which a large-diameter part and a small-diameter part are alternately repeated in the longitudinal direction (corrugated tube).

FIG. 18 shows a measurement result of the bending load in the mode shown in FIG. 17 when the bending radius (curvature radius) R of the exterior part 63 and the wall thickness t1 are changed. For example, when the wall thickness t1 of the exterior part 63 is 0.15 mm and the bending radius R is 50 mm, the bending load (for example, the maximum value of the bending load) of the exterior part 63 is 2.27 N.

Note that FIG. 18 also shows, as an example, cases where the bending radius R is "50 mm", "35 mm", and "25 mm". The bending load when the bending radius R is 60 mm is slightly smaller than that when the bending radius R is 50 mm. Meanwhile, the bending load when the bending radius R is 40 mm is a value between the bending load when the bending radius R is 50 mm and the bending load when the bending radius R is 35 mm.

When the harness main body 51 includes the exterior part 63 and the high-voltage wires 55, the sum of the bending load of the exterior part 63 and the bending load of the high-voltage wires 55 may be set to less than 44 N in the bending operation of the wire harness 41 bent into a ½ arc shape.

For example, in the case of a bending operation where the bending radius R is 40 mm and bent into a ½ arc shape, two high-voltage wires WD shown in FIG. 9 and the exterior part 63 having the wall thickness t1 of 0.4 mm shown in FIG. 18 are used in combination. In this case, the sum of the bending load of the two high-voltage wires WD and the bending load of the exterior part 63 having the wall thickness t1 of 0.4 mm is an approximated value of 28 N+9.09 N=37.09 N, which is slightly smaller than 37.09 N. This is because 9.09 N results from the bending radius R being 35 mm, which is slightly smaller than 40 mm, as shown in FIG. 18.

Note that, when the sum of the bending load of the exterior part 63 and the bending load of the high-voltage wires 55 is set to less than 44 N, it is desirable that the bending load of the high-voltage wire 55 is set to less than 37 N and the bending load of the exterior part 63 is set to less than 7 N. When the sum of the bending load of the exterior part 63 and the bending load of the high-voltage wires 55 is set to less than 42 N, it is desirable that the bending load of the high-voltage wire 55 is set to less than 35.3 N and the bending load of the exterior part 63 is set to less than 6.7 N. When the sum of the bending load of the exterior part 63 and the bending load of the high-voltage wires 55 is set to less than 38 N, it is desirable that the bending load of the high-voltage wire 55 is set to less than 33 N and the bending load of the exterior part 63 is set to less than 5 N.

Here, the bending load data shown in FIGS. 3 and 8 can be obtained using the method shown in FIGS. 6 and 13, as in the case of the first embodiment.

Incidentally, in the wire harness 41, the previously calculated bending load data indicates a bending form in which a part (at least a part) of the harness main body 51 is bent as shown in FIG. 51A. For example, in FIG. 51A, the intermediate portion in the longitudinal direction of the wire harness main body 51 is bent.

Moreover, when the constituent members are the high-voltage wire 55, the previously calculated bending load data includes data indicating a correlation (relationship) between the curvature radius R and the bending load of each high-voltage wire 55 and data indicating a correlation (relationship) between the diameter (for example, the diameter of the core) of the high-voltage wire 55 and the bending load thereof.

Meanwhile, when the constituent member is the exterior part 63, the previously obtained bending load data is data indicating a correlation (relationship) between the wall thickness t1 and the bending load of the exterior part (corrugated tube) 63.

Here, the previously calculated bending load data that include data indicating a correlation (relationship) between the curvature radius R and the bending load of each high-voltage wire 55 and data indicating a correlation (relationship) between the diameter (for example, the diameter of the core) of the high-voltage wire 55 and the bending load thereof can be obtained using the method shown in FIGS. 10 to 28 and approximate equations f1 to f28 are obtained, as in the case of the first embodiment.

Here, description is given of a relationship between an inside diameter ID and a bending load of a corrugated tube 63 as shown in FIG. 52.

The corrugated tube 63 is made of polyamide, and has a wall thickness t1 of 0.27 mm. The bending load of the corrugated tube 63 is measured in the same manner as the case shown in FIG. 17.

As the inside diameter ID of the corrugated tube 63, an inside diameter of a small-diameter part of the corrugated tube 63 is adopted.

FIG. 53 shows the result of measurement of the bending load when a bending radius (curvature radius) R of the corrugated tube 63 is set to 40 mm and the inside diameter ID of the corrugated tube 63 is changed. For example, when the inside diameter ID of the corrugated tube is 5 mm, the bending load (for example, the maximum value of the bending load) of the corrugated tube 63 is 0.47 N.

FIG. 54 is a graph showing the table of FIG. 53. The horizontal axis (x-axis) of FIG. 54 represents the inside diameter (unit=mm) of the corrugated tube 63, while the vertical axis (y-axis) represents the bending load (unit=N). From FIG. 54, an approximate equation (f29) y=0.6268x−2.5339 is obtained.

By previously obtaining the approximate equations f1 to f29 or similar approximate equations, and using such approximate equations as needed, correlation data can be obtained even for the corrugated tube 63 with the core having a diameter that is not actually measured, the bending radius R, and the wall thickness t1 that is not actually measured. Therefore, bending load data on the respective constituent members in the harness main body 51 can be obtained. Thus, a combination leading to the sum of bending loads less than 44 N can be easily obtained based on the bending load data.

Here description is given of the cover 56 of the high-voltage wire 55. The cover 56 of the high-voltage wire 55 has the following insulator composition.

More specifically, the insulator composition that makes up the cover 56 of the high-voltage wire 55 (high-voltage wire WD shown in FIGS. 51A to 51C, and the like) contains: (A) ethylene copolymer and modified resin; (B) at least one of ethylene-acrylic rubber and vinyl acetate rubber; (C) 80 to 140 parts mass of aluminum hydroxide subjected to silane coupling treatment per 100 parts mass of the component (A) and the component (B) combined; and (D) 0.5 to 4 parts mass of lubricant per 100 parts mass of the component (A) and the component (B) combined. The ethylene copolymer and the modified resin satisfy the relationship of 20:20 to 77:3 in parts mass, and the component (A) and the component (B) satisfy the relationship of (A):(B)=40:60 to 80:20 in parts mass.

The inventors of the present invention have studied flexibility, strength (tensile rupture strength), fluid resistance (battery fluid), fluid resistance (gasoline), and heat resistance for various materials for use in a highly flexible wire (high-voltage wire), as in the case of the first embodiment. Results of the study obtained by selecting a resin material are shown in Tables 1 to 14 described in the first embodiment.

As for the test samples 6-3 to 6-13, 7-3 to 7-13, and 8-3 to 8-7 according to this embodiment, good results are obtained in all the evaluations described above, as in the case of the first embodiment. On the other hand, as for the other test samples, inadequate results are obtained on at least the tensile strength or stripping properties, as in the case of the first embodiment.

While the second embodiment has been described above, the present invention is not limited thereto, but various modifications can be made without departing from the scope of the present invention.

For example, not only the cover 56 of the high-voltage wire 55, but the exterior part 63 may be formed using the same material as that of the cover 56.

In the wire harness 41, the bending load at the bent portion of the harness main body 51 is set to less than 44 N. Thus, an operation of fitting the connector 53 is improved even with the high-voltage wire 55. More specifically, the use of the flexible high-voltage wire 55 improves routing and assembly performance of the wire harness 41.

Moreover, according to the wire harness 41, the bending load in at least one bent portion is set to less than 44 newtons. Thus, in the wire harness 41 including the high-voltage wires 55 and the exterior part 63, cost can be reduced and routability in a vehicle body of a vehicle 43 is improved. Moreover, routing steps for the wire harness 41 can be simplified.

Moreover, in the wire harness 41, the constituent members of the harness main body 51 are set with a combination leading to the sum of bending loads less than 44 N, based on previously calculated bending load data for each of bending forms in such constituent members. Thus, the combination that sets the total bending load of the harness main body 51 to be less than 44 N can be easily selected.

Moreover, in the wire harness 41, the previously calculated bending load data indicates a bending form in which at least a part of the harness main body 51 is bent. When the constituent member is the high-voltage wire 55, the bending load data includes data indicating a correlation between the curvature radius R and the bending load of the high-voltage wire 55 and data indicating a correlation between the diameter and the bending load of the high-voltage wire 55. When the exterior part 63 as the constituent member is a corrugated tube, the bending load data is data indicating a correlation between the thickness and bending load of the corrugated tube. Thus, a proper bending load of each constituent member corresponding to the bending form can be identified, and an accurate total bending load of the harness main body 51 can be identified.

Moreover, in the wire harness 41, when the high-voltage wires 55 have different lengths L, the curvature radius R of the high-voltage wire 55B having the larger length L is set larger than that of the shorter high-voltage wire 55A. Thus, in the connector fitted state, a variation in wire length based on a difference in the curvature radius R between the high-voltage wires 55 can be absorbed.

Moreover, the wire harness 41 improves the fluid resistance, workability, and the like, since the cover 56 of the high-voltage wire 55 has the composition described above.

Moreover, the wire harness 41 facilitates routing in a narrow installation space, since the curvature radius R at the bent portion of the harness main body 51 is 60 mm or less.

Moreover, according to the wire harness 41, bending load data is previously calculated for each of bending forms in each of the constituent members of the harness main body 51. Then, each of the constituent members is selected using a combination leading to the sum of bending loads less than 44 N, based on the bending load data. Thereafter, the harness main body 51 is forming using the selected constituent member, and the connector 53 is connected to the counterpart connector 57 by bending the harness main body 51. Thus, the operation of fitting the connector is improved even with the high-voltage wire 55. Moreover, each of the constituent members of the harness main body 51 can be easily selected such that the total bending load of the harness main body 51 is less than 44 N.

Furthermore, according to the wire harness 41, a proper bending load of each constituent member corresponding to the bending form can be identified, and thus an accurate total bending load of the harness main body 51 can be identified.

Note that the contents described above may be considered as a method for routing a wire harness.

More specifically, the contents described above may be considered as a method for routing a wire harness including a high-voltage wire and an exterior part (for example, a corrugated tube) covering the periphery of the high-voltage wire, the method including the steps of: previously calculating (through additional measurement) bending load data for each of a plurality of bending forms (for each bending mode) in (each of) the high-voltage wire and the exterior part; selecting the high-voltage wire and the exterior part in a combination leading to the sum of bending loads less than 44 N, based on the (calculated) bending load data; and forming the wire harness with the selected high-voltage wire and exterior part, and bending and routing the wire harness.

Moreover, the previously calculated bending load data indicates a bending form in which at least a part of the harness main body is bent (that is, a mode of bending the entire harness main body and a mode of bending a part of the harness main body). When the constituent member is the high-voltage wire, the bending load data includes data indicating a correlation (relationship) between the curvature radius and the bending load of the high-voltage wire and data indicating a correlation (relationship) between the diameter and the bending load of the high-voltage wire. When the exterior part as the constituent member is a corrugated tube, the bending load data is data indicating a correlation (relationship) between a thickness and a bending load of the corrugated tube.

The wire harness according to the embodiments of the present invention has been described with reference to the examples as above, but the present invention is not limited thereto, and various modifications can be made within a scope of a gist of the present invention.

What is claimed is:

1. A wire harness comprising:
   a harness main body including a plurality of high-voltage wires, wherein
      a bending load at a bent portion of the harness main body is set to less than 44 newtons,
      the harness main body includes a connector connected to one end of the harness main body,
      the connector is connected to a counterpart connector by bending the harness main body, and
      when the harness main body includes a plurality of constituent members, the bending load at the bent portion of the harness main body is set according to a combination leading to a sum of the bending loads being less than 44 newtons, based on bending load data previously calculated for each of a plurality of bending forms in each of the constituent members.

2. The wire harness according to claim 1, wherein, when the connector is connected to the counterpart connector, no straight portion is provided or a length of a straight portion is not more than three times larger than a value of an outside diameter of the harness main body in a part where the harness main body starts to extend from the connector.

3. The wire harness according to claim 1, wherein the harness main body includes an exterior part covering a periphery of the high-voltage wire.

4. The wire harness according to claim 1, wherein
   the previously calculated bending load data indicates a bending form in which at least a part of the harness main body is bent,
   when the constituent member is the high-voltage wire, the bending load data includes data indicating a correlation between a curvature radius and a bending load of the high-voltage wire and data indicating a correlation between a diameter and the bending load of the high-voltage wire, and
   when an exterior part as the constituent member is a corrugated tube, the bending load data is data indicating a correlation between a thickness and a bending load of the corrugated tube.

5. The wire harness according to claim 1, wherein a curvature radius at the bent portion of the harness main body is not more than 60 mm.

6. The wire harness according to claim 1, wherein the wire harness connects between a battery and an inverter and between the inverter and a motor in an electric vehicle or a hybrid vehicle.

7. A wire harness comprising:
a harness main body including at least a high-voltage wire, wherein
a bending load at a bent portion of the harness main body is set to less than 44 newtons,
the harness main body includes an exterior part covering a periphery of the high-voltage wire, and
when the harness main body includes a plurality of constituent members, the bending load at the bent portion of the harness main body is set according to a combination leading to a sum of the bending loads being less than 44 newtons, based on bending load data previously calculated for each of a plurality of bending forms in each of the constituent members.

8. The wire harness according to claim 7, wherein the bending load of the high-voltage wire is less than 37 newtons, and the bending load of the exterior part is less than 7 newtons.

9. The wire harness according to claim 7, wherein
the previously calculated bending load data indicates a bending form in which at least a part of the harness main body is bent,
when the constituent member is the high-voltage wire, the bending load data includes data indicating a correlation between a curvature radius and a bending load of the high-voltage wire and data indicating a correlation between a diameter and the bending load of the high-voltage wire, and
when the exterior part as the constituent member is a corrugated tube, the bending load data is data indicating a correlation between a thickness and a bending load of the corrugated tube.

10. The wire harness according to claim 7, wherein the wire harness connects between a battery and an inverter and between the inverter and a motor in an electric vehicle or a hybrid vehicle.

11. The wire harness according to claim 10, wherein the wire harness is configured to be fixed to a vehicle body of an electric vehicle or a hybrid vehicle with at least two fixing members.

12. A wire harness comprising:
a harness main body including a plurality of high-voltage wires, wherein
a bending load at a bent portion of the harness main body is set to less than 44 newtons,
the harness main body includes a connector connected to one end of the harness main body,
the connector is connected to a counterpart connector by bending the harness main body, and
when the plurality of high-voltage wires differ in length in the bending form of the harness main body, a curvature radius of the high-voltage wire having a long length is set larger than that of the high-voltage wire having a short length.

* * * * *